(12) United States Patent
Yamamichi et al.

(10) Patent No.: US 7,631,361 B2
(45) Date of Patent: Dec. 8, 2009

(54) CONTENT REPRODUCTION SYSTEM

(75) Inventors: Masato Yamamichi, Ota (JP); Masami Yamamichi, legal representative, Ota (JP); Satomi Yamamichi, Ota (JP); Keiko Yamamichi, Maebashi (JP); Motoji Ohmori, Hirakata (JP); Masaya Yamamoto, Arcadia, CA (US); Kazuhisa Watanabe, Yokohama (JP); Atsushi Saso, Yokohama (JP); Naoaki Yamamoto, Tokyo (JP)

(73) Assignee: Panasonic Corporation, Osaka (JP)

( * ) Notice: Subject to any disclaimer, the term of this patent is extended or adjusted under 35 U.S.C. 154(b) by 163 days.

(21) Appl. No.: 10/567,584

(22) PCT Filed: Aug. 19, 2004

(86) PCT No.: PCT/JP2004/012226

§ 371 (c)(1),
(2), (4) Date: Oct. 30, 2006

(87) PCT Pub. No.: WO2005/020540

PCT Pub. Date: Mar. 3, 2005

(65) Prior Publication Data
US 2007/0124603 A1 May 31, 2007

(30) Foreign Application Priority Data
Aug. 20, 2003 (JP) .............................. 2003-296001

(51) Int. Cl.
*H04N 7/16* (2006.01)
(52) U.S. Cl. .................... 726/27; 726/29; 380/228; 380/230; 380/231; 380/233; 725/5

(58) Field of Classification Search ........................ None
See application file for complete search history.

(56) References Cited

U.S. PATENT DOCUMENTS 3,736,368 A 5/1973 Vogelman et al.
(Continued)

FOREIGN PATENT DOCUMENTS

EP 0 715 245 6/1996
(Continued)

OTHER PUBLICATIONS

NNRD455171, Content Protection System with Media Key Block for Video-on-Demand, Mar. 1, 2002, IBM Technical Disclosure Bulletin, Issue #455, p. 528.*

*Primary Examiner*—William R Korzuch
*Assistant Examiner*—Michael R Vaughan
(74) *Attorney, Agent, or Firm*—Wenderoth, Lind & Ponack, L.L.P.

(57) ABSTRACT

A content reproduction system that allow the user to rent or purchase any desired contents for reproduction without depending on a predetermined type of information of the user. The content reproduction system includes: a recording medium storing a license ticket including an encrypted master key; and a reproduction apparatus that receives from the user a request for a selected content and the information of the selected content, acquires distribution content information corresponding to the selected content, stores it in association with the license ticket into the recording medium. When reproducing the content, the reproduction apparatus generates a content using an encrypted content decryption key and an encrypted content that are contained in the distribution content information, and using a master decryption key information corresponding to the distribution content information, and reproduces the generated content.

15 Claims, 50 Drawing Sheets

U.S. PATENT DOCUMENTS

| | | | |
|---|---|---|---|
| 5,754,649 A * | 5/1998 | Ryan et al. | 380/203 |
| 6,240,401 B1 * | 5/2001 | Oren et al. | 705/40 |
| 6,434,535 B1 * | 8/2002 | Kupka et al. | 705/24 |
| 6,834,346 B1 * | 12/2004 | Ishibashi et al. | 713/179 |
| 7,020,636 B2 * | 3/2006 | Ohmori et al. | 705/51 |
| 7,203,314 B1 * | 4/2007 | Kahn et al. | 380/239 |
| 7,216,228 B2 * | 5/2007 | Sako et al. | 713/168 |
| 2002/0042777 A1 * | 4/2002 | Yoshida et al. | 705/41 |
| 2003/0018586 A1 * | 1/2003 | Krahn | 705/58 |
| 2003/0031319 A1 * | 2/2003 | Abe et al. | 380/232 |
| 2003/0152222 A1 * | 8/2003 | Nakano et al. | 380/201 |
| 2003/0200216 A1 * | 10/2003 | Hayes et al. | 707/9 |
| 2004/0109569 A1 * | 6/2004 | Ellison et al. | 380/277 |

FOREIGN PATENT DOCUMENTS

| | | | |
|---|---|---|---|
| EP | 1 014 618 | | 6/2000 |
| EP | 1 047 030 | | 10/2000 |
| EP | 1 197 965 | | 4/2002 |
| JP | 09265254 A | * | 10/1997 |
| JP | 2001-60286 | | 3/2001 |
| JP | 2003132425 A | * | 5/2003 |

* cited by examiner

| TICKET NUMBER | USABLE CONTENT ID | USE RULE | | TICKET-SPECIFIC ENCRYPTED MASTER KEY |
|---|---|---|---|---|
| | | RENTAL | PURCHASE | |
| 1 | 100*** | 3 DAYS | 300 YEN | Enc(DK,WK) |
| 2 | 100*** | 3 DAYS | 300 YEN | Enc(DK,WK) |
| 3 | 100*** | 3 DAYS | 300 YEN | Enc(DK,WK) |
| 4 | 100*** | 5 DAYS | 500 YEN | Enc(DK,WK) |
| 5 | 100*** | 5 DAYS | 500 YEN | Enc(DK,WK) |
| 6 | 100*** | 5 DAYS | 500 YEN | Enc(DK,WK) |
| 7 | 100*** | 7 DAYS | 700 YEN | Enc(DK,WK) |
| 8 | 100*** | 7 DAYS | 700 YEN | Enc(DK,WK) |
| 9 | 100*** | 7 DAYS | 700 YEN | Enc(DK,WK) |
| 10 | 100*** | 10 DAYS | 1000 YEN | Enc(DK,WK) |

| USE NUMBER | USE STATE | USE FORM | USE START DATE/TIME | CONTENT ID | CONTENT NAME | PRICE |
|---|---|---|---|---|---|---|
| 1 | USED | RENTAL | MAY 1, 2003 12:00 | 1000001 | AAA | 700 YEN |
| 2 | USED | RENTAL | MAY 15, 2003 20:00 | 1000002 | BBB | 700 YEN |
| 3 | NOT USED | | | | | |
| 4 | USED | PURCHASE | MAY 10, 2003 22:00 | 1000007 | GGG | 1000 YEN |
| 5 | USED | PURCHASE | MAY 10, 2003 22:00 | 1000007 | GGG | 1000 YEN |
| 6 | NOT USED | | | | | |
| 7 | IN USE | RENTAL | MAY 20, 2003 18:00 | 1000005 | EEE | 700 YEN |
| 8 | NOT USED | | | | | |
| 9 | NOT USED | | | | | |
| 10 | NOT USED | | | | | |

| AVAILABLE CONTENT LIST SCREEN | | PAGE 1/20 |
|---|---|---|
| CONTENT ID | CONTENT NAME | PRICE |
| 1000001 | AAA | 700 YEN |
| 1000002 | BBB | 700 YEN ← M101 |
| 1000003 | CCC | 1000 YEN ← M102 |
| 1000004 | DDD | 700 YEN ← M103 |
| 1000005 | EEE | 700 YEN |

FIG.7 M150

SELECTED CONTENT M151

| CONTENT ID | CONTENT NAME | PRICE |
|---|---|---|
| 1000003 | CCC | 1000 YEN |

USE FORM M152

RENTAL
PURCHASE

SELECTED CONTENT
M251

| CONTENT ID | CONTENT NAME | PRICE |
|---|---|---|
| 1000003 | CCC | 1000 YEN |

USABLE LICENSE TICKET
(PLURAL TICKETS CAN BE SELECTED)

M252

| TICKET NUMBER | USABLE CONTENT ID | USE RULE (PURCHASE) |
|---|---|---|
| 3 | 100**** | 300 YEN |
| 6 | 100**** | 500 YEN |
| 8 | 100**** | 700 YEN |
| 9 | 100**** | 700 YEN |
| 10 | 100**** | 1000 YEN |

SELECTION OF REPRODUCTION CONTENT

M301

| USE NUMBER | CONTENT ID | CONTENT NAME |
|---|---|---|
| 4 | 1000007 | GGG |
| 7 | 1000005 | EEE |

| CONTENT ID | CONTENT NAME | PRICE |
|---|---|---|
| 1000001 | AAA | 700 YEN |
| 1000002 | BBB | 700 YEN |
| 1000003 | CCC | 1000 YEN |
| 1000004 | DDD | 700 YEN |
| 1000005 | EEE | 700 YEN |
| ⋮ | ⋮ | ⋮ |

| CONTENT ID | CONTENT NAME | ENCRYPTED CONTENT KEY | ENCRYPTED CONTENT | PRICE |
|---|---|---|---|---|
| 1000001 | AAA | Enc(WK,CK1) | Enc(CK1,CNT1) | 700 YEN |
| 1000002 | BBB | Enc(WK,CK2) | Enc(CK2,CNT2) | 700 YEN |
| 1000003 | CCC | Enc(WK,CK3) | Enc(CK3,CNT3) | 1000 YEN |
| 1000004 | DDD | Enc(WK,CK4) | Enc(CK4,CNT4) | 700 YEN |
| 1000005 | EEE | Enc(WK,CK5) | Enc(CK5,CNT5) | 700 YEN |
| ... | ... | ... | ... | ... |

| TICKET NUMBER | USABLE CONTENT ID | USE RULE | | TICKET-SPECIFIC ENCRYPTED MASTER KEY |
|---|---|---|---|---|
| | | RENTAL | PURCHASE | |
| 1 | 100✶✶✶ | 3 DAYS | 300 YEN | Enc(DK,WK1) |
| 2 | 100✶✶✶ | 3 DAYS | 300 YEN | Enc(DK,WK2) |
| 3 | 100✶✶✶ | 3 DAYS | 300 YEN | Enc(DK,WK3) |
| 4 | 100✶✶✶ | 5 DAYS | 500 YEN | Enc(DK,WK4) |
| 5 | 100✶✶✶ | 5 DAYS | 500 YEN | Enc(DK,WK5) |
| 6 | 100✶✶✶ | 5 DAYS | 500 YEN | Enc(DK,WK6) |
| 7 | 100✶✶✶ | 7 DAYS | 700 YEN | Enc(DK,WK7) |
| 8 | 100✶✶✶ | 7 DAYS | 700 YEN | Enc(DK,WK8) |
| 9 | 100✶✶✶ | 7 DAYS | 700 YEN | Enc(DK,WK9) |
| 10 | 100✶✶✶ | 10 DAYS | 1000 YEN | Enc(DK,WK10) |

FIG. 35

| CONTENT ID | (INDEX INFORMATION, ENCRYPTED CONTENT KEY) | ENCRYPTED CONTENT |
|---|---|---|
| 1000001 | (1,Enc(WK1,CK1)),<br>(2,Enc(WK2,CK1)),<br>...<br>(10,Enc(WK10,CK1)), | Enc(CK1,CNT1) |
| 1000002 | (1,Enc(WK1,CK2)),<br>(2,Enc(WK2,CK2)),<br>...<br>(10,Enc(WK10,CK2)), | Enc(CK2,CNT2) |
| ... | ... | |

| NODE | MASTER KEY |
|---|---|
| A | 0-0K00, 0-0K01, 0-0K10 |
| B | 1-0K01, 1-0K10 |
| C | 1-1K01, 1-1K10 |

FIG.43B

| MASTER KEY SET | MASTER KEY |
|---|---|
| MASTER KEY SET 1 | 0-0K00, 0-0K01, 1-0K01 |
| MASTER KEY SET 2 | 0-0K00, 0-0K01, 1-0K10 |
| MASTER KEY SET 3 | 0-0K00, 0-0K10, 1-1K01 |
| MASTER KEY SET 4 | 0-0K00, 0-0K10, 1-1K10 |

| TICKET NUMBER | USABLE CONTENT ID | USE RULE | | TICKET-SPECIFIC ENCRYPTED MASTER KEY SET |
|---|---|---|---|---|
| | | RENTAL | PURCHASE | |
| 1 | 100*** | 3 DAYS | 300 YEN | Enc(DK,WKS1) |
| 2 | 100*** | 3 DAYS | 300 YEN | Enc(DK,WKS2) |
| 3 | 100*** | 3 DAYS | 300 YEN | Enc(DK,WKS3) |
| 4 | 100*** | 5 DAYS | 500 YEN | Enc(DK,WKS4) |
| 5 | 100*** | 5 DAYS | 500 YEN | Enc(DK,WKS5) |
| 6 | 100*** | 5 DAYS | 500 YEN | Enc(DK,WKS6) |
| 7 | 100*** | 7 DAYS | 700 YEN | Enc(DK,WKS7) |
| 8 | 100*** | 7 DAYS | 700 YEN | Enc(DK,WKS8) |
| 9 | 100*** | 7 DAYS | 700 YEN | Enc(DK,WKS9) |
| 10 | 100*** | 10 DAYS | 1000 YEN | Enc(DK,WKS10) |

FIG.46

| CONTENT ID | (INDEX INFORMATION, ENCRYPTED CONTENT KEY) | ENCRYPTED CONTENT |
|---|---|---|
| 1000001 | (Ind1, Enc(WK1, CK1)), | Enc(CK1, CNT1) |
| 1000002 | (Ind1, Enc(WK2, CK2)), | Enc(CK2, CNT2) |
| ... | ... | ... |

131B

CONTENT REPRODUCTION SYSTEM

BACKGROUND OF THE INVENTION

1. Technical Field

The present invention relates to a technology for allowing a user to receive contents such as music, video, and programs via a network, within the limits of a prepaid amount of money, and use the received contents.

2. Background Art

The recent prevalence of broadband networks such as ADSL allows users to receive contents such as music, video, and programs from content distributors via a network, within the limits of a prepaid amount of money, and use the received contents. In general, the contents are distributed in an encrypted form to protect them from problems such as copyright infringement, and the users decrypt the received encrypted contents to use the contents.

When a user purchases content via a network, the user needs to pay a fee for the content. in one method for the payment, the user may transfer the money using Public Key Infrastructure (PKI) such as Secure Sockets Layer (SSL) in which the bank account number or credit card number of the user is used for identification. In another method, the user may be charged later from the content distributor who manages use fees for users.

With the former method, there is a fear that a third party may obtain the bank account number or the credit card number by an unauthorized means such as eaves dropping. With the latter method, a system for managing the use fees and charging the users needs to be established, which would make the system of the content distributor complicated.

Japanese Laid-Open Patent Application No. 2001-60286 discloses a prepaid recording medium that provides a payment method which is easier than conventional ones. The prepaid recording medium is a non-volatile semiconductor memory card or a card-type recording medium such as an optical disc or a magnetic recording disk, and is of a type in which data can be written. The prepaid recording medium has a prepaid information storage area for storing accounting data that indicates amounts of money prepaid for contents distributed from a distribution center, a content information storage area for storing various pieces of information of the contents distributed from the distribution center, and an area for storing decryption keys used for decrypting encrypted contents. The construction enables encrypted contents corresponding to the decryption keys to be downloaded or copied within the limits of prepaid amounts of money.

In general, each content is assigned with a different pair of an encryption key, which is used to encrypt the content to generate an encrypted content, and a decryption key which is used to decrypt the encrypted content.

The above-described prepaid recording medium enables only such encrypted contents that can be decrypted using the corresponding decryption keys, to be downloaded or copied. As a result, when a user purchases such a prepaid recording medium, the user needs to determine, in advance, contents that the user would like to use by downloading or copying them from the content distributor. That is to say, the contents the user can use depend on the decryption keys stored in the prepaid recording medium.

The above-described conventional technology, however, does not make full use of the advantageous effect of the prepaid card so that the user can purchase any desired contents within the limits of a prepaid amount of money.

BRIEF SUMMARY OF THE INVENTION

It is the object of the present invention to provide a content reproduction system, a content-use recording medium, a reproduction apparatus, a content distribution apparatus, a data writing apparatus, a content reproduction method, a program, and a recording medium that allow the user to rent or purchase any desired contents for reproduction without depending on predetermined information from the user.

The above object is fulfilled by a content reproduction system comprising: a content distribution apparatus operable to distribute an encrypted content, which is generated by encrypting a content using a content key uniquely assigned to the content, and an encrypted content key which is generated by encrypting the content key using a master key that is commonly assigned to a plurality of contents including the content; a content-use recording medium in which master information, which is generated from a source material that includes at least the master key, is recorded; and a reproduction apparatus operable to acquire the encrypted content and the encrypted content key from the content distribution apparatus, generate a master key from the master information recorded in the content-use recording medium, generate a content key by decrypting the encrypted content key using the generated master key, generate a content by decrypting the encrypted content using the generated content key, and reproduce the generated content.

With the above-stated construction, the master information stored in the content-use recording medium does not depend on the contents. This enables the user to generate the content by decrypting the encrypted content and use the generated content without depending on the master information.

In the above content reproduction system, the master information may be an encrypted master key that is generated by encrypting the master key using a device key uniquely assigned to the reproduction apparatus, and the reproduction apparatus generates a master key by decrypting the encrypted master key using a device key uniquely assigned to the reproduction apparatus.

The above-stated construction enhances the security since it encrypts the master key using the device key.

The above object is also fulfilled by a reproduction apparatus that acquires encrypted contents from a content distribution apparatus and reproduces contents that are generated by decrypting the acquired encrypted contents, comprising: a content information acquiring unit operable to acquire an encrypted content, which is generated by encrypting a content using a content key uniquely assigned to the content, and an encrypted content key which is generated by encrypting the content key using a master key that is commonly assigned to a plurality of contents including the content, from the content distribution apparatus; a content key generating unit operable to generate a master key from master information recorded in a content-use recording medium, the master information being generated from a source material that includes at least the master key commonly assigned to the plurality of contents, and generate a content key by decrypting the encrypted content key using the generated master key; a content generating unit operable to generate a content by decrypting the encrypted content using the generated content key; and a reproducing unit operable to reproduce the generated content.

The above-stated construction enables the reproduction apparatus, if reproduction of a content has been permitted, to generate a content key by decrypting the encrypted content key, which is distributed by the content distribution apparatus, using the master information stored in the content-use recording medium, generate the content by decrypting the encrypted content using the generated content key, and reproduce the generated content.

In the above reproduction apparatus, the master information recorded in the content-use recording medium may be an encrypted master key that is generated by encrypting the master key using a device key uniquely assigned to the reproduction apparatus, and the content key generating unit generates a master key by decrypting the encrypted master key using a device key uniquely assigned to the reproduction apparatus.

The above-stated construction enhances the security since the reproduction apparatus generates a master key by decrypting an encrypted master key using the device key.

In the above reproduction apparatus, the content-use recording medium may further store another encrypted master key that is generated by encrypting another master key using the device key uniquely assigned to the reproduction apparatus, and the content key generating unit further generates the other master key by decrypting the other encrypted master key using the device key, and generates a content key by decrypting the encrypted content key using the generated other master key.

The above-stated construction enables the reproduction apparatus to generate another master key from another piece of master information, and generate a content key by decrypting an encrypted content key using the other master key.

In the above reproduction apparatus, the master information may be an encrypted master key set that is generated by encrypting, using the device key uniquely assigned to the reproduction apparatus, a master key set composed of the master key and another master key, and the content key generating unit generates the master key and the other master key by decrypting the encrypted master key set using the device key, and generates a content key by decrypting the encrypted content key using the generated master key.

The above-stated construction enables the reproduction apparatus to generate a master key and another master key from the encrypted master key set, and generate a content key by decrypting an encrypted content key using the generated master key.

In the above reproduction apparatus, the content-use recording medium may further store use period information in association with the master information, the use period information indicating a use period of the content. The content information acquiring unit may include: an acquisition information receiving sub-unit operable to receive acquisition information that indicates either rental, which means that the content is acquired for rent, or purchase which means that the content is acquired for purchase; and an acquisition information storage sub-unit operable to store the received acquisition information in association with the encrypted content and the encrypted content key. The content key generating unit may include: an acquisition information judging sub-unit operable to judge whether the received acquisition information indicates rental or purchase; and a reproduction control sub-unit operable to permit a reproduction of the content if the acquisition information judging sub-unit judges that the acquisition information indicates purchase, and permit a reproduction of the content if the acquisition information judging sub-unit judges that the acquisition information indicates rental, and if a requested use period for the content is within the use period indicated by the use period information.

The above-stated construction, in which the reproduction control sub-unit permits reproduction of the content depending on whether the acquisition information indicates rental or purchase, enables the reproduction to be controlled depending on the content acquisition information.

In the above reproduction apparatus, the reproduction control sub-unit may include: a reproduction instruction receiving lower-unit operable to receives a reproduction instruction for the content; and a period judging lower-unit operable to, if the acquisition information judging sub-unit judges that the acquisition information indicates rental, calculate a period between acquisition of the encrypted content and the encrypted content key and reception of the reproduction instruction, and judge whether the calculated period is within the use period indicated by the use period information.

The above-stated construction enables the reproduction apparatus to, if the acquisition information indicates rental, calculate a period between acquisition of the encrypted content and the encrypted content key and reception of the reproduction instruction, and judge whether to permit the reproduction of the content based on the calculated period and the use period stored in the content-use recording medium.

In the above reproduction apparatus, the content-use recording medium may further store usable content information that indicates a condition for using the content, and the content information acquiring unit judges whether the condition for using the content is satisfied, acquires the encrypted content and the encrypted content key from the content distribution apparatus if it is judged that the condition for using the content is satisfied, and does not acquire the encrypted content and the encrypted content key from the content distribution apparatus if it is judged that the condition is not satisfied.

The above-stated construction enables the reproduction apparatus to acquire the encrypted content and the encrypted content key based on the usable content information.

In the above reproduction apparatus, the content distribution apparatus may distribute the encrypted content and the encrypted content key to the reproduction apparatus regardless of whether the content distribution apparatus receives a content distribution request from the reproduction apparatus or not, and the content information acquiring unit receives the encrypted content and the encrypted content key from the content distribution apparatus, and judges whether the received encrypted content and encrypted content key satisfy the condition indicated by the usable content information, holds the received encrypted content and encrypted content key if it is judged that the received encrypted content and encrypted content key satisfy the condition, and discards the received encrypted content and encrypted content key if it is judged that the received encrypted content and encrypted content key do not satisfy the condition.

The above-stated construction enables the reproduction apparatus to acquire the encrypted content and the encrypted content key based on the usable content information sent from the content distribution apparatus by one-way distribution.

The above object can also be fulfilled by a content-use recording medium which stores: use period information which indicates a use period of a content; and master information which is generated from a source material that includes at least a master key that is commonly assigned to a plurality of contents including the content, the master key being used for encrypting a content key, the master information being associated with the use period information in the content-use recording medium.

The above-stated construction, in which the content-use recording medium stores the master information in association with the use period, enables the use period of the master information to be restricted.

The above content-use recording medium may further store usable content information that indicates a condition for using the content, the usable content information being associated with the master information in the content-use recording medium.

The above-stated construction, in which the content-use recording medium stores the master information further in association with the usable content information that indicates a condition for using the content, enables an available content to be extracted.

In the above content-use recording medium, the master information may be an encrypted master key that is generated by encrypting the master key using a device key uniquely assigned to a reproduction apparatus for reproducing the content.

The above-stated construction enhances the security of the content-use recording medium since the master key is encrypted using the device key.

The content-use recording medium may further store another encrypted master key that is generated by encrypting another master key using the device key uniquely assigned to the reproduction apparatus, the other encrypted master key being associated with another piece of use period information.

With the above-stated construction, the content-use recording medium can store an encrypted master key and another encrypted master key.

In the above content-use recording medium, the master information may be an encrypted master key set that is generated by encrypting, using the device key uniquely assigned to the reproduction apparatus, a master key set composed of the master key and another master key.

With the above-stated construction, the content-use recording medium can store an encrypted master key set that is generated by encrypting the master key and another master key.

The above object can also be fulfilled by a content distribution apparatus connected to a reproduction apparatus via a network, comprising: a content information storage unit storing an encrypted content, which is generated by encrypting a content using a content key uniquely assigned to the content, and an encrypted content key which is generated by encrypting the content key using a master key that is commonly assigned to a plurality of contents including the content; and a distributing unit operable to distribute the encrypted content and the encrypted content key stored in the content information storage unit to the reproduction apparatus via the network.

The above-stated construction enables the content distribution apparatus to distribute the encrypted content and the encrypted content key to the reproduction apparatus.

The above content distribution apparatus may further comprise: a master key storage unit storing a plurality of master keys; a state changing unit operable to, if any of the plurality of master keys is not permitted to be used, set the not-permitted master key to an unusable state; and a content key encrypting unit operable to generate one or more encrypted content keys respectively using one or more master keys that are permitted to be used, among the plurality of master keys.

The above-stated construction enables the content distribution apparatus to generate an encrypted content key using an effective master key among a plurality of master keys. This makes it possible to generate an encrypted content key not using a revealed master key, namely using a not-revealed master key.

The above object can also be fulfilled by a data writing apparatus for writing data into a content-use recording medium, comprising: a master key generating unit operable to generate a master key that is commonly assigned to a plurality of contents, the master key being used for encrypting a content key; a master information generating unit operable to generate master information that indicates the master key; and a writing unit operable to write the generated master information into the content-use recording medium.

The above-stated construction enables the data writing apparatus to write the master information, which indicates a master key that is commonly assigned to a plurality of contents, into the content-use recording medium.

BRIEF DESCRIPTION OF THE DRAWINGS

FIG. 3 shows the data structure of the license ticket table T100 stored in the license ticket storage field 110.

FIG. 5 shows the data structure of the use state table T150 stored in the use state storage field 140.

FIG. 6 shows the construction of the available content list screen M100.

FIG. 7 shows the construction of the use form selection screen M150.

FIG. 9 shows the construction of the for-purchase ticket selection screen M250.

FIG. 20 shows the construction of the reproducible content list screen M300.

FIG. 23 shows the data structure of the content-related information table T400 stored in the content-related information storage unit 403.

FIG. 24 shows the data structure of the encrypted content management table T410 stored in the distribution data storage unit 404.

FIG. 34 shows the data structure of the license ticket table T100A stored in the license ticket storage field 110A.

FIG. 35 is a block diagram showing the construction of the rental content storage field 131A.

FIG. 43A shows the master keys assigned to each node other than the leaves.

FIG. 43B shows the master keys that belong to each master key set assigned to the leaves.

FIG. 45 shows the data structure of the license ticket table T100B stored in the license ticket storage field 110B.

FIG. 46 is a block diagram showing the construction of the rental content storage field 131B.

DETAILED DESCRIPTION OF THE INVENTION

1. Embodiment 1

A prepaid card system 1 in Embodiment 1 of the present invention will be described first.

1.1 Construction of Prepaid Card System 1

The construction of the prepaid card system 1 will be described.

Figure 1:
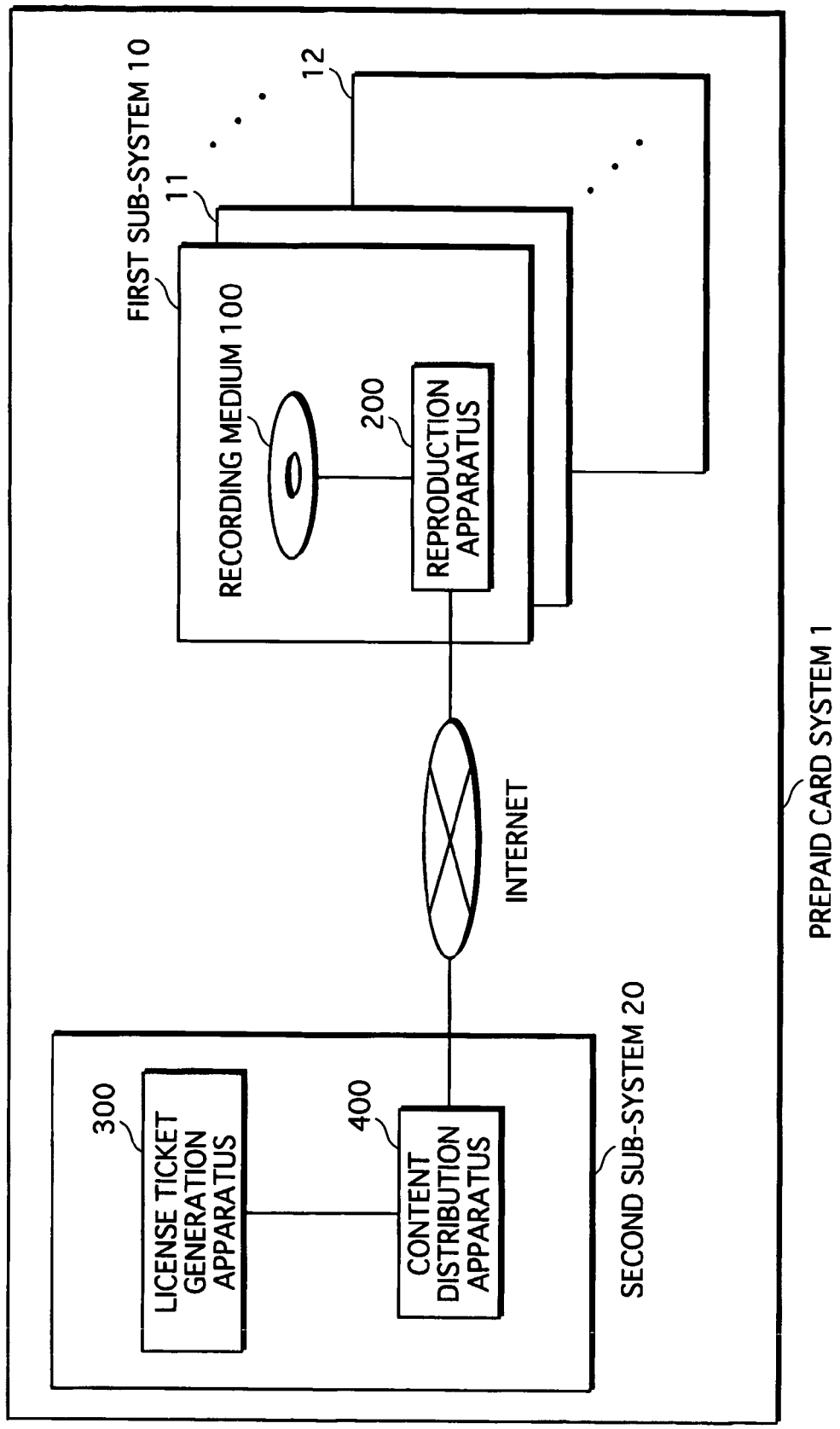
FIG. 1 is a block diagram of the prepaid card system 1.

As shown in FIG. 1, the prepaid card system 1 includes first sub-systems 10, 11, . . . 12 and a second sub-system 20. The first sub-system 10 includes a recording medium 100 and a reproduction apparatus 200, where the recording medium 100 can be inserted into and removed from the reproduction apparatus 200. The recording medium 100 is an optical disc such as DVD-RAM. The first sub-systems 11, . . . 12 have the same construction as the first sub-system 10. The second sub-system 20 includes a license ticket generation apparatus 300 and a content distribution apparatus 400 which are interconnected in a network via a dedicated line. Also, the content distribution apparatus 400 and each reproduction apparatus of the first sub-systems 10, 11 . . . 12 are interconnected in a network via the Internet.

The reproduction apparatus 200 includes a remote controller and an input unit for receiving information from users, a first input/output unit for receiving and transmitting information via the Internet from/to the content distribution apparatus, a second input/output unit for inputting and outputting information from/to the recording medium 100. The reproduction apparatus 200 is further connected to a television, and includes an output unit for outputting data such as a content to the television.

The first sub-systems are sub-systems on the side of the users, and the second sub-system is a sub-system on the side of the content distributor. It is supposed in the present embodiment that the content distributor is a movie company.

Now, the relationship between each apparatus in the prepaid card system 1 will be briefly explained using the recording medium 100, reproduction apparatus 200, license ticket generation apparatus 300, and content distribution apparatus 400.

First, the license ticket generation apparatus 300 creates the recording medium 100 by generating information, which is used when a user rents or purchases a content from the content distribution apparatus 400, and writing the generated information into a recording medium. The content distribution apparatus 400 encrypts the content and a content key used for encrypting the content, and stores the encrypted content and the encrypted content key therein.

The recording mediums 100 created by the license ticket generation apparatus 300 are sold in stores, and a user purchases a recording medium 100 in a store. It should be noted here that when the user purchases the recording medium 100, the user pays a charge for renting or purchasing a content in the recording medium 100 in advance.

The user inserts the recording medium 100 into the reproduction apparatus 200, connects to the content distribution apparatus 400 via the network, and notifies the content distribution apparatus 400 of a request for a content in the recording medium 100 that the user wants to rent or purchase, using the information recorded in the recording medium 100.

Upon receiving the request from the user for the content for rent or purchase, the content distribution apparatus 400 transmits an encrypted content and encrypted content key that correspond to the requested content, to the reproduction apparatus 200. The reproduction apparatus 200 receives the information corresponding to the requested content, and records the received information into the recording medium 100.

The user inserts the recording medium 100 into the reproduction apparatus 200 when reproducing the content.

It should be noted here that user may purchase the recording medium 100 via online shopping on the Internet.

The relationships between the first sub-systems 11, . . . 12 and the license ticket generation apparatus 300 and the content distribution apparatus 400 are the same as the one described above, and the explanation thereof is omitted.

1.2 Construction of Recording Medium 100

The construction of the recording medium 100 will be described.

Figure 2:
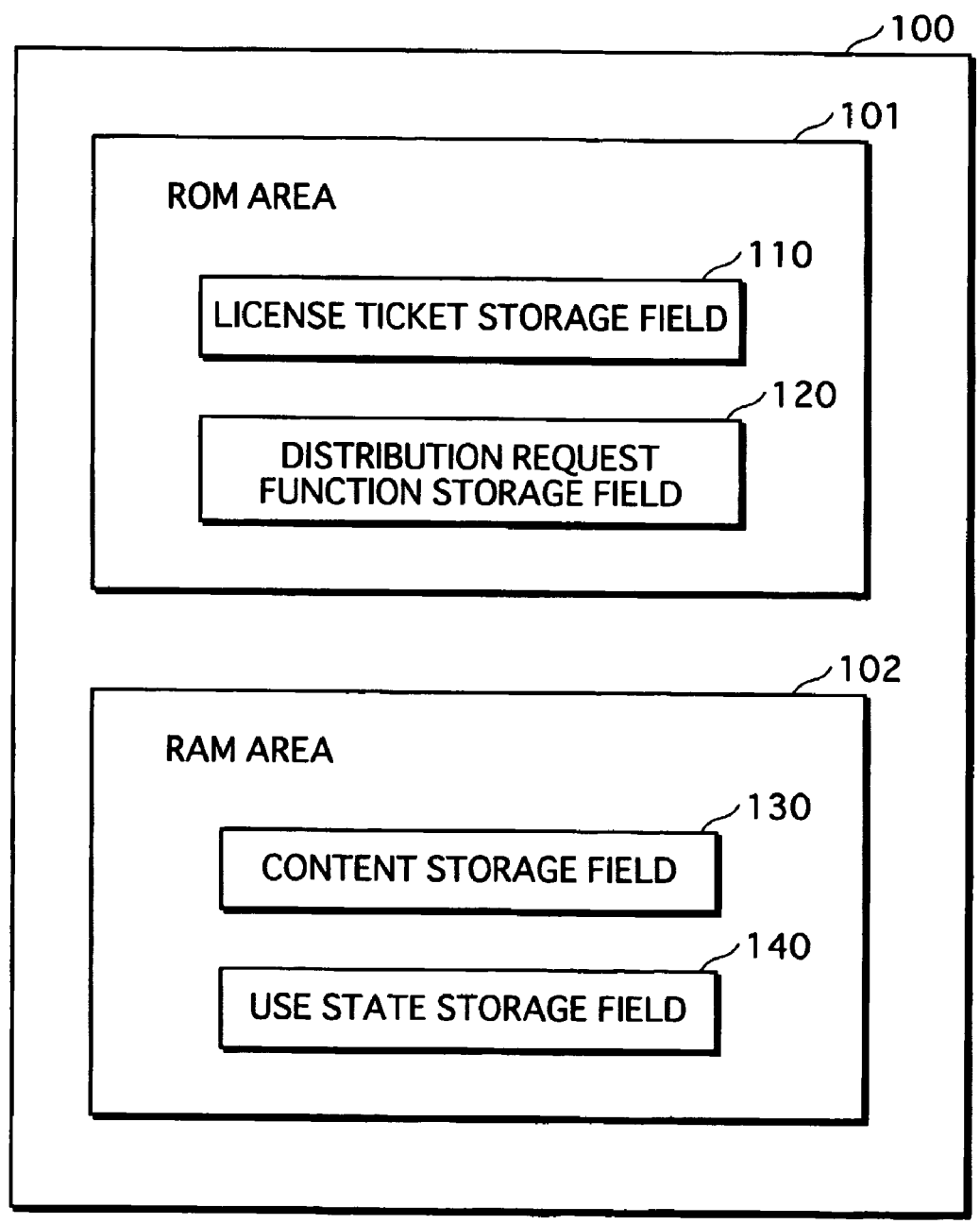
FIG. 2 is a block diagram of the recording medium 100.

As shown in FIG. 2, the recording medium 100 includes a ROM area 101 and a RAM area 102. The ROM area 101 is a read-only area, and includes a license ticket storage field 110 and a distribution request function storage field 120. The RAM area 102 allows data to be read and written from/into itself, and includes a content storage field 130 and a use state storage field 140.

The following describes the license ticket storage field 110, content storage field 130, use state storage field 140, and distribution request function storage field 120. Note that the explanation of the recording mediums contained in the first sub-systems 11, . . . 12 is omitted since they have the same construction as the recording medium 100.

1.2.1 License Ticket Storage Field 110

The license ticket storage field 110 includes, as shown in FIG. 3 as one example, a license ticket table T100.

The license ticket table T100 includes columns for the ticket number, usable content ID, use rule, and ticket-specific encrypted master key. A set of the ticket number, usable content ID, use rule, and ticket-specific encrypted master key is called a license ticket. A license ticket table may include one or more license tickets. In the present embodiment, the license ticket table T100 includes 10 license tickets.

The ticket numbers are serial numbers assigned to the one or more license tickets contained the license ticket table T100.

The usable content ID is an identifier of a content that can be rented or purchased by the user from the content distribution apparatus 400. The first three digits of it are used to identify the movie company, and the three-digit number is referred to as a movie company identifier. The remaining four digits are used to identify the work, and the four-digit number is referred to as a work identifier.

It should be noted here that the work identifier in the usable content ID can be specified using a wild card notation. For example, usable content ID "100**" indicates that any content provided by the content distribution company identified as "100" can be rented or purchased. Also, usable content ID "1000*" indicates that any of the contents that are identified by work identifiers whose first digit is "0" and provided by the content distribution company identified as "100" can be rented or purchased. Also, usable content ID "1000001" indicates that a content identified by work identifier "0001" and provided by the content distribution company identified as "100" can be rented or purchased.

The use rule is composed of a pair of columns "rental" and "purchase". The column "rental" shows a rental period for which the user can rent the content from the content distribution apparatus 400. The column "purchase" shows an amount of money required for purchasing the content from the content distribution apparatus 400.

The ticket-specific encrypted master key is a result of encrypting the master key "WK", which is used to encrypt the content key that is used to encrypt the content, using the device key "DK", which is stored in the reproduction apparatus 200 in advance, by the common key encryption system.

Here, the common key encryption system is a method of encrypting/decrypting certain information using a same key. One example of a common key encryption system is DES. Since DES is a known technology, the explanation thereof is omitted. A result of encrypting information B using encryption key A by the common key encryption system is represented as Enc(A, B). Similarly, a result of encrypting the master key "WK" using the device key "DK" by the common key encryption system is represented as Enc(DK, WK).

Each of the usable content IDs included in the license ticket table T100 shown in FIG. 3 has "100" as the first three digits. This indicates that the user cannot rent or purchase contents from a plurality of movie companies, with the recording medium 100.

It should be noted here that an amount of money the user pays in advance when the user purchases the recording medium 100 is a total of the amounts of money specified in the user rule for all the license tickets shown in the license ticket table T100.

1.2.2 Content Storage Field 130

Figure 4:
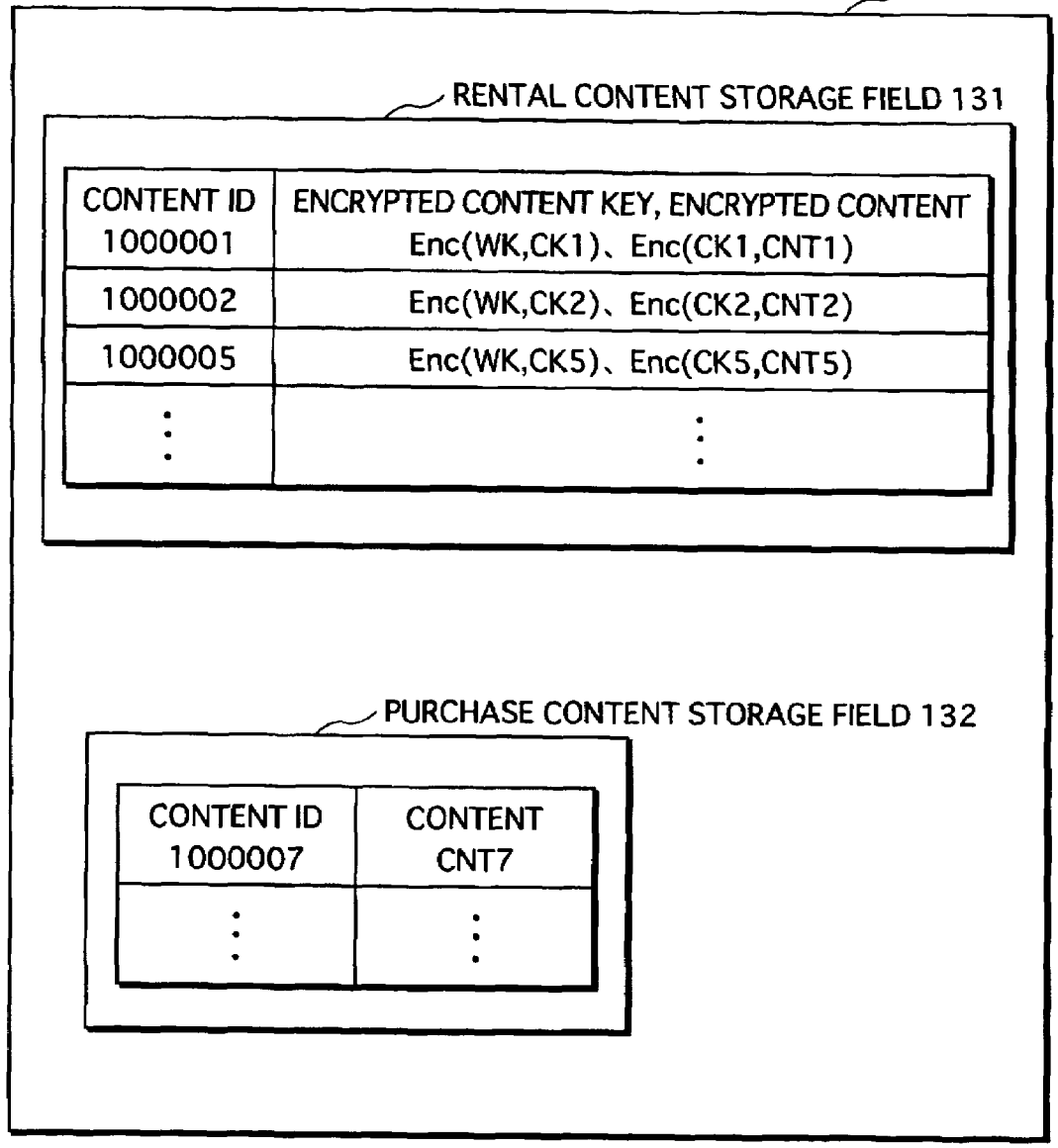
FIG. 4 is a block diagram showing the construction of the content storage field 130.

The content storage field 130 includes, as shown in FIG. 4, a rental content storage field 131 and a purchase content storage field 132.

The rental content storage field 131 stores information relating to the contents received from the content distribution apparatus 400 for rent. In this example, the rental content storage field 131 stores pairs of an encrypted content key and an encrypted content, by associating them with the respective content IDs.

The purchase content storage field 132 stores information relating to the contents received from the content distribution apparatus 400 for purchase. In this example, the purchase content storage field 132 stores contents by associating them with the respective content IDs.

It should be noted here that in FIG. 4, "CNTn" ("n" represents a number) represents "content", and "CKn" ("n" represents a number) represents "content key". For example, "CNT1" represents a content identified by content ID "1000001", and "CK1" represents a content key that is used to encrypt the content "CNT1". It should also be noted here that different content keys are used to encrypt respective contents.

1.2.3 Use State Storage Field 140

The use state storage field 140 includes a use state table T150, as shown in FIG. 5.

The use state table T150 shows the use state of the license tickets shown in the license ticket storage field 110, and includes columns for the use number, use state, use form, use start date/time, content ID, content name, and price. A set of the use number, use state, use form, use start date/time, content ID, content name, and price is called license ticket use information. It should be noted here that the number of pieces of license ticket use information is the same as the number of license tickets.

The use numbers are serial numbers assigned to the pieces of license ticket use information, and correspond respectively to the ticket numbers of the license tickets. The use numbers are stored in advance.

The use state indicates the use state of the license ticket having the ticket number corresponding to the use number, and any of "not used", "in use", and "used" is recorded in the use state column for each license ticket. The "not used" indicates that the license ticket having the ticket number corresponding to the use number has not been used; "in use" indicates that a content rented using the license ticket is currently rented; and "used" indicates that a rental period for a content rented using the license ticket has passed or that a content was purchased using the license ticket. It should be noted here that immediately after the recording medium 100 is purchased, the use state column is recorded with "not used".

The use start date/time indicates a year, month, day, hour, minute at which the reception of the content information from the content distribution apparatus 400 completed. When the content is rented, the use start date/time is used to determine whether the rental period has passed or not. It should be noted here that immediately after the recording medium 100 is purchased, the use start date/time column is blank.

The content ID indicates an ID of a content that was rented or purchased using the license ticket having the ticket number corresponding to the use number. It should be noted here that immediately after the recording medium 100 is purchased, the content ID column is blank.

The content name indicates a name of a content that was rented or purchased using the license ticket having the ticket number corresponding to the use number. It should be noted here that immediately after the recording medium 100 is purchased, the content name column is blank.

The price indicates a price of a content that was rented or purchased using the license ticket having the ticket number corresponding to the use number. It should be noted here that immediately after the recording medium 100 is purchased, the price column is blank.

It should be noted here that in the present embodiment, the use start date/time is represented by a year, month, day, hour, and minute. However, not limited to this, the use start date/time may be represented in a different manner as long as the use start date/time can be used to determine whether the rental period has passed or not.

1.2.4 Distribution Request Function Storage Field 120

The distribution request function storage field 120 stores a distribution request program and information of: available content list screen; use form selection screen; for-rent ticket selection screen; and for-purchase ticket selection screen.

The distribution request program is read and executed by the reproduction apparatus 200.

These pieces of information and program are generically called the distribution request function.

(A) Available Content List Screen Information

The available content list screen information is used to generate an available content list screen M100, one example of which is shown in FIG. 6. The available content list screen M100 displays information regarding one or more contents that can be rented or purchased using a license ticket. More specifically, the available content list screen M100 displays one or more pieces of management content information which each include information regarding the content ID, content name, and price of the content. The piece of management content information highlighted in FIG. 6 indicates that it is currently selected. The management content information is included in the available content list information.

The user can select a content for rent or purchase on the available content list screen M100.

(B) Use Form Selection Screen

The use form selection screen information is used to generate and control a use form selection screen M150, one example of which is shown in FIG. 7. The use form selection screen M150 is used to receive a selection of either "rental" or "purchase" in regard with the content selected on the available content list screen M100. The use form selection screen M150 includes a selected content field M151 and a use form selection field M152. The selected content field M151 displays the management content information of the content selected on the available content list screen M100. The use form selection field M152 includes items "rental" and "purchase". The use form highlighted in FIG. 7 ("rental") indicates a currently selected use form. More specifically, when "rental" is highlighted, it indicates that "rental" is currently selected as the use form, and when "purchase" is highlighted, it indicates that "purchase" is currently selected as the use form.

The user can select either "rental" or "purchase" using the use form selection field M152.

(C) For-Rent Ticket Selection Screen

Figure 8:
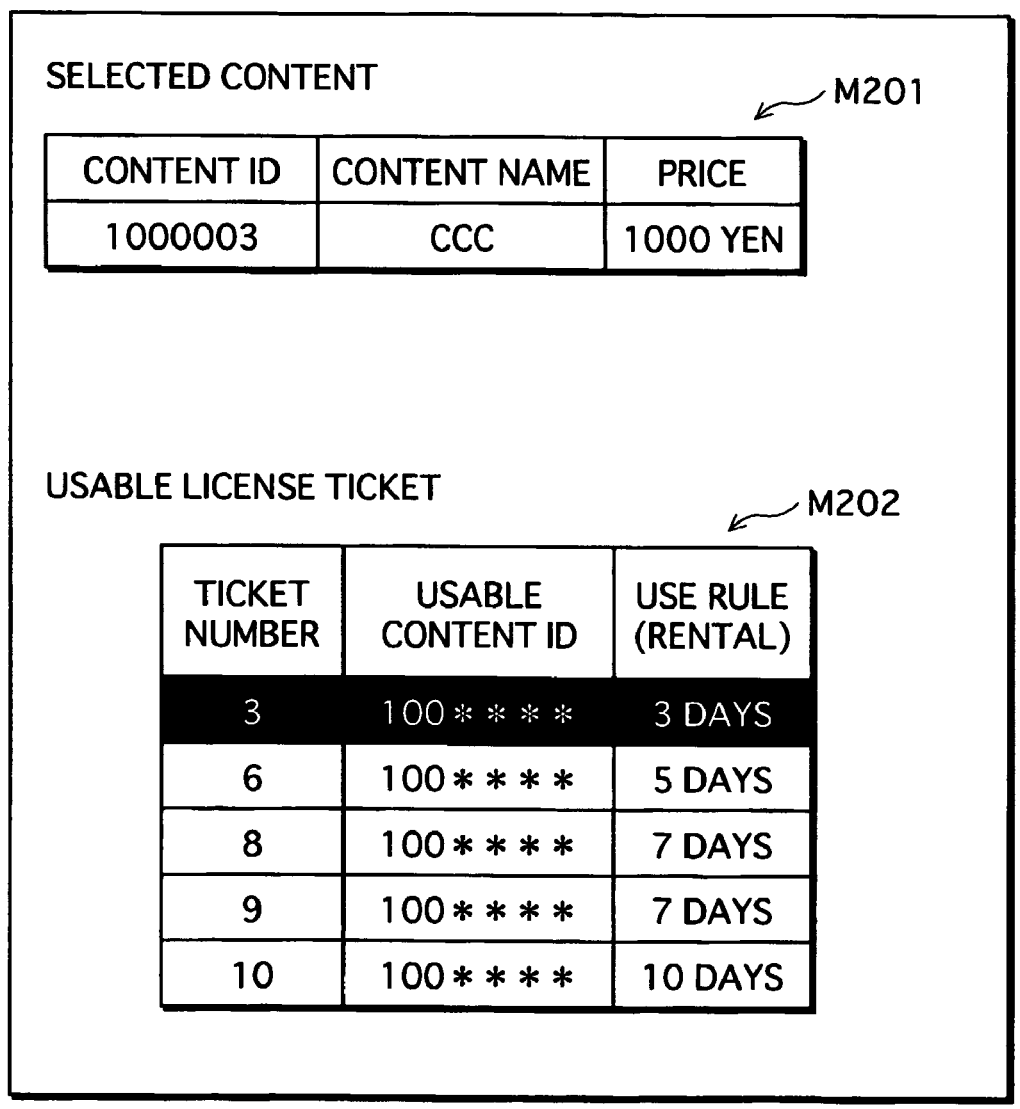
FIG. 8 shows the construction of the for-rent ticket selection screen M200.

The for-rent ticket selection screen information is used to form a for-rent ticket selection screen M200, one example of which is shown in FIG. 8. The for-rent ticket selection screen M200 is used to select a license ticket to be used to rent the content selected on the available content list screen M100. The for-rent ticket selection screen M200 includes a selected content field M201 and a usable license ticket field M202. The selected content field M201 displays the management content information of the content selected on the available content list screen M100. The usable license ticket field M202 displays license tickets that are usable among the license tickets recorded in the recording medium 100. The usable license ticket field M202 includes one or more pieces of for-rent license ticket information which each include columns specifying the ticket number, usable content ID, and use rule (rental). The ticket number column specifies a ticket number of a usable license ticket. The usable content ID column specifies the ID of a content that the user can rent or purchase from the content distribution apparatus 400, the content ID is the same as the usable content ID for the license ticket. The use rule (rental) column specifies a rental period. The for-rent license ticket information highlighted in FIG. 8 indicates that it is currently selected.

The user can select a rental period using the usable license ticket field M202 for the selected content.

(D) For-Purchase Ticket Selection Screen

The for-purchase ticket selection screen information is used to generated a for-purchase ticket selection screen 250, one example of which is shown in FIG. 9. The for-purchase ticket selection screen M250 is used to select a license ticket to be used to purchase the content selected on the available content list screen M100. The for-purchase ticket selection screen M250 includes a selected content field M251 and a usable license ticket field M252. The selected content field M251 displays the management content information of the content selected on the available content list screen M100. The usable license ticket field M252 displays license tickets that are usable among the license tickets recorded in the recording medium 100. The usable license ticket field M252 includes one or more pieces of for-purchase license ticket information which each include columns specifying the ticket number, usable content ID, and use rule (purchase). The ticket number column specifies a ticket number of a usable license ticket. The usable content ID column specifies the ID of a content that the user can rent or purchase from the content distribution apparatus 400, the content ID is the same as the usable content ID for the license ticket. The use rule (purchase) column specifies an amount of money. The for-purchase license ticket information highlighted in FIG. 9 indicates that they are currently selected. It should be noted here that a plurality of pieces of for-purchase license ticket information can be selected for purchasing contents. When a plurality of pieces of for-purchase license ticket information are currently selected, they are all highlighted on the for-purchase ticket selection screen M250.

The user can select a license ticket to be used to purchase a content, using the for-purchase ticket selection screen M250.

(E) Distribution Request Program

Figure 10:
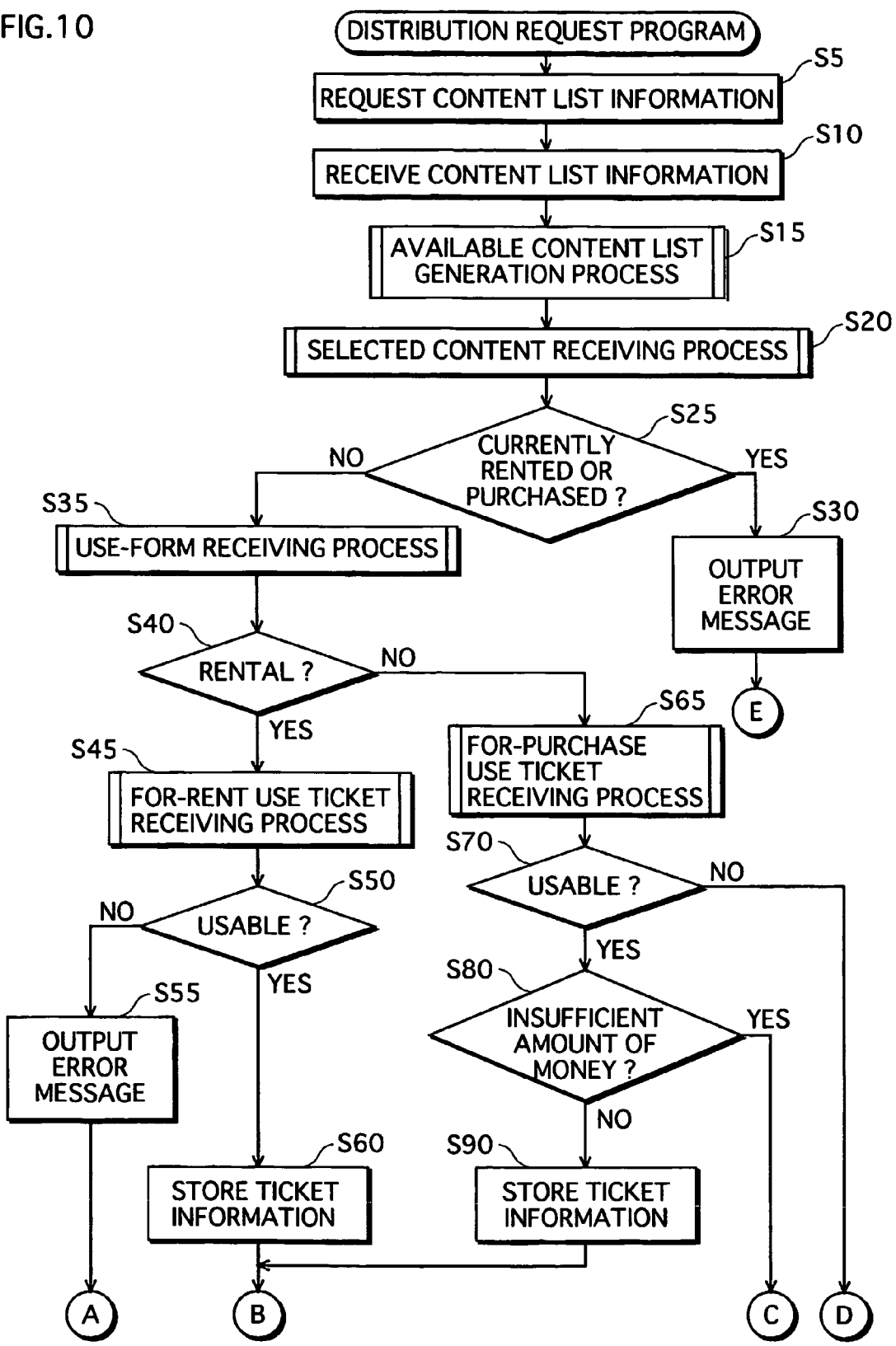
FIG. 10 is a flowchart of the distribution request program, continuing to FIG. 11.
Figure 11:
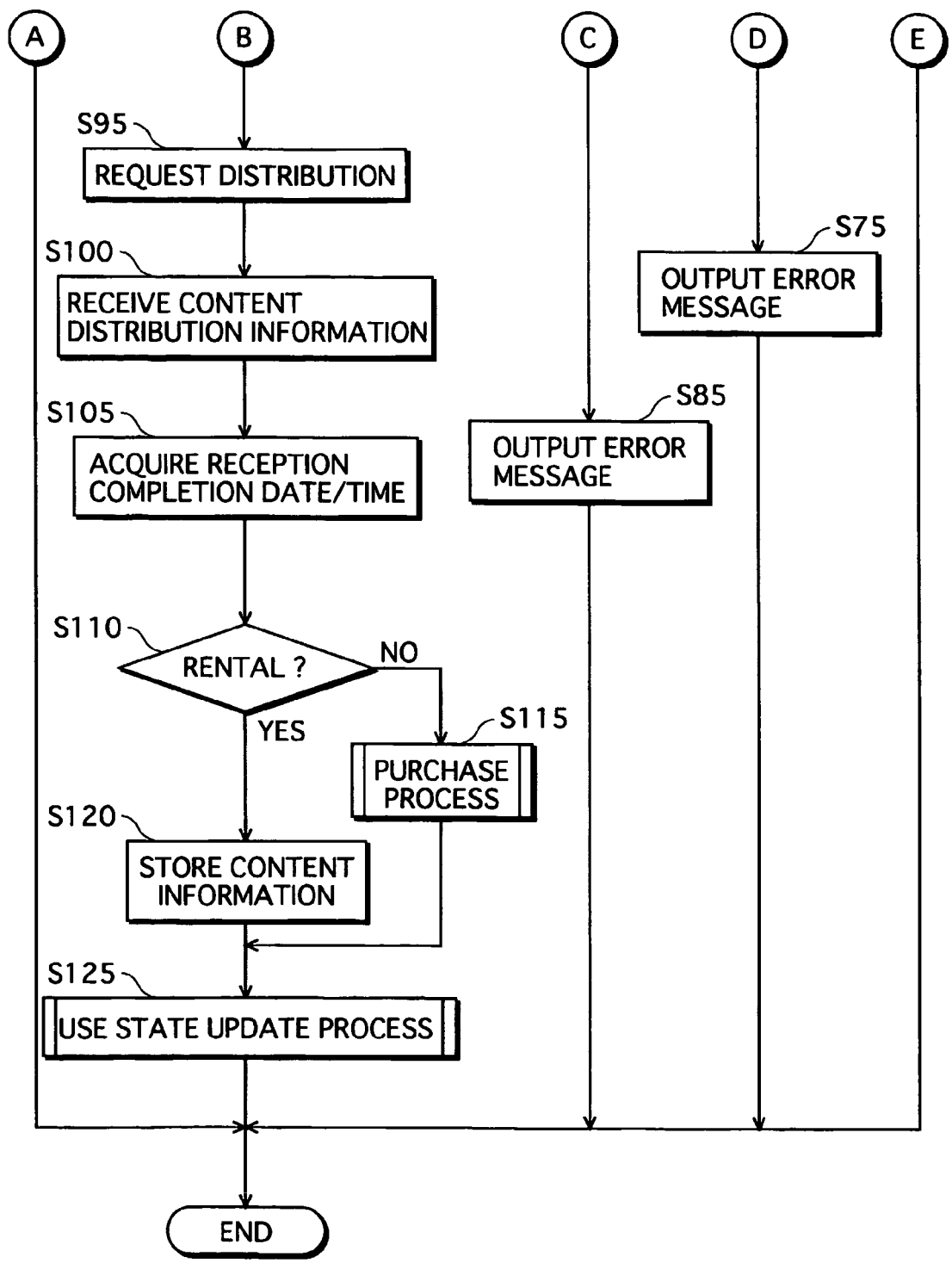
FIG. 11 is a flowchart of the distribution request program, continued from FIG. 10.

The distribution request program, which is read and executed by the reproduction apparatus 200, will be described with reference to the flowcharts shown in FIGS. 10 and 11.

The reproduction apparatus 200 operates in accordance with the distribution request program as follows. The reproduction apparatus 200 generates a content list information request for requesting content list information, and transmits the generated content list information request to the content distribution apparatus 400 via the first input/output unit (step S5). The reproduction apparatus 200 receives the content list information from the content distribution apparatus 400 via the first input/output unit (step S10).

The reproduction apparatus 200 performs an available content list generation process (step S15). The reproduction apparatus 200 then performs a selected content receiving process and acquires the management content information of a content to be requested to be distributed (step S20).

The reproduction apparatus 200 then judges whether the distribution-requested content is currently rented or has been purchased by referring to the content ID and use state table T150 included in the acquired management content information (step S25).

If the distribution-requested content is currently rented or has been purchased, the reproduction apparatus 200 generates not-available information indicating that the distribution-requested content is not available, outputs the generated not-available information, and ends the operation (step S30).

If the distribution-requested content is neither currently rented nor has been purchased, the reproduction apparatus 200 temporarily stores the acquired management content information, and performs a use-form receiving process (step S35).

The reproduction apparatus 200 then judges whether the use form received in the use-form receiving process is "rental" or "purchase" (step S40).

If the received use form is "rental", the reproduction apparatus 200 performs a for-rent use ticket receiving process, and acquires the for-rent license ticket information (step S45). The reproduction apparatus 200 then judges whether the acquired for-rent license ticket information is usable for the content specified by the temporarily stored management content information (step S50). More specifically, if the acquired usable content ID is represented by the wild card, the reproduction apparatus 200 judges whether the numerals of the usable content ID match the content ID included in the temporarily stored management content information; and if the acquired usable content ID is not represented by the wild card, the reproduction apparatus 200 judges whether the usable content ID matches the content ID included in the temporarily stored management content information.

If the reproduction apparatus 200 judges in step S50 that the acquired for-rent license ticket information is not usable for the content specified by the temporarily stored management content information, the reproduction apparatus 200 generates for-rent ticket not-usable information that indicates that the selected for-rent license ticket information is not usable, outputs the generated for-rent ticket not-usable information, and ends the operation (step S55).

If the reproduction apparatus 200 judges in step S50 that the acquired for-rent license ticket information is usable for the content specified by the temporarily stored management content information, the reproduction apparatus 200 temporarily stores the acquired for-rent license ticket information (step S60).

If the reproduction apparatus 200 judges in step S40 that the use form received in the use-form receiving process is "purchase", the reproduction apparatus 200 performs a for-purchase use ticket receiving process, and acquires the for-purchase license ticket information (step S65). The reproduction apparatus 200 then judges whether the acquired for-purchase license ticket information is usable for the content specified by the temporarily stored management content information (step S70). More specifically, if the acquired usable content ID is represented by the wild card, the reproduction apparatus 200 judges whether the numerals of the usable content ID match the content ID included in the temporarily stored management content information; and if the acquired usable content ID is not represented by the wild card, the reproduction apparatus 200 judges whether the usable content ID matches the content ID included in the temporarily stored management content information.

If the reproduction apparatus 200 judges in step S70 that the acquired for-purchase license ticket information is not usable for the content specified by the temporarily stored management content information, the reproduction apparatus 200 generates for-purchase ticket not-usable information that indicates that the selected for-purchase license ticket information is not usable, outputs the generated for-purchase ticket not-usable information, and ends the operation (step S75).

If the reproduction apparatus 200 judges in step S70 that the acquired for-purchase license ticket information is usable for the content specified by the temporarily stored management content information, the reproduction apparatus 200 refers to the acquired for-purchase license ticket information and the temporarily stored management content information and judges whether a total amount of money indicated by the acquired for-purchase license ticket information is smaller than the price indicated by the temporarily stored management content information (step S80).

If the reproduction apparatus 200 judges in step S80 that the total amount of money indicated by the acquired for-purchase license ticket information is smaller than the price indicated by the temporarily stored management content information, the reproduction apparatus 200 generates not-purchasable information indicating that the specified content is not purchasable, outputs the generated not-purchasable information, and ends the operation (step S85). If the reproduction apparatus 200 judges in step S80 that the total amount of money indicated by the acquired for-purchase license ticket information is not smaller than the price indicated by the temporarily stored management content information, the reproduction apparatus 200 temporarily stores the acquired for-purchase license ticket information (step S90).

In accordance with the distribution request program, the reproduction apparatus 200 acquires a content ID from the temporarily stored management content information, generates a content distribution information request containing the acquired content ID, and transmits the generated content distribution information request to the content distribution apparatus 400 via the first input/output unit (step S95).

The reproduction apparatus 200 receives the content distribution information from the content distribution apparatus 400 via the first input/output unit (step S100). After this, the reproduction apparatus 200 acquires reception completion date/time information that indicates the date and time at which the reception of the content distribution information completed, and temporarily stores the acquired reception completion date/time information (step S105). It should be noted here that the content distribution information includes a content ID, an encrypted content key and an encrypted content.

The reproduction apparatus 200 then judges whether the use form is "rental" or "purchase" (step S110).

If it judges in step S110 that the use form is "purchase", the reproduction apparatus 200 performs a purchase process (step S115), and performs a use state update process (step S125).

If it judges in step S110 that the use form is "rental", the reproduction apparatus 200 extracts the content ID, encrypted content key and encrypted content from the received content distribution information, and stores the encrypted content key and the encrypted content into the rental content storage field 131 by associating them with the content ID (step S120), and performs the use state update process (step S125).

(F) Available Content List Generation Process

Figure 12:
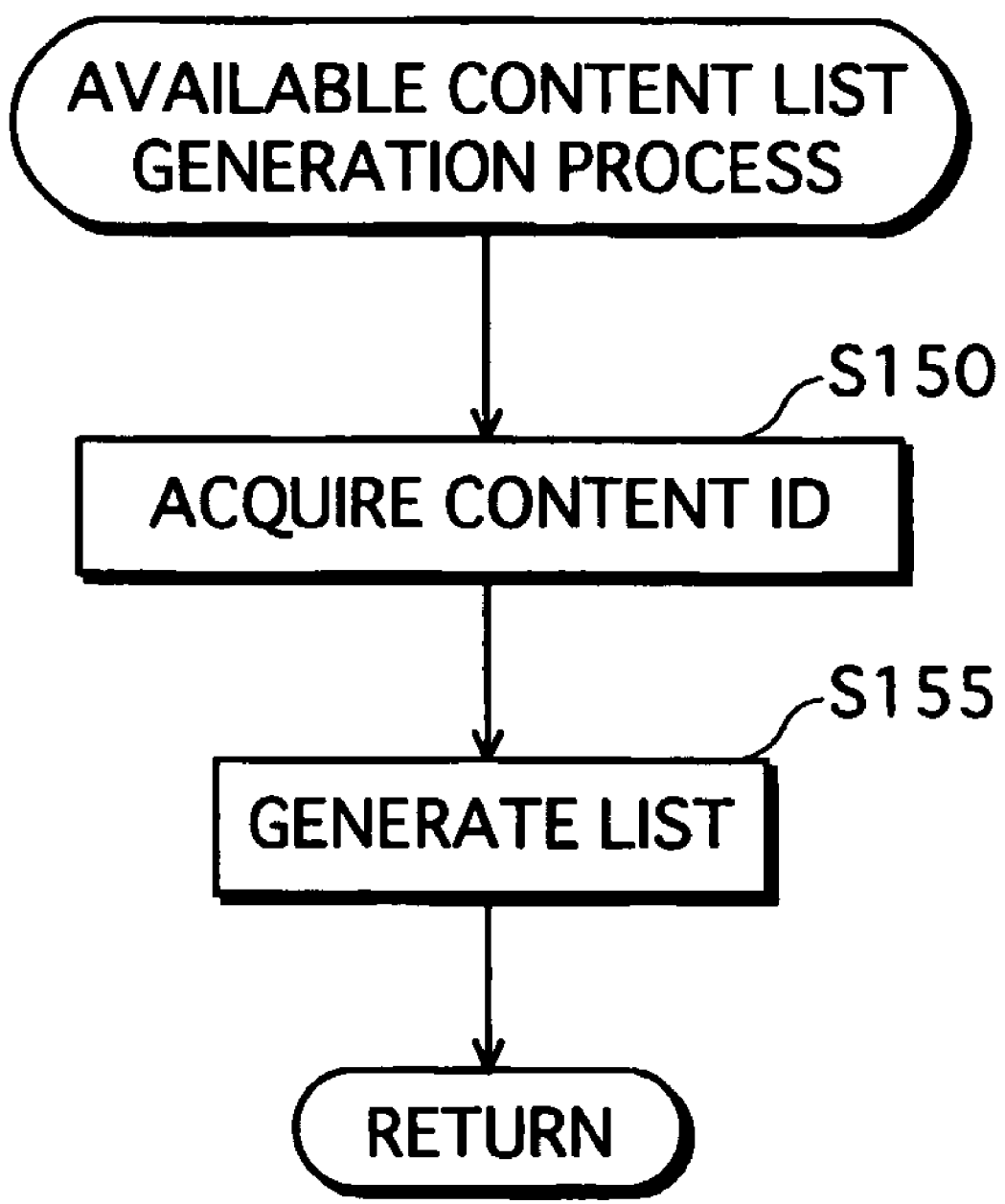
FIG. 12 is a flowchart of the available content list generation process of the distribution request program.

The available content list generation process (step S15 in FIG. 10) of the distribution request program will be described with reference to the flowchart shown in FIG. 12.

The reproduction apparatus 200 refers to the license ticket table T100 and use state table T150 and acquires the usable content IDs, which are shown in the "usable content ID" column, of all the license tickets that are "not used" as indicated in the "use state" column (step S150).

The reproduction apparatus 200 extracts a piece of management content information of the content that can be rented or purchased using the license ticket, using one of the acquired usable content IDs and corresponding one of the content IDs included in the received content list information, and generates apiece of available content list information using the extracted piece of management content information (step S155).

In step S155, the reproduction apparatus 200 repeats the above-stated operation as many times as the number of acquired usable content IDs, but does not extract a piece of management content information that has already been extracted. This operation generates available content list information composed of pieces of management content information corresponding to the contents that can be rented or purchased using the not-used license tickets.

(G) Selected Content Receiving Process

Figure 13:
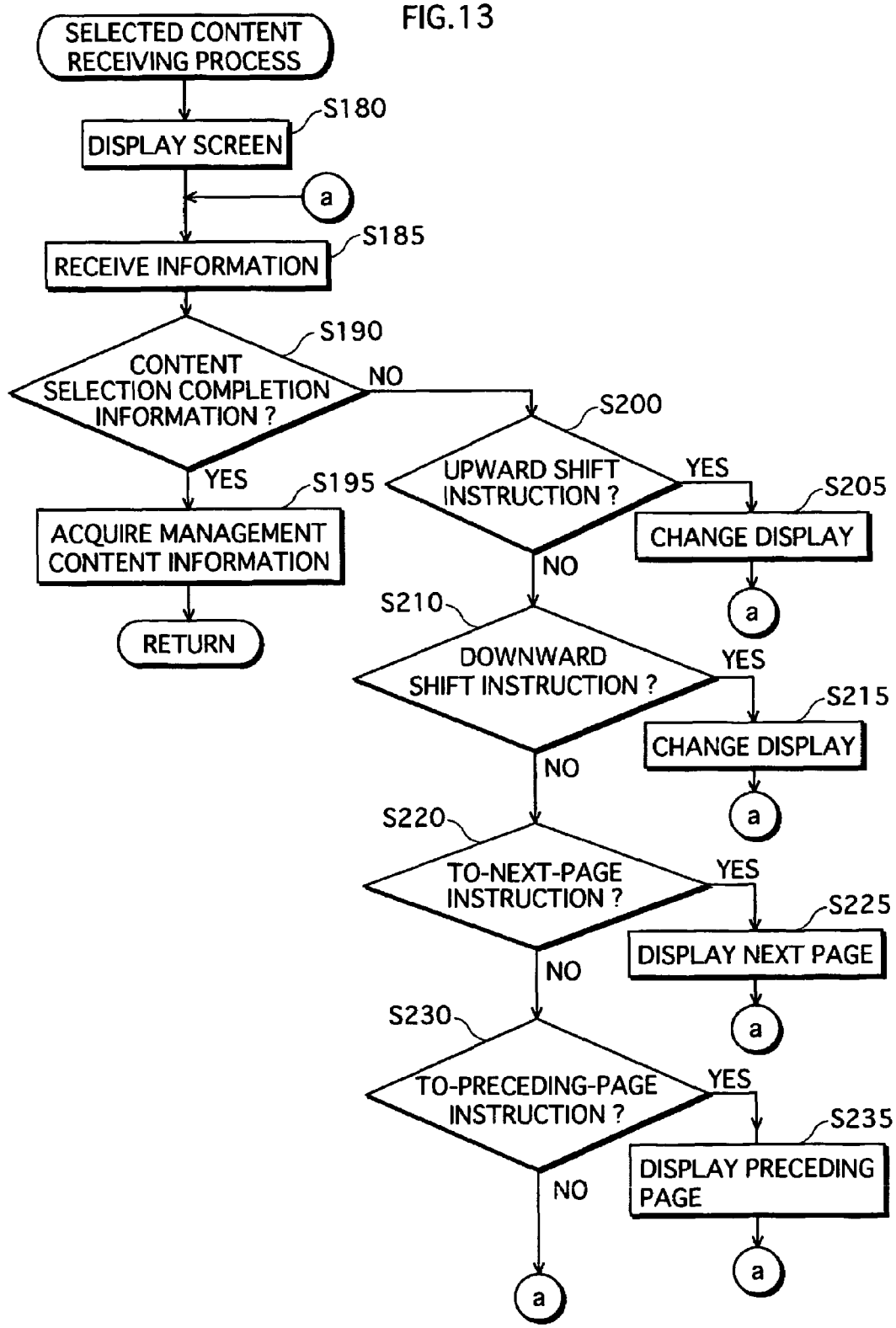
FIG. 13 is a flowchart of the selected content receiving process of the distribution request program.

The selected content receiving process (step S20 in FIG. 10) of the distribution request program will be described with reference to the flowchart shown in FIG. 13.

The reproduction apparatus 200 outputs the available content list information generated in the available content list generation process to the television via the output unit 206, together with the available content list screen M100 so that the television displays the available content list screen M100 and the available content list information (step S180).

The reproduction apparatus 200 then receives information from the user via the remote controller (step S185), and judges whether the received information is content selection completion information that indicates that a content selection has completed (step S190). If it judges in step S190 that the received information is content selection completion information, the reproduction apparatus 200 acquires one or more pieces of management content information that are currently highlighted (step S195), and ends the selected content receiving process.

If it judges in step S190 that the received information is not content selection completion information, the reproduction apparatus 200 judges whether the received information is an upward shift instruction to shift the highlighted display upward by one piece of information from the currently highlighted piece of information (step S200). If it judges in step S200 that the received information is an upward shift instruction, the reproduction apparatus 200 shifts the highlighted information upward by one piece of information from the currently highlighted piece of management content information (step S205), and returns to step S185. For example, if the reproduction apparatus 200 receives an upward shift instruction when the available content list screen M100 shown in FIG. 6 is displayed, the reproduction apparatus 200 shifts the highlighted information from management content information M102 to management content information M101.

If it judges in step S200 that the received information is not an upward shift instruction, the reproduction apparatus 200 judges whether the received information is a downward shift instruction to shift the highlighted display downward by one piece of information from the currently highlighted piece of information (step S210). If it judges in step S210 that the received information is a downward shift instruction, the reproduction apparatus 200 shifts the highlighted information downward by one piece of information from the currently highlighted piece of management content information (step S215), and returns to step S185. For example, if the reproduction apparatus 200 receives a downward shift instruction when the available content list screen M100 shown in FIG. 6 is displayed, the reproduction apparatus 200 shifts the highlighted information from management content information M102 to management content information M103.

If it judges in step S210 that the received information is not a downward shift instruction, the reproduction apparatus 200 judges whether the received information is a to-next-page instruction to display the next page of the currently displayed page of the available content list screen (step S220). If the received information is a to-next-page instruction, the reproduction apparatus 200 displays the next page of the available content list screen (step S225), and returns to step S185.

If the received information is not a to-next-page instruction, the reproduction apparatus 200 judges whether the received information is a to-preceding-page instruction to display the preceding page of the currently displayed page of the available content list screen (step S230). If the received information is a to-preceding-page instruction, the reproduction apparatus 200 displays the preceding page of the available content list screen (step S235), and returns to step S185.

If the received information is not the to-preceding-page instruction, the reproduction apparatus 200 returns to step S185.

(H) Use Form Receiving Process

Figure 14:
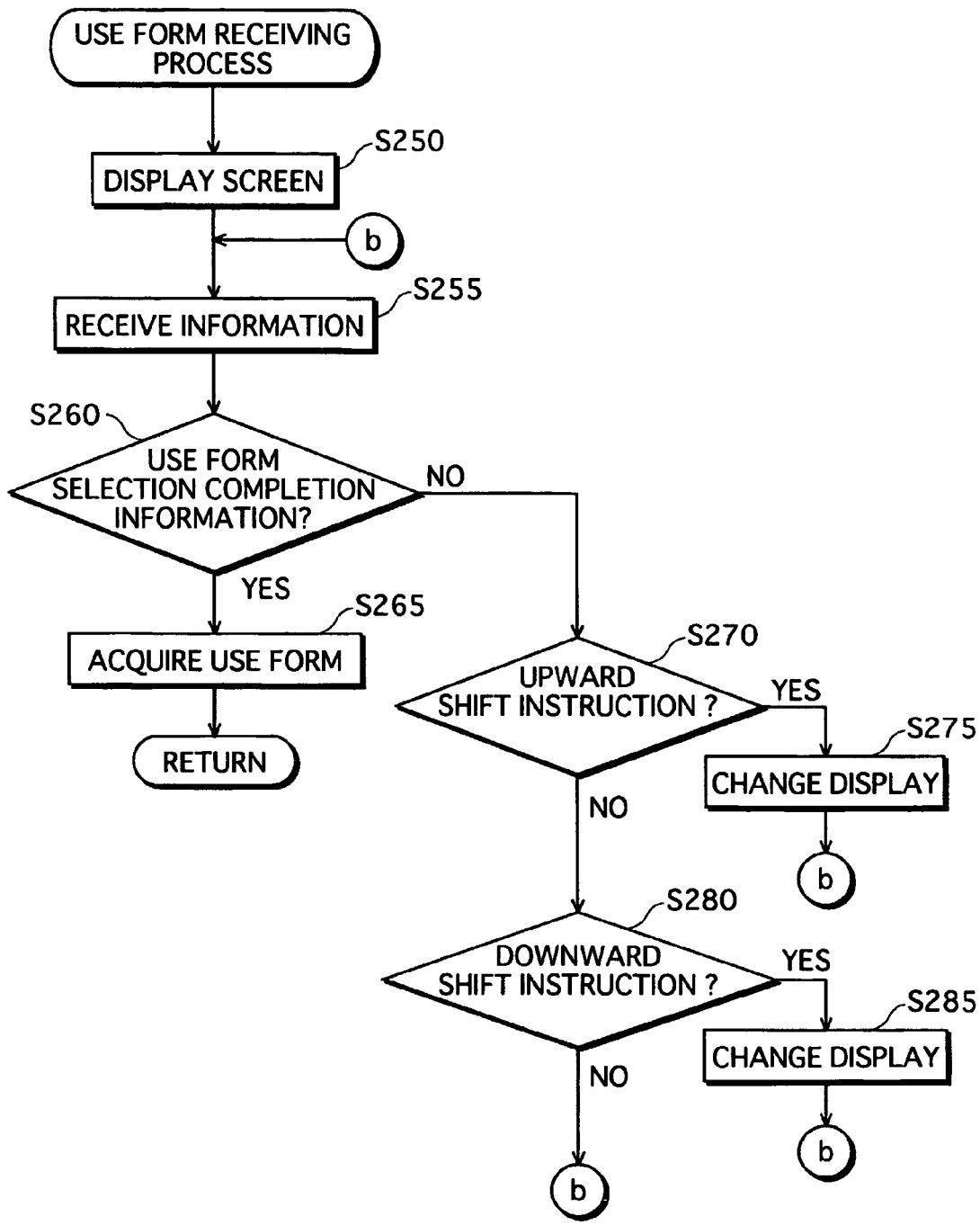
FIG. 14 is a flowchart of the use form receiving process of the distribution request program.

The use form receiving process (step S35 in FIG. 10) of the distribution request program will be described with reference to the flowchart shown in FIG. 14.

The reproduction apparatus 200 outputs the management content information acquired in the selected content receiving process to the television via the output unit 206, together with the use form selection screen M150 so that the television displays the use form selection screen M150 and the management content information (step S250).

The reproduction apparatus 200 then receives information from the user (step S255), and judges whether the received information is use form selection completion information that indicates that a use form selection has completed (step S260). If it judges in step S260 that the received information is use form selection completion information, the reproduction apparatus 200 acquires the use form that is currently highlighted (step S265), and ends the use form receiving process.

If it judges in step S260 that the received information is not use form selection completion information, the reproduction apparatus 200 judges whether the received information is an upward shift instruction (step S270). If it judges in step S270 that the received information is an upward shift instruction, the reproduction apparatus 200 shifts the highlighted use form information upward by one piece of information from the currently highlighted use form information (step S275), and returns to step S255.

If it judges in step S270 that the received information is not an upward shift instruction, the reproduction apparatus 200 judges whether the received information is a downward shift instruction (step S280). If it judges in step S280 that the received information is a downward shift instruction, the reproduction apparatus 200 shifts the highlighted use form information downward by one piece of information from the currently highlighted piece of use form information (step S285), and returns to step S255.

If it judges in step S280 that the received information is not a downward shift instruction, the reproduction apparatus 200 returns to step S255.

(I) For-Rent Use Ticket Receiving Process

Figure 15:
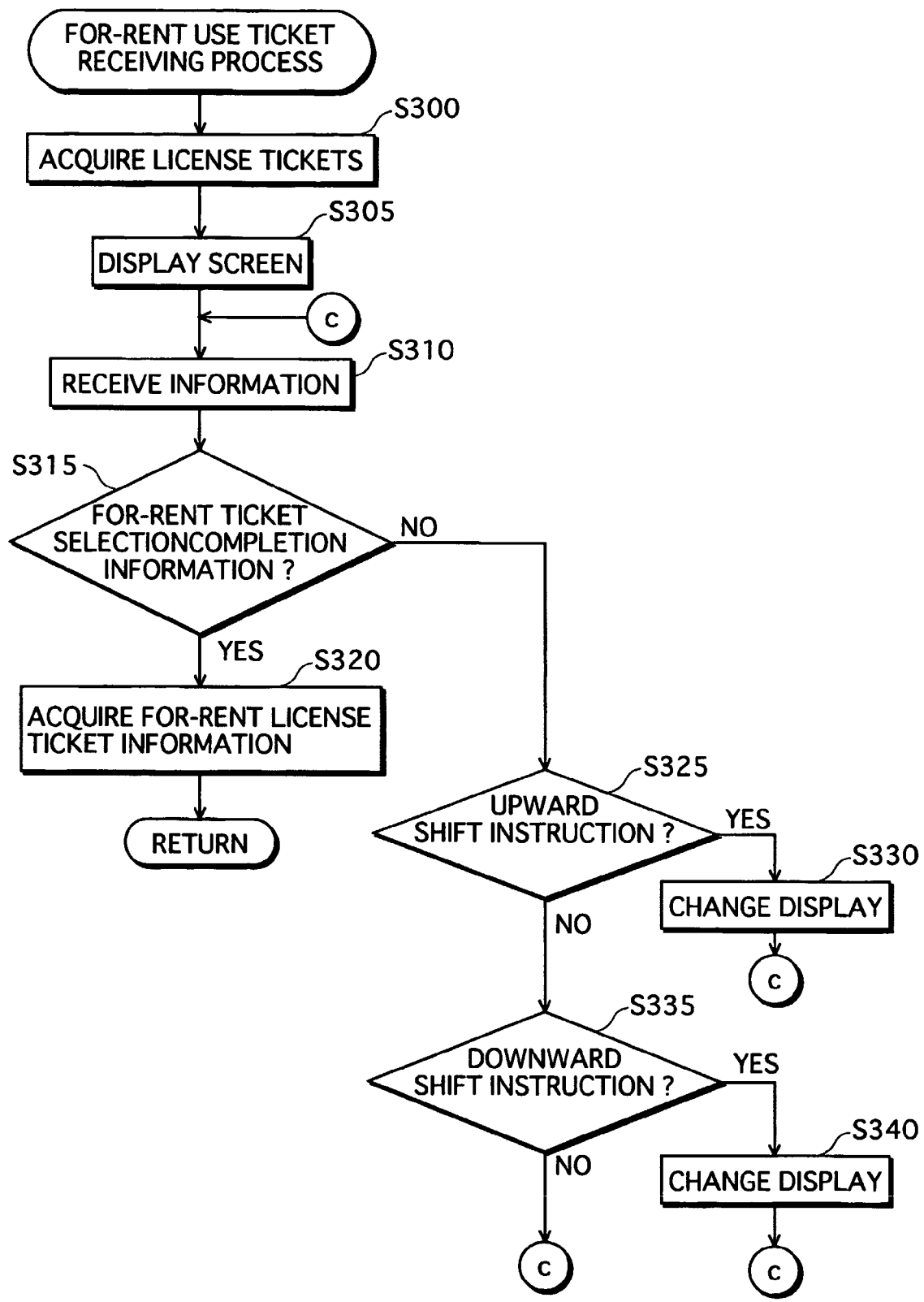
FIG. 15 is a flowchart of the for-rent use ticket receiving process of the distribution request program.

The for-rent use ticket receiving process (step S45 in FIG. 10) of the distribution request program will be described with reference to the flowchart shown in FIG. 15.

The reproduction apparatus 200 refers to the license ticket table T100 and use state table T150 stored in the recording medium 100 and acquires all the license tickets that are "not used" (step S300). The reproduction apparatus 200 then outputs the acquired license tickets and the temporarily stored management content information to the television via the output unit 206, together with the for-rent ticket selection screen M200 (step S305).

The reproduction apparatus 200 then receives information from the user (step S310), and judges whether the received information is for-rent ticket selection completion information that indicates that the selection of for-rent license ticket information has completed (step S315). If it judges in step S315 that the received information is for-rent ticket selection completion information, the reproduction apparatus 200 acquires the piece of for-rent license ticket information that is currently highlighted (step S320), and ends the for-rent use ticket receiving process.

If it judges in step S315 that the received information is not for-rent ticket selection completion information, the reproduction apparatus 200 judges whether the received information is an upward shift instruction (step S325). If it judges in step S325 that the received information is an upward shift instruction, the reproduction apparatus 200 shifts the highlighted for-rent license ticket information upward by one piece of information from the currently highlighted for-rent license ticket information (step S330), and returns to step S310.

If it judges in step S325 that the received information is not an upward shift instruction, the reproduction apparatus 200 judges whether the received information is a downward shift instruction (step S335). If it judges in step S335 that the received information is a downward shift instruction, the reproduction apparatus 200 shifts the highlighted for-rent license ticket information downward by one piece of information from the currently highlighted piece of for-rent license ticket information (step S340), and returns to step S310.

If it judges in step S335 that the received information is not a downward shift instruction, the reproduction apparatus 200 returns to step S310.

(J) For-Purchase Use Ticket Receiving Process

Figure 16:
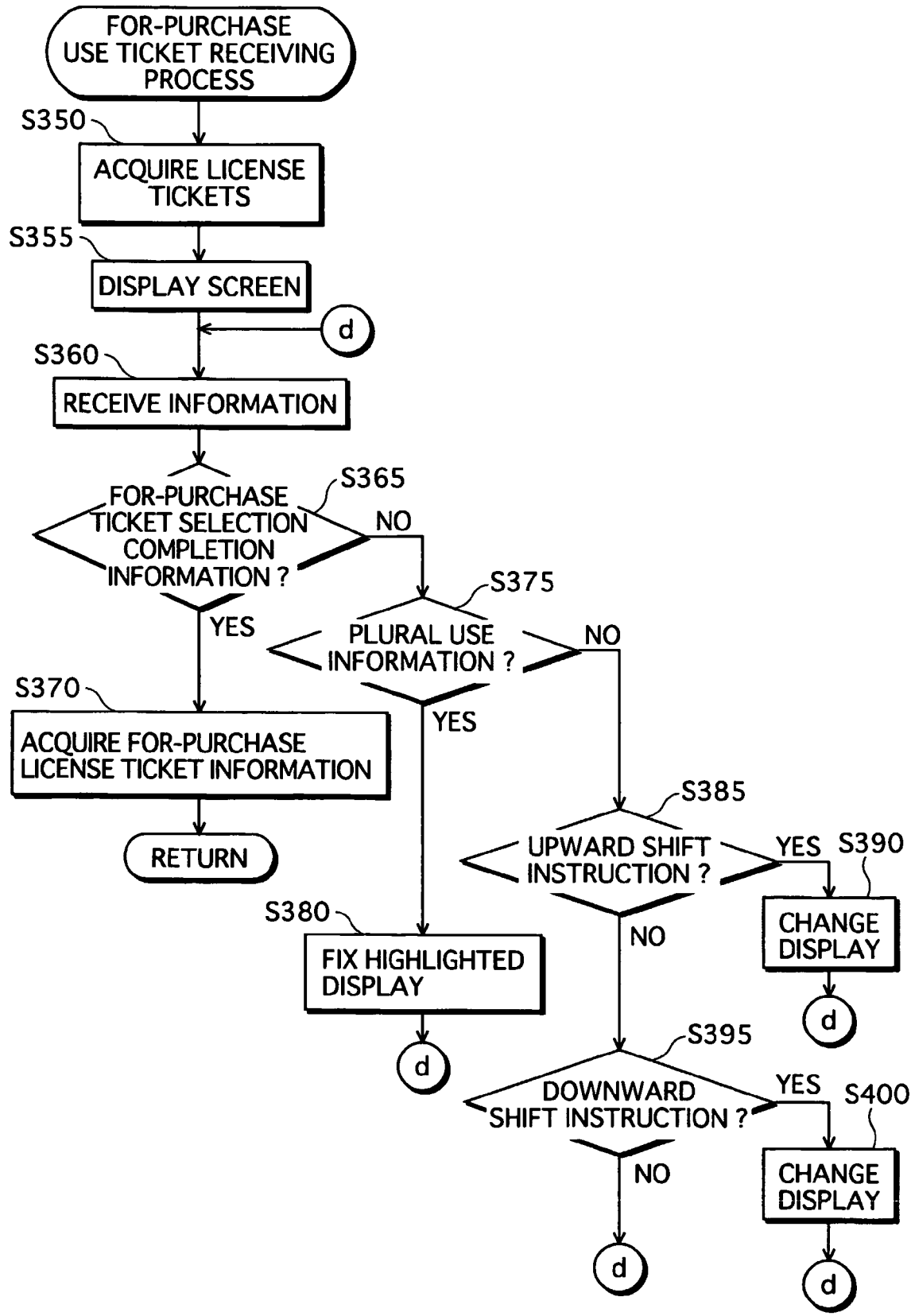
FIG. 16 is a flowchart of the for-purchase use ticket receiving process of the distribution request program.

The for-purchase use ticket receiving process (step S65 in FIG. 10) of the distribution request program will be described with reference to the flowchart shown in FIG. 16.

The reproduction apparatus 200 refers to the license ticket table T100 and use state table T150 stored in the recording medium 100 and acquires all the license tickets that are "not used" (step S350). The reproduction apparatus 200 then outputs the acquired license tickets and the temporarily stored management content information to the television via the output unit 206, together with the for-purchase ticket selection screen M250 (step S355).

The reproduction apparatus 200 then receives information from the user (step S360), and judges whether the received information is for-purchase ticket selection completion information that indicates that the selection of for-purchase license ticket information has been completed (step S365) If it judges in step S365 that the received information is for-purchase ticket selection completion information, the reproduction apparatus 200 acquires the piece of for-purchase license ticket information that is currently highlighted (step S370), and ends the for-purchase use ticket receiving process.

If it judges in step S365 that the received information is not for-purchase ticket selection completion information, the reproduction apparatus 200 judges whether the received information is group use information that indicates that a plurality of license tickets are used (step S375). If it judges in step S375 that the received information is group use information, the reproduction apparatus 200 fixes the highlighted display of the currently highlighted piece of for-purchase license ticket information until the for-purchase ticket selection completion information is received (step S380), and returns to step S360.

If it judges in step S375 that the received information is not group use information, the reproduction apparatus 200 judges whether the received information is an upward shift instruction (step S385). If it judges in step S385 that the received information is an upward shift instruction, the reproduction apparatus 200 shifts the highlighted for-purchase license ticket information upward by one piece of information from the currently highlighted for-purchase license ticket information (step S390), and returns to step S360.

It should be noted here that if group use information has been received before an upward shift instruction is received, and the highlighted display of the currently highlighted for-purchase license ticket information has been fixed, the reproduction apparatus 200 highlights a piece of for-purchase license ticket information that is immediately above the currently highlighted piece of for-purchase license ticket information, while maintaining the current highlighted display of for-purchase license ticket information. If group use information has not been received before the upward shift instruction is received, the reproduction apparatus 200 highlights a piece of for-purchase license ticket information that is immediately above the currently highlighted piece of for-purchase license ticket information, and changes the currently highlighted piece of for-purchase license ticket information to a normal display.

If it judges in step S385 that the received information is not an upward shift instruction, the reproduction apparatus 200 judges whether the received information is a downward shift instruction (step S395). If it judges in step S395 that the received information is a downward shift instruction, the reproduction apparatus 200 shifts the highlighted for-purchase license ticket information downward by one piece of information from the currently highlighted piece of for-purchase license ticket information (step S400), and returns to step S360.

It should be noted here that if group use information has been received before a downward shift instruction is received, and the highlighted display of the currently highlighted for-purchase license ticket information has been fixed, the reproduction apparatus 200 highlights a piece of for-purchase license ticket information that is immediately below the currently highlighted piece of for-purchase license ticket information, while maintaining the current highlighted display of for-purchase license ticket information. If group use information has not been received before an upward shift instruction is received, the reproduction apparatus 200 highlights a piece of for-purchase license ticket information that is immediately below the currently highlighted piece of for-purchase license ticket information, and changes the currently highlighted piece of for-purchase license ticket information to a normal display.

If it judges in step S395 that the received information is not a downward shift instruction, the reproduction apparatus 200 returns to step S360.

(K) Purchase Process

The purchase process (step S115 in FIG. 11) of the distribution request program will be described with reference to the flowchart shown in FIG. 17.

The reproduction apparatus 200 refers to the for-purchase license ticket information acquired in the for-purchase use ticket receiving process, and acquires a ticket-specific encrypted master key from a license ticket corresponding to the acquired for-purchase license ticket information (step S420). In doing this, when a plurality of pieces of for-purchase license ticket information are stored, the reproduction apparatus 200 acquires a ticket-specific encrypted master key from a license ticket that has the smallest ticket number among the license tickets corresponding to the plurality of pieces of for-purchase license ticket information.

The reproduction apparatus 200 then generates a master key by decrypting the acquired ticket-specific encrypted master key using the device key that the reproduction apparatus 200 owns (step S425). The reproduction apparatus 200 then generates a content key by decrypting the encrypted content key, which is contained in the received distribution content information, using the generated master key (step S430). The reproduction apparatus 200 then generates a content by decrypting the encrypted content, which is contained in the received distribution content information, using the generated content key (step S435). The reproduction apparatus 200 stores the generated content into the purchase content storage field 132 (step S440).

(L) Use State Update Process

Figure 18:
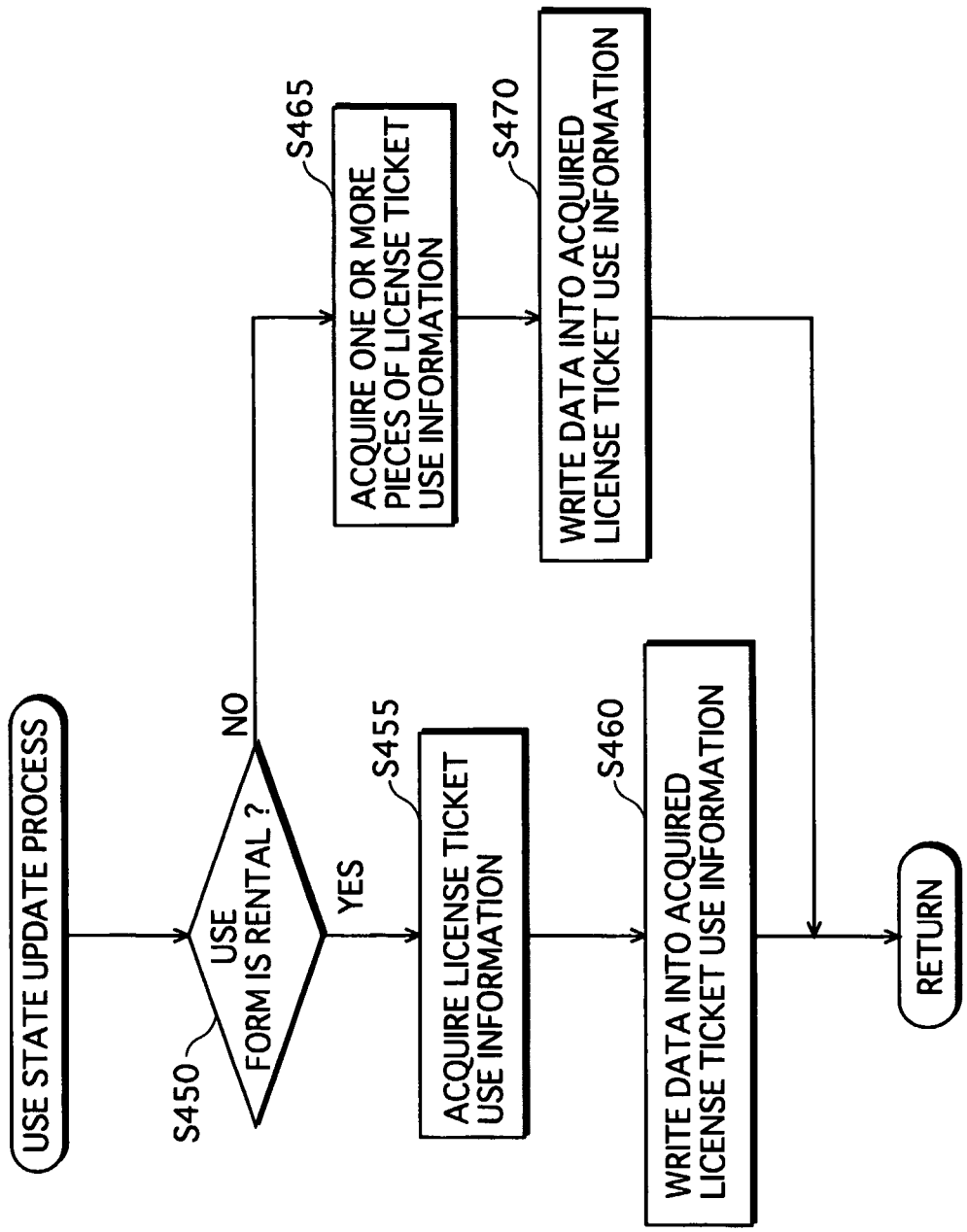
FIG. 18 is a flowchart of the use state update process of the distribution request program.

The use state update process (step S125 in FIG. 11) of the distribution request program will be described with reference to the flowchart shown in FIG. 18.

The reproduction apparatus 200 judges whether the use form is "rental" (step S450). If it judges that the use form is "rental" in step S450, the reproduction apparatus 200 acquires a piece of license ticket use information corresponding to a ticket number indicated by the temporarily stored for-rent license ticket information (step S455). It should be noted here that the piece of license ticket use information acquired in step S455 indicates "not used" in the use state column, and the columns of the use form, use start date/time, content ID, content name, and price are blank.

The reproduction apparatus 200 then changes the use state column from "not used" to "used", writes "rental" in the use form column, and updates the license ticket table T100 by writing information respectively into the columns of use start date/time, content ID, content name, and price by using the temporarily stored for-rent license ticket information and the reception completion date/time in the distribution content information (step S460).

If it judges in step S450 that the use form is not "rental", the reproduction apparatus 200 acquires apiece of license ticket use information corresponding to a ticket number indicated by the temporarily stored for-purchase license ticket information (step S465). In doing this, when a plurality of pieces of for-purchase license ticket information are stored, the reproduction apparatus 200 acquires all pieces of license ticket use information corresponding to the ticket numbers indicated by the pieces of for-purchase license ticket information. It should be noted here that each piece of license ticket use information acquired in step S465 indicates "not used" in the use state column, and the columns of the use form, use start date/time, content ID, content name, and price are blank.

The reproduction apparatus 200 then changes the use state column from "not used" to "used", writes "purchase" in the use form column, and updates the license ticket table T100 by writing information respectively into the columns of use start date/time, content ID, content name, and price by using the temporarily stored for-purchase license ticket information and the reception completion date/time in the distribution content information (step S470). It should be noted here that the reproduction apparatus 200 repeats the above-stated operation as many times as the number of the temporarily stored pieces of for-purchase license ticket information.

1.3 Construction of Reproduction Apparatus 200

The construction of the reproduction apparatus 200 will be described. The reproduction apparatus 200 transmits and receives data to/from the content distribution apparatus 400, inputs and outputs data from/to the recording medium 100, and reproduces a content stored in the recording medium 100.

Figure 19:
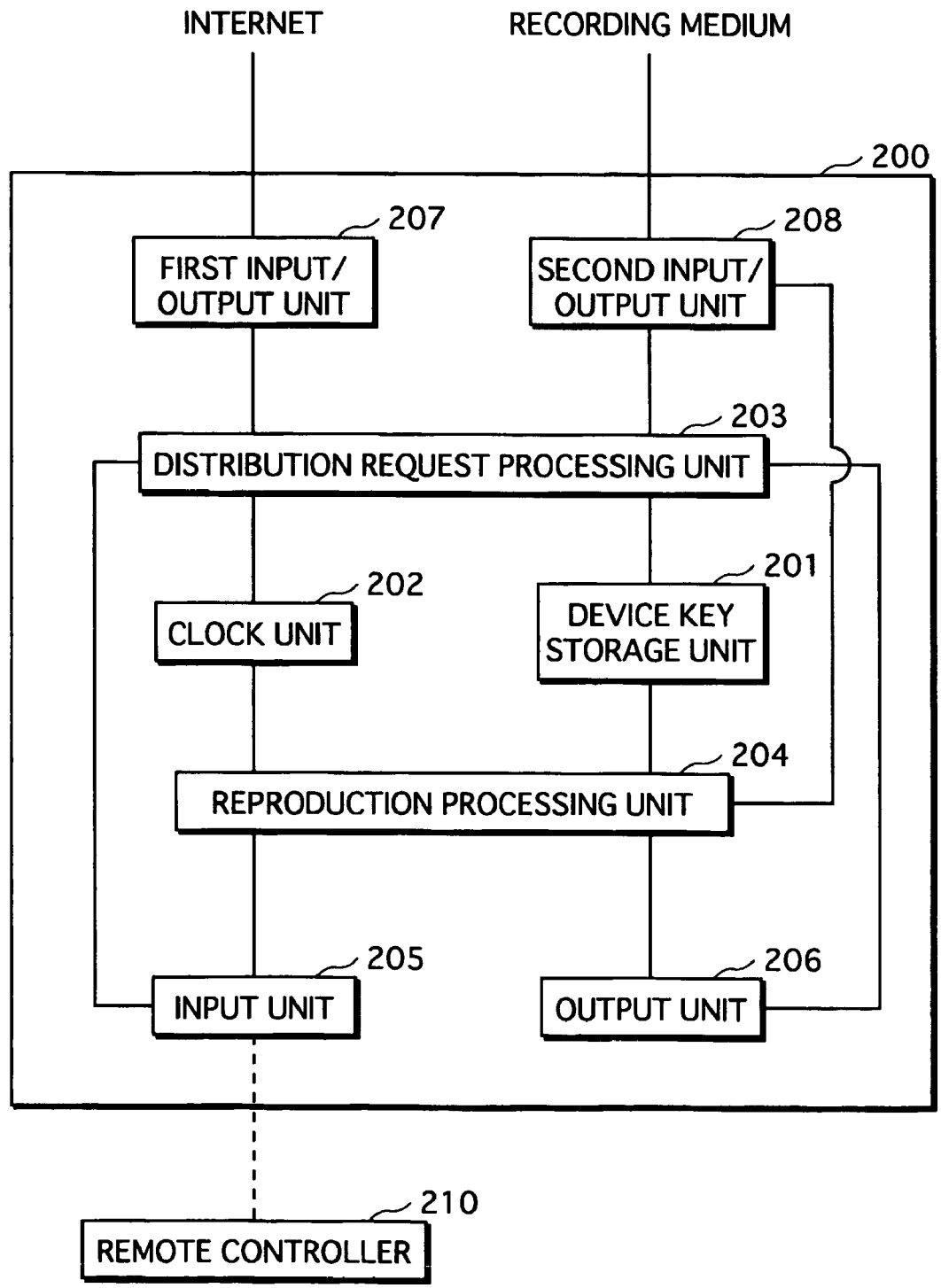
FIG. 19 is a block diagram of the reproduction apparatus 200.

As shown in FIG. 19, the reproduction apparatus 200 includes a device key storage unit 201, a clock unit 202, a distribution request processing unit 203, a reproduction processing unit 204, an input unit 205, an output unit 206, a first input/output unit 207, a second input/output unit 208, and a remote controller 210.

The reproduction apparatus 200 is specifically a computer system that includes a microprocessor, ROM, RAM, a hard disk unit and the like. A computer program is stored in the ROM or the hard disk unit. The microprocessor operates in accordance with the computer program and causes the reproduction apparatus 200 to execute the functions.

The reproduction apparatus 200 is further connected to a television (not illustrated) via the output unit 206. Not limited to the television, the reproduction apparatus 200 may be connected to other apparatuses that can receive video and/or audio data from the reproduction apparatus 200 and output them as images and/or voices.

Note that the explanation of the reproduction apparatuses contained in the first sub-systems 11, . . . 12 is omitted since they have the same construction as the reproduction apparatus 200.

Also note that in the following description, a content key is represented as "CK", and a content is represented as "CNT".

1.3.1 Device Key Storage Unit 201

The device key storage unit 201 stores a device key "DK" that is used to decrypt a ticket-specific encrypted master key.

It should be noted here that device keys are assigned only to such devices (apparatuses) that are permitted to reproduce contents.

1.3.2 Clock Unit 202

The clock unit 202 measures the year, month, day, and time.

1.3.3 Distribution Request Processing Unit 203

The distribution request processing unit 203 requests the content distribution apparatus 400 to distribute a content and receives the requested content from the content distribution apparatus 400 while the recording medium 100 is inserted in the reproduction apparatus 200 and the reproduction apparatus 200 is connected to the content distribution apparatus 400 in a network via the Internet.

When it receives a distribution request start instruction to start a distribution request process from the remote controller 210 via the input unit 205, the distribution request processing unit 203 reads, from the distribution request function storage field 120 of the recording medium 100 via the second input/output unit 208, the available content list screen information, use form selection screen information, for-rent ticket selection screen information, for-purchase ticket selection screen information, and the distribution request program, and executes the read distribution request program.

1.3.4 Reproduction Processing Unit 204

The reproduction processing unit 204 reproduces a content while the recording medium 100 is inserted in the reproduction apparatus 200. The reproduction processing unit 204 stores, in advance, reproducible content list screen information.

The reproducible content list screen information is used to generate a reproducible content list screen M300, one example of which is shown in FIG. 20. The reproducible content list screen M300 is used to display reproducible contents. The reproducible content list screen M300 includes a reproducible content field M301 that displays reproducible contents among the contents recorded in the recording medium 100. The reproducible content field M301 includes columns for the use number, content ID, and content name. A set of the use number, content ID, and content name is called reproducible content information. The reproducible content field M301 displays one or more pieces of reproducible content information.

The use number is a serial number assigned to each piece of license ticket use information, and corresponds to the ticket number of the license ticket. The content ID is an identifier uniquely assigned to each content. The content name is a name of a content identified by the content ID of the same piece of reproducible content information. The piece of reproducible content information highlighted in FIG. 20 indicates that it is currently selected. The user can select a content to reproduce, on the reproducible content list screen M300.

It should be noted here that although in FIG. 20, two pieces of reproducible content information are displayed, five pieces of the information may be displayed as is the case with the available content list screen M100. Also, if there are six or more pieces of reproducible content information to be displayed, the display of the screen may be changed from the currently displayed page to the next or preceding page.

The reproduction processing unit 204 receives a content reproduction start instruction, which instructs to start a content reproduction process, from the remote controller 210 via the input unit 105. Upon receiving this instruction, the reproduction processing unit 204 operates as follows.

First, the reproduction processing unit 204 acquires a current date/time from the clock unit 202, and acquires a piece of license ticket use information from the use state table T150. The reproduction processing unit 204 then judges whether the use state column of the acquired license ticket use information indicates "in use". If the use state column of the acquired license ticket use information indicates "in use", the reproduction processing unit 204 calculates a lapsed time from the use start date/time using the use start date/time contained the acquired license ticket use information and the date/time acquired from the clock unit 202. The reproduction processing unit 204 then judges whether the calculated lapsed time is within a permitted rental period using the calculated lapsed time and the permitted rental period which is indicated in the use rule column of a license ticket that corresponds to the acquired piece of license ticket use information. If it judges that the lapsed time is not within the permitted rental period, the reproduction processing unit 204 updates the acquired piece of license ticket use information by changing the use state to "used". The reproduction processing unit 204 updates the whole use state table T150 by repeating the above-described operation as many times as the number of pieces of license ticket use information contained in the use state table T150.

After this, the reproduction processing unit 204 acquires, from the updated use state table T150, pieces of license ticket use information in which "in use" is written in the use state column and pieces of license ticket use information in which "used" is written in the use state column and "purchase" is written in the use form column, and temporarily stores the acquired pieces of license ticket use information. In doing this, when a same content ID is commonly contained in a plurality of acquired pieces of license ticket use information with "used" in the use state column and "purchase" in the use form column, the reproduction processing unit 204 temporarily stores one among the pieces of license ticket use information that has the smallest use number.

The reproduction processing unit 204 generates the reproducible content information from the acquired license ticket use information, and outputs the generated reproducible content information to the television via the output unit 206, together with the reproducible content list screen M300.

When it receives an upward shift instruction from the remote controller 210 via the input unit 205, the reproduction processing unit 204 shifts the highlighted display from the currently highlighted piece of reproducible content information to a piece of reproducible content information that is immediately above the currently highlighted piece of reproducible content information. When it receives a downward shift instruction from the remote controller via the input unit 205, the reproduction processing unit 204 shifts the highlighted display from the currently highlighted piece of reproducible content information to a piece of reproducible content information that is immediately below the currently highlighted piece of reproducible content information.

When it receives reproducible content selection completion information, which indicates that a selection of a piece of reproducible content information has been completed, from the remote controller 210 via the input unit 205, the reproduction processing unit 204 acquires the currently highlighted piece of reproducible content information, and further acquires a piece of license ticket use information that has the same use number as the acquired piece of reproducible content information from the temporarily stored pieces of license ticket use information. The reproduction processing unit 204 then determines which of "rental" and "purchase" the acquired piece of license ticket use information indicates in the use form column.

If the acquired piece of license ticket use information indicates "purchase", the reproduction processing unit 204 extracts from the purchase content storage field 132 a content "CNT" corresponding to a content ID contained in the acquired piece of license ticket use information, and reproduces the extracted content "CNT".

If the acquired piece of license ticket use information indicates "rental", the reproduction processing unit 204 acquires from the rental content storage field 131 a pair of an encrypted content key and an encrypted content corresponding to a content ID contained in the acquired piece of license ticket use information, and reproduces the extracted content "CNT". The reproduction processing unit 204 then acquires ticket-specific encrypted master key "Enc(DK, WK)" from a license ticket corresponding to the use number of the acquired piece of license ticket use information. The reproduction processing unit 204 decrypts the acquired ticket-specific encrypted master key "Enc(DK, WK)" using the device key "DK" owned by the reproduction apparatus 200, and obtains the master key "WK". The reproduction processing unit 204 then decrypts the acquired encrypted content key "Enc(WK, CK)" using the obtained master key "WK", and obtains content key "CK". The reproduction processing unit 204 then decrypts the acquired encrypted content "Enc(CK, CNT)" using the obtained the content key "CK", and obtains content "CNT". The reproduction processing unit 204 reproduces the obtained content "CNT". The reproduction processing unit 204 deletes the obtained content "CNT" after reproducing it.

1.3.5 Input Unit 205

The input unit 205 receives information from the remote controller 210, and outputs the received information to the distribution request processing unit 203 or the reproduction processing unit 204.

1.3.6 Output Unit 206

The output unit 206 receives information from the distribution request processing unit 203 or the reproduction processing unit 204, and outputs the received information to the television.

1.3.7 First Input/Output Unit 207

The first input/output unit 207 receives information from the distribution request processing unit 203, and transmits the received information to the content distribution apparatus 400 via the Internet. The first input/output unit 207 also receives information from the content distribution apparatus 400 via the Internet, and outputs the received information to the distribution request processing unit 203.

1.3.8 Second Input/Output Unit 208

The second input/output unit 208 reads information from the recording medium 100 and outputs the read information to the distribution request processing unit 203 or the reproduction processing unit 204.

The second input/output unit 208 also receives information from the distribution request processing unit 203 or the reproduction processing unit 204, and outputs the received information to the recording medium 100.

1.3.9 Remote Controller 210

The remote controller 210 receives a certain piece of information when the user performs a corresponding key operation thereon, and outputs the received information to the input unit 105.

1.4 Construction of License Ticket Generation Apparatus 300

The construction of the license ticket generation apparatus 300 will be described. The license ticket generation apparatus 300 generates a license ticket, and writes the generated license ticket into the recording medium.

Figure 21:
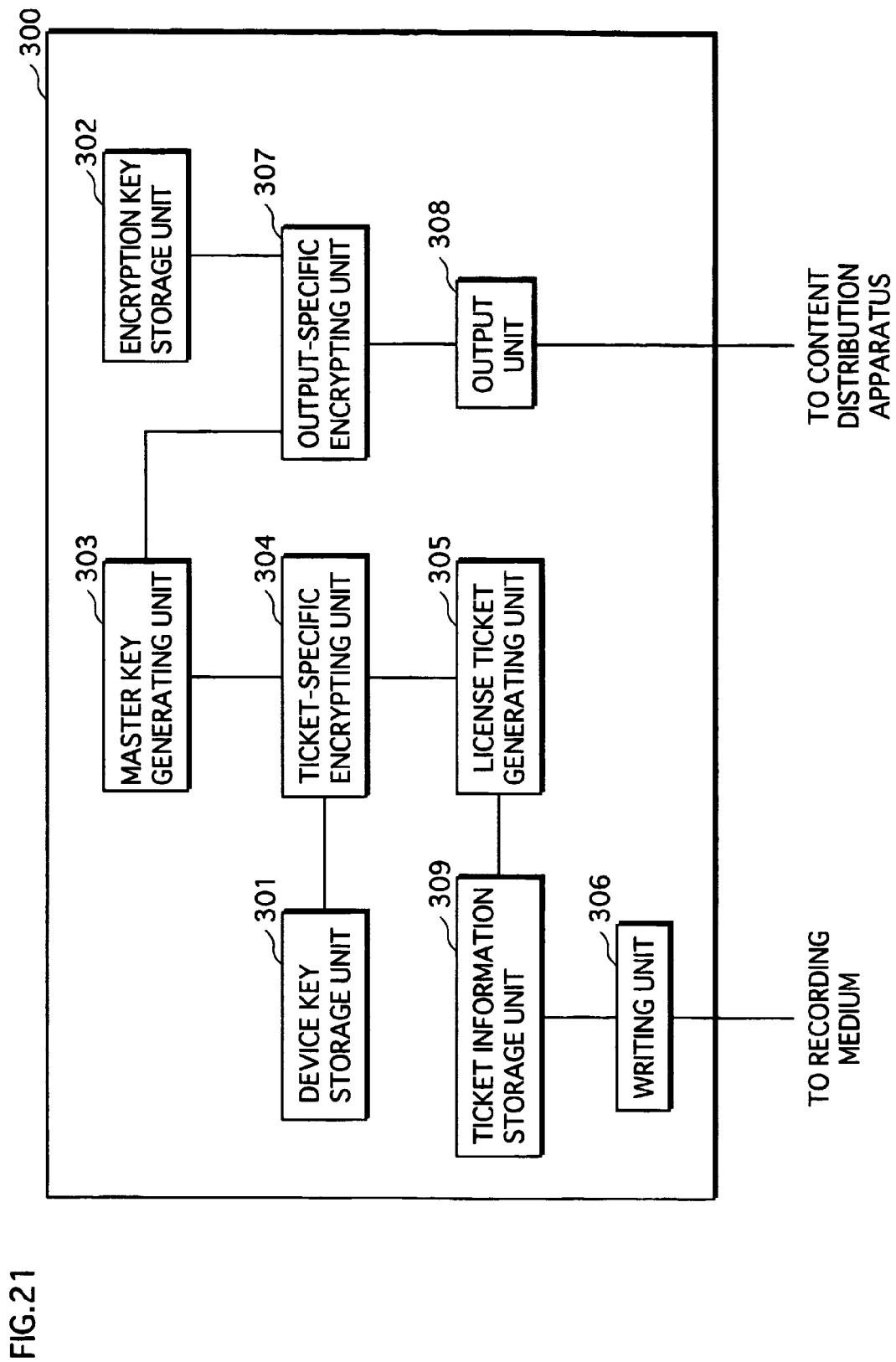
FIG. 21 is a block diagram of the license ticket generation apparatus 300.

As shown in FIG. 21, the license ticket generation apparatus 300 includes a device key storage unit 301, an encryption key storage unit 302, a master key generating unit 303, a ticket-specific encrypting unit 304, a license ticket generating unit 305, a writing unit 306, an output-specific encrypting unit 307, an output unit 308, and a ticket information storage unit 309.

The license ticket generation apparatus 300 is specifically a computer system that includes a microprocessor, ROM, RAM, a hard disk unit, a display unit, a keyboard, a mouse, a modem and the like. A computer program is stored in the ROM or the hard disk unit. The microprocessor operates in accordance with the computer program and causes the license ticket generation apparatus 300 to execute the functions.

The license ticket generation apparatus 300 generates a master key, generates a license ticket using the generated master key, and writes the generated license ticket into the recording medium. The license ticket generation apparatus 300 also mass-produces the recording medium in which the license ticket has been written.

1.4.1 Device Key Storage Unit 301

The device key storage unit 301 stores a device key that is used to encrypt a master key by the common key encryption system.

It should be noted here that the device key stored in the device key storage unit 301 is the same as the device key stored in the reproduction apparatus 200.

1.4.2 Encryption Key Storage Unit 302

The encryption key storage unit 302 stores an encryption key "K" that is used to encrypt, by the common key encryption system, the master key generated by the master key generating unit 303.

1.4.3 Master Key Generating Unit 303

The master key generating unit 303 generates master key "WK" using a random number, and outputs the generated master key "WK" to the ticket-specific encrypting unit 304 and the output-specific encrypting unit 307.

1.4.4 Ticket Information Storage Unit 309

The ticket information storage unit 309 stores the license ticket table T100 and the use state table T150 generated by the license ticket generating unit 305.

The license ticket table T100 and the use state table T150 stored in the ticket information storage unit 309 are to be recorded into the recording medium 100. It should be noted here that the license ticket use information constituting the use state table T150 has the use number and "not used" in the use state column, and the remaining columns are blank.

The ticket information storage unit 309 also stores a distribution request function in advance.

1.4.5 Ticket-Specific Encrypting Unit 304

The ticket-specific encrypting unit 304 generates ticket-specific encrypted master key "Enc(DK, WK)" by encrypting the master key "WK", which is received from the master key generating unit 303, using the device key "DK" stored in the device key storage unit 301, and stores the generated ticket-specific encrypted master key "Enc(DK, WK)".

1.4.6 License Ticket Generating Unit 305

The license ticket generating unit 305 stores, in advance, usable content IDs and use rules associated with the usable content IDs, each use rule being composed of information written in a pair of columns "rental" and "purchase".

The license ticket generating unit 305 generates the license ticket table T100 by using the ticket-specific encrypted master keys "Enc (DK, WK)" and the usable content IDs and the use rules prestored therein, and stores the generated license ticket table T100 into the ticket information storage unit 309.

The license ticket generating unit 305 further generates the use state table T150, and stores the generated use state table T150 in the ticket information storage unit 309.

1.4.7 Writing Unit 306

The writing unit 306 writes the license ticket table T100, use state table T150, and distribution request function stored in the ticket information storage unit 309, into the recording medium 100.

It should be noted here that the license ticket table T100, use state table T150, and distribution request function may be written into the recording medium 100 by stamping them onto the recording medium 100. This enables the recording medium 100 to be produced at a low cost.

1.4.8 Output-Specific Encrypting Unit 307

The output-specific encrypting unit 307 generates distributor-specific encrypted master key "Enc(K, WK)" by encrypting the master key "WK", which is received from the master key generating unit 303, using the encryption key "K" stored in the encryption key storage unit 302, and transmits the generated distributor-specific encrypted master key "Enc(K, WK)" to the content distribution apparatus 400 via the output unit 308.

1.4.9 Output Unit 308

The output unit 308 receives information from the output-specific encrypting unit 307, transmits the received information to the content distribution apparatus 400.

1.5 Construction of Content Distribution Apparatus 400

The construction of the content distribution apparatus 400 will be described. The content distribution apparatus 400 transmits and receives data to/from the reproduction apparatus 200, and encrypts contents.

Figure 22:
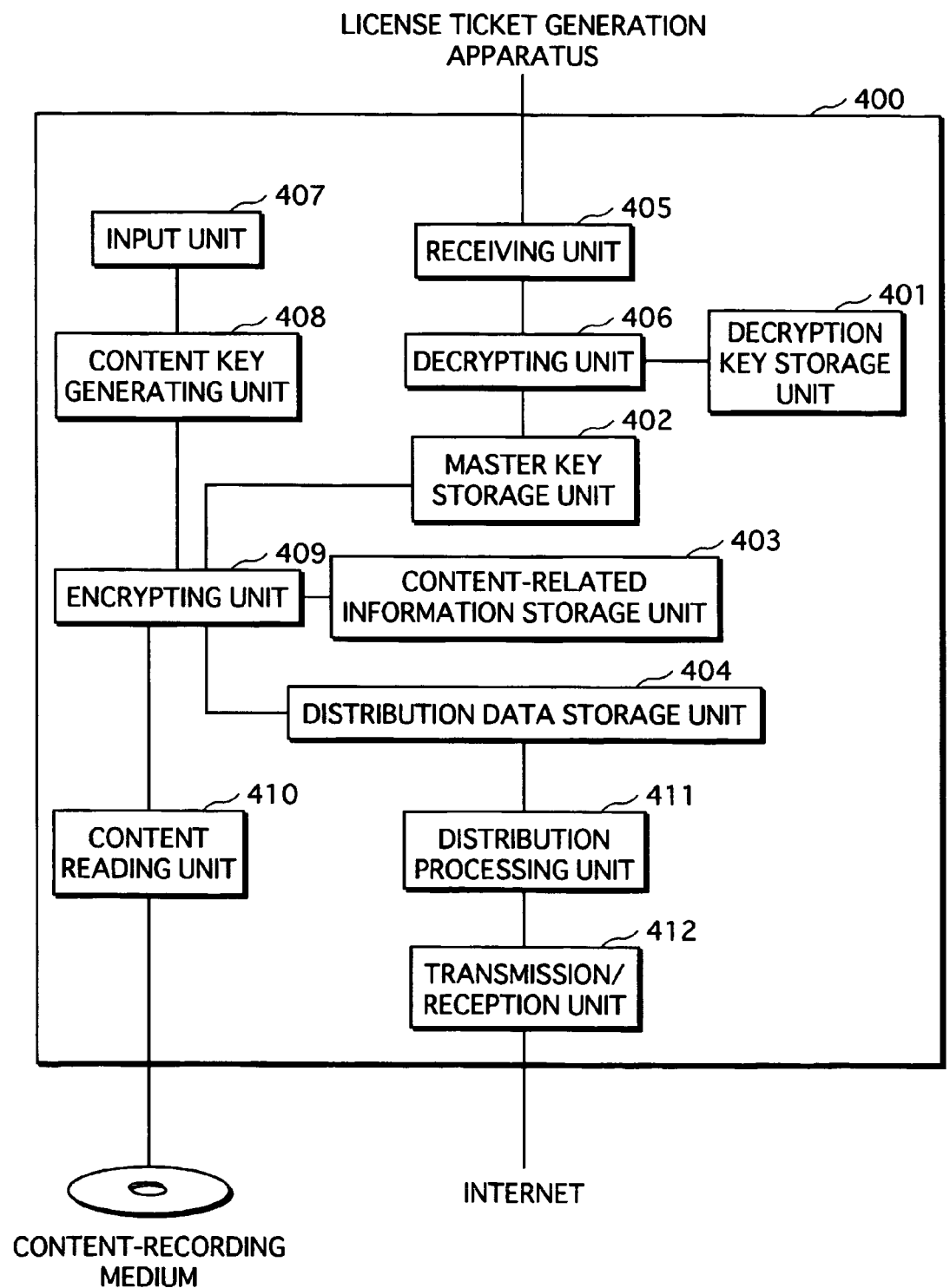
FIG. 22 is a block diagram of the content distribution apparatus 400.

As shown in FIG. 22, the content distribution apparatus 400 includes a decryption key storage unit 401, a master key storage unit 402, a content-related information storage unit 403, a distribution data storage unit 404, a receiving unit 405, a decrypting unit 406, an input unit 407, a content key generating unit 408, an encrypting unit 409, a content reading unit 410, a distribution processing unit 411, and a transmission/reception unit 412.

The content distribution apparatus 400 is specifically a computer system that includes a microprocessor, ROM, RAM, a hard disk unit, a display unit, a keyboard, a mouse, a modem and the like. A computer program is stored in the ROM or the hard disk unit. The microprocessor operates in accordance with the computer program and causes the content distribution apparatus 400 to execute the functions.

A content-recording medium containing a content ID and a content can be inserted into and removed from the content distribution apparatus 400. The content distribution apparatus 400 encrypts a content while the content-recording medium containing the content is inserted therein.

1.5.1 Decryption Key Storage Unit 401

The decryption key storage unit 401 stores a decryption key that is used to decrypt the distributor-specific master key generated by the license ticket apparatus 300.

1.5.2 Master Key Storage Unit 402

The master key storage unit 402 stores a master key that is generated by the decrypting unit 406 as a result of decryption.

1.5.3 Content-Related Information Storage Unit 403

The content-related information storage unit 403 stores a content-related information table T400, one example of which is shown in FIG. 23.

The content-related information table T400 includes columns for the content ID, content name, and price. The content-related information table T400 stores one or more sets of the content ID, content name, and price.

The content ID is an identifier uniquely assigned to each content. The content name is a name of a content identified by the content ID of the same set of information. The price is a price for purchasing the content.

1.5.4 Distribution Data Storage Unit 404

The distribution data storage unit 404 includes an encrypted content management table T410, one example of which is shown in FIG. 24.

The encrypted content management table T410 includes columns for the "content ID", "content name", "encrypted content key", "encrypted content", and "price". The encrypted content management table T410 stores one or more sets of a content ID, content name, encrypted content key, encrypted content, and price.

The content ID is an identifier uniquely assigned to each content. The content name is a name of a content. The encrypted content key is a result of encrypting a content key using a master key. The encrypted content is a result of encrypting a content using the content key. The price is a price for purchasing the content.

As explained earlier in the description of the recording medium 100, "CNTn" ("n" represents a number) represents "content", and "CKn" ("n" represents a number) represents "content key". Different content keys are assigned to respective contents.

1.5.5 Receiving Unit 405

The receiving unit 405 receives the distributor-specific encrypted master key "Enc(K, WK)" from the license ticket generation apparatus 300, and outputs the received distributor-specific encrypted master key "Enc(K, WK)" to the decrypting unit 406.

1.5.6 Decrypting Unit 406

The decrypting unit 406, upon receiving the distributor-specific encrypted master key "Enc(K, WK)" from the receiving unit 405, acquires a decryption key from the decryption key storage unit 401, and decrypts the distributor-specific encrypted master key "Enc (K, WK)" using the acquired decryption key, and writes a master key "WK", which is obtained as a result of the decryption, into the master key storage unit 402.

1.5.7 Input Unit 407

The input unit 407 receives an encryption start instruction to start encrypting a content, and outputs the received encryption start instruction to the content key generating unit 408.

1.5.8 Content Key Generating Unit 408

The content key generating unit 408, upon receiving an encryption start instruction from the input unit 407, generates content key "CK" using a random number, and outputs the generated content key "CK" to the encrypting unit 409.

It should be noted here that the content key generating unit 408 generates a different content key each time it receives an encryption start instruction.

1.5.9 Encrypting Unit 409

The encrypting unit 409, upon receiving the content key "CK" from the content key generating unit 408, outputs a content acquisition request, which requests acquisition of a content ID and content "CNT", to the content reading unit 410, and receives the requested content ID and content "CNT" from the content reading unit 410.

The encrypting unit 409 then generates encrypted content "Enc (CK, CNT)" by encrypting the content "CNT" using the content key "CK" by the common key encryption system.

The encrypting unit 409 then acquires master key "WK" from the master key storage unit 402, and generates encrypted content key "Enc(WK, CK)" by encrypting the content key "CK" using the acquired master key "WK" by the common key encryption system.

The encrypting unit 409 also acquires, from the content-related information table T400, a content name and a price that correspond to the content ID received from the content reading unit 410.

The encrypting unit 409 then writes a set of the generated encrypted content "Enc(CK, CNT)", the generated encrypted content key "Enc(WK, CK)", the content ID received from the content reading unit 410, and the content name and the price acquired from the content-related information table T400, to the distribution data storage unit 404.

1.5.10 Content Reading Unit 410

The content reading unit 410, upon receiving the content acquisition request from the encrypting unit 409, reads a content ID and content "CNT" from the content-recording medium inserted in the content distribution apparatus 400, and outputs the acquired content ID and content "CNT" to the encrypting unit 409.

1.5.11 Distribution Processing Unit 411

The distribution processing unit 411, upon receiving the content list information request from the reproduction apparatus 200 via the transmission/reception unit 412, generates the content list information using the encrypted content management table T410, and transmits the generated content list information to the reproduction apparatus 200 via the transmission/reception unit 412.

The distribution processing unit 411, upon receiving the content distribution information request from the reproduction apparatus 200 via the transmission/reception unit 412, acquires a content ID, which is the same as a content ID contained in the received content distribution information, and an encrypted content key and an encrypted content corresponding to the content ID from the encrypted content management table T410, generates the content distribution information using the acquired content ID, encrypted content key, and encrypted content, and transmits the generated content distribution information to the reproduction apparatus 200 via the transmission/reception unit 412.

1.5.12 Transmission/Reception Unit 412

The transmission/reception unit 412 receives information from the reproduction apparatus 200 via the Internet, and outputs the received information to the distribution processing unit 411.

The transmission/reception unit 412 also receives information from the distribution processing unit 411, and transmits the received information to the reproduction apparatus 200 via the Internet.

1.6 Operation of Prepaid Card System 1

The operation of the prepaid card system 1 will be described.

1.6.1 Outline of License Ticket Generation Operation

The outline of a license ticket generation operation will be described with reference to the flowchart shown in FIG. 25.

The license ticket generation apparatus 300 performs a license ticket generation process to generate a distributor-specific encrypted master key "Enc(K, WK)", and transmits the generated distributor-specific encrypted master key "Enc (K, WK)" to the content distribution apparatus 400 (step S500).

The content distribution apparatus 400 receives the distributor-specific encrypted master key "Enc(K, WK)" from the license ticket generation apparatus 300 (step S505), decrypts the received distributor-specific encrypted master key "Enc (K, WK)" using a decryption key stored in the decryption key storage unit 401 to generate a master key "WK", and writes the master key "WK" into the master key storage unit 402 (step S510).

1.6.2 Outline of Content Distribution Operation

The outline of a content distribution operation will be described with reference to the flowchart shown in FIG. 26. It should be noted here that the operation is performed while the recording medium 100 is inserted in the reproduction apparatus 200, and the reproduction apparatus 200 and the content distribution apparatus 400 are interconnected in a network.

The reproduction apparatus 200, upon receiving the distribution request start instruction, reads the distribution request function from the recording medium 100, and executes the distribution request function (step S550). The reproduction apparatus 200 then transmits the content list information request to the content distribution apparatus 400 (step S555).

The content distribution apparatus 400, upon receiving the content list information request from the reproduction apparatus 200, generates the content list information, and transmits the generated content list information to the reproduction apparatus 200 (step S560).

The reproduction apparatus 200, upon receiving the content list information from the content distribution apparatus 400, generates the available content list information using the received content list information and the license ticket table T100, provides the user with the generated available content list information and has the user select a content to acquire by referring to the available content list information, generates a content distribution information request requesting the distribution of the selected content, and transmits the generated content distribution information request to the content distribution apparatus 400 (step S565).

The content distribution apparatus 400, upon receiving the content distribution information request from the reproduction apparatus 200, acquires an encrypted content, an encrypted content key, and a content ID for distribution using the received content distribution information request, generates the content distribution information using the acquired content ID, encrypted content key, and encrypted content, and transmits the generated content distribution information to the reproduction apparatus 200 (step S570).

The reproduction apparatus 200, upon receiving the content distribution information from the content distribution apparatus 400, processes the received content distribution information depending on the specified use form, and updates the use state table T150 (step S575).

More specifically, the reproduction apparatus 200 processes the received content distribution information as follows. When the use form is "rental", the reproduction apparatus 200 stores a set of a content ID, an encrypted content key, and an encrypted content, which are stored in the received content distribution information, into the rental content storage field 131 of the recording medium 100 by correlating them with each other. When the use form is "purchase", the reproduction apparatus 200 decrypts the encrypted content to generate a content, and stores the generated content into the purchase content storage field 132 of the recording medium 100.

1.6.3 Operation of License Ticket Generation Process

The license ticket generation process executed by the license ticket generation apparatus 300 will be described with reference to the flowchart shown in FIG. 27.

The license ticket generation apparatus 300 generates master key "WK" (step S600), and generates a distributor-specific encrypted master key "Enc(K, WK)" by encrypting the generated master key "WK" using encryption key "K" by the common key encryption system (step S605). The license ticket generation apparatus 300 then transmits the generated distributor-specific encrypted master key "Enc(K, WK)" to the content distribution apparatus 400 (step S610).

The license ticket generation apparatus 300 also generates a ticket-specific encrypted master key "Enc(DK, WK)" by encrypting the generated master key "WK" using device key "DK" by the common key encryption system (step S615). The license ticket generation apparatus 300 then generates the license ticket table T100 storing one or more license tickets, by using the generated ticket-specific encrypted master key "Enc (DK, WK)" and the content IDs and use rules that the license ticket generation apparatus 300 stores therein, and stores the generated license ticket table T100 into the ticket information storage unit 309 (step S620). The license ticket generation apparatus 300 then generates the use state table T150 composed of the license ticket use information, and stores the generated use state table T150 in the ticket information storage unit 309 (step S625).

The license ticket generation apparatus 300 writes the license ticket table T100 and the use state table T150 stored in the ticket information storage unit 309 into the recording medium 100 together with the distribution request function that the license ticket generation apparatus 300 stores therein in advance (step S630).

It should be noted here that a plurality of recording mediums can be produced by repeating the step S630 as necessary.

1.6.4 Operation of Content Acquisition Process

The content acquisition process executed by the reproduction apparatus 200 will be described with reference to the flowchart shown in FIG. 28.

The reproduction apparatus 200 receives a content acquisition start instruction (step S650), and then reads the distribution request program, available content list screen information, use state selection screen information, for-rent ticket selection screen information, and for-purchase ticket selection screen information from the recording medium 100 (step S655), and executes the distribution request program (step S660).

1.6.5 Operation of Reproduction Process

The reproduction process executed by the reproduction apparatus 200 will be described with reference to the flowchart shown in FIG. 29. It should be noted here that in this description, the encrypted content will be represented as "Enc (CK, CNT)", and the encrypted content key will be represented as "Enc (WK, CK)".

The reproduction apparatus 200 receives the reproduction start instruction (step S800). The reproduction apparatus 200 then acquires the date/time, and updates the use state table T150 (step S810).

After this, the reproduction apparatus 200 acquires, from the updated use state table T150, pieces of license ticket use information in which "in use" is written in the use state column and pieces of license ticket use information in which "used" is written in the use state column and "purchase" is written in the use form column, and generates reproducible content information from the acquired pieces of license ticket use information (step S820). The reproduction apparatus 200 then outputs the generated reproducible content information (step S830), provides the user with the generated reproducible content list information and has the user select a content to reproduce by referring to the reproducible content list information (step S840), and judges whether the selected content is to be used for "rental" or not by referring to the reproducible content information generated in step S820 (step S850).

If it is judged in step S850 that the selected content is to be used for "rental", the reproduction apparatus 200 acquires, from the license ticket table T100, a license ticket corresponding to a use number written in the piece of license ticket use information of the selected content, and further acquires a ticket-specific encrypted master key "Enc(DK, WK)" from the acquired license ticket (step S860).

The reproduction apparatus 200 then generates a master key "WK" by decrypting the acquired ticket-specific encrypted master key "Enc(DK, WK)" using the device key "DK" (step S870).

The reproduction apparatus 200 then acquires encrypted content key "Enc (WK, CK)" and encrypted content "Enc (CK, CNT)", which correspond to a content ID written in the piece of license ticket use information of the selected content, from the rental content storage field 131 (step S880).

The reproduction apparatus 200 then generates a content key "CK" by decrypting the acquired encrypted content key "Enc (WK, CK)" using the master key "WK" generated in the step S870 (step S890). The reproduction apparatus 200 then generates a content by decrypting the acquired encrypted content "Enc (CK, CNT)" using the generated content key "CK" (step S900). The reproduction apparatus 200 reproduces the content generated as a result of the decryption (step S910). After the reproduction, the content is deleted.

If it is judged in step S850 that the selected content is not to be used for "rental", the reproduction apparatus 200 acquires, from the purchase content storage field 132, a content corresponding to a use number written in the piece of license ticket use information of the selected content, and reproduces the acquired content (step S920).

1.6.6 Operation of Use State Check Process

The use state check process that is executed in step S810 in the reproduction process will be described with reference to the flowchart shown in FIG. 30.

First, the reproduction apparatus 200 acquires a date/time from the clock unit 202 (step S1000).

Next, the reproduction apparatus 200 repeats the following procedure as many times as the number of pieces of license ticket use information contained in the use state table T150 (step S1010).

The reproduction apparatus 200 acquires a piece of license ticket use information (step S1020), and judges whether the use state column of the acquired license ticket use information indicates "in use" (step S1030). If the use state column of the acquired license ticket use information indicates "in use", the reproduction apparatus 200 calculates a lapsed time from the use start date/time using the use start date/time contained the acquired license ticket use information and the date/time acquired from the clock unit 202 (step S1040). The reproduction apparatus 200 then judges whether the calculated lapsed time is within a permitted rental period which is indicated in the use rule column of a license ticket that corresponds to the acquired piece of license ticket use information (step S1050). If it judges in step S1030 that the acquired license ticket use information does not indicate "in use", the reproduction apparatus 200 returns to step S1020 to repeat the procedure.

If it judges in step S1050 that the calculated lapsed time is not within the permitted rental period, the reproduction apparatus 200 updates the use state column of the acquired piece of license ticket use information to "used" (step S1060). If it judges in step S1050 that the calculated lapsed time is within the permitted rental period, the reproduction apparatus 200 returns to step S1020 to repeat the procedure.

After the above-explained procedure is repeated as many times as the number of pieces of license ticket use information contained in the use state table T150 (step S1070), the use state check process is completed.

1.6.7 Operation of Content Encryption Process

The content encryption process performed by the content distribution apparatus 400 will be described with reference to the flowchart shown in FIG. 31.

When it receives an encryption start instruction (step S1100), the content distribution apparatus 400 generates a content key (step S1110).

The content distribution apparatus 400 then reads a content ID and a content from the content-recording medium inserted in the content distribution apparatus 400 (step S1120). The content distribution apparatus 400 generates an encrypted content by encrypting the content by the common key encryption system using the content key generated in step S1110 (step S1130).

The content distribution apparatus 400 then acquires a master key from the master key storage unit 402 (step S1140), generates an encrypted content key by encrypting the content key by the common key encryption system using the acquired master key (step S1150).

The content distribution apparatus 400 then acquires, from the content-related information storage unit 403, a content name and a price that correspond to the content ID that was acquired in step S1120, and writes the acquired content name and price, the content ID acquired in step S1120, and the generated encrypted content and encrypted content key into the encrypted content management table T410 (step S1160).

1.7 Summary of Embodiment 1

As described above, in the prepaid card system 1, the recording medium 100 stores encrypted master keys, and the content distribution apparatus 400 stores pairs of an encrypted content key and an encrypted content in the encrypted content management table, each pair corresponding to a different content. The encrypted content keys can be decrypted using master keys that are acquired by decrypting encrypted master keys stored in the recording medium 100. This means that there is no limit to the contents that the user can request from the content distribution apparatus 400. That is to say, there is no need for the user, in advance when the user purchases the recording medium 100, to determine contents he/she would like to purchase, and the user can select desired contents after he/she purchases the recording medium 100.

The recording medium 100 may store therein a use period as a use rule for each content. The user acquires a content by specifying a period within the use period stored in the recording medium 100, and views the acquired content for the specified period.

The recording medium 100 may store content IDs of available contents, where a wild card notation can be used to indicate available contents. This enables the user to select a combination of available contents among a number of contents that can be distributed from the content distribution apparatus 400.

When purchasing the recording medium 100, the user pays a fee for renting or purchasing contents. As a result, the present system does not need PKI for realizing the payment using the Internet, or a center for managing the use fees of the users. The present system is therefore simple, and does not require a complicated process. Also, there is a payment method in which a kiosk terminal is used to record a content for purchase into a recording medium. According to this payment method, the user needs to determine contents for purchase when he/she uses the kiosk terminal. However, according to the present system, there is no need for the user, in advance when the user purchases the recording medium 100, to determine contents he/she would like to purchase, and there is no need for the user to use the payment method in which a kiosk terminal is used.

In the present system, a master key used to encrypt a content key is encrypted by the common key encryption system using a device key held by the reproduction apparatus permitted to reproduce the content. This prevents the master key from being read and revealed by an apparatus not permitted to reproduce the content.

2. Embodiment 2

2.1 Construction of Prepaid Card System 2

Figure 32:
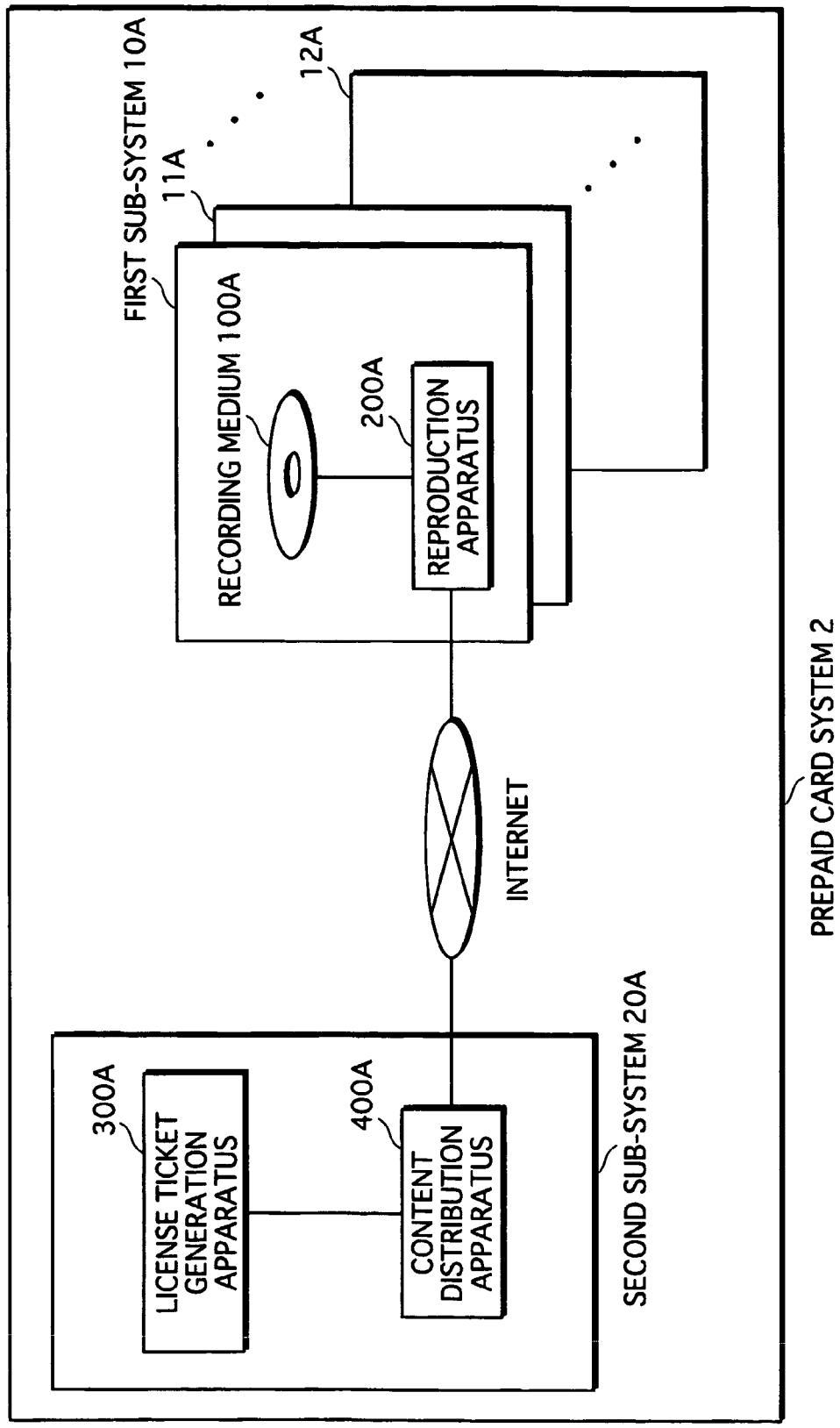
FIG. 32 is a block diagram showing the construction of the prepaid card system 2.

The construction of the prepaid card system 2 as Embodiment 2 of the present invention will be described. The prepaid card system 2 has a similar construction to the prepaid card system 1 explained in Embodiment 1, and as shown in FIG. 32, includes first sub-systems 10A, 11A, . . . 12A and a second sub-system 20A. The first sub-system 10A includes a recording medium 100A and a reproduction apparatus 200A, where the recording medium 100A can be inserted into and removed from the reproduction apparatus 200A. The recording medium 100A is an optical disc. The first sub-systems 11A, . . . 12A have the same construction as the first sub-system 10A. The second sub-system 20A includes a license ticket generation apparatus 300A and a content distribution apparatus 400A which are interconnected in a network via a dedicated line.

The prepaid card system 2 differs from the prepaid card system 1 in that it uses Broadcast Encryption (hereinafter referred to as BE) when generating an encrypted content key.

Here, BE will be explained briefly. BE is an encryption method in which each reproduction device (apparatus) is assigned with a different device key so that an unauthorized reproduction apparatus cannot use the device key for a decryption. More specifically, an encrypted master key, which is generated by performing an encryption using the device key assigned to an unauthorized reproduction apparatus, is not transmitted to an unauthorized reproduction apparatus. With this arrangement, an unauthorized reproduction apparatus cannot use the device key for a decryption.

In the present embodiment, BE is applied to a master key instead of a device key.

Now, BE applied to a master key will be briefly explained.

In this application, each license ticket includes a different encrypted master key. That is to say, different master keys are assigned to and encrypted for the license tickets. The content distribution apparatus 400A generates encrypted contents, and also generates a plurality of encrypted content keys by encrypting content keys using different master keys. The content distribution apparatus 400A transmits a distribution content to the reproduction apparatus 200A based on a distribution request. Each distribution content includes a content ID, an encrypted content, and index information which relates to a plurality of encrypted content keys and a plurality of master keys used for generating the plurality of encrypted content keys. A piece of index information is generated uniquely in correspondence with an encrypted content key. Each piece of index information includes a ticket number of a license ticket. The inclusion of the ticket number of license ticket in the index information enables the master keys, which are obtained by decrypting encrypted master keys, to be correlated with the encrypted content keys that are decrypted using the master keys.

With the above-described construction, if a certain master key is revealed, the encrypted content key using the revealed master key and the corresponding piece of index information can be deleted from the distribution content information. This prevents the reproduction apparatus 200A from performing a decryption using the revealed master key, making it impossible for the reproduction apparatus 200A to reproduce the content.

The following description will focus on the differences from the prepaid card system 1.

2.2 Construction of Recording Medium 100A

The construction of the recording medium 100A will be described.

Figure 33:
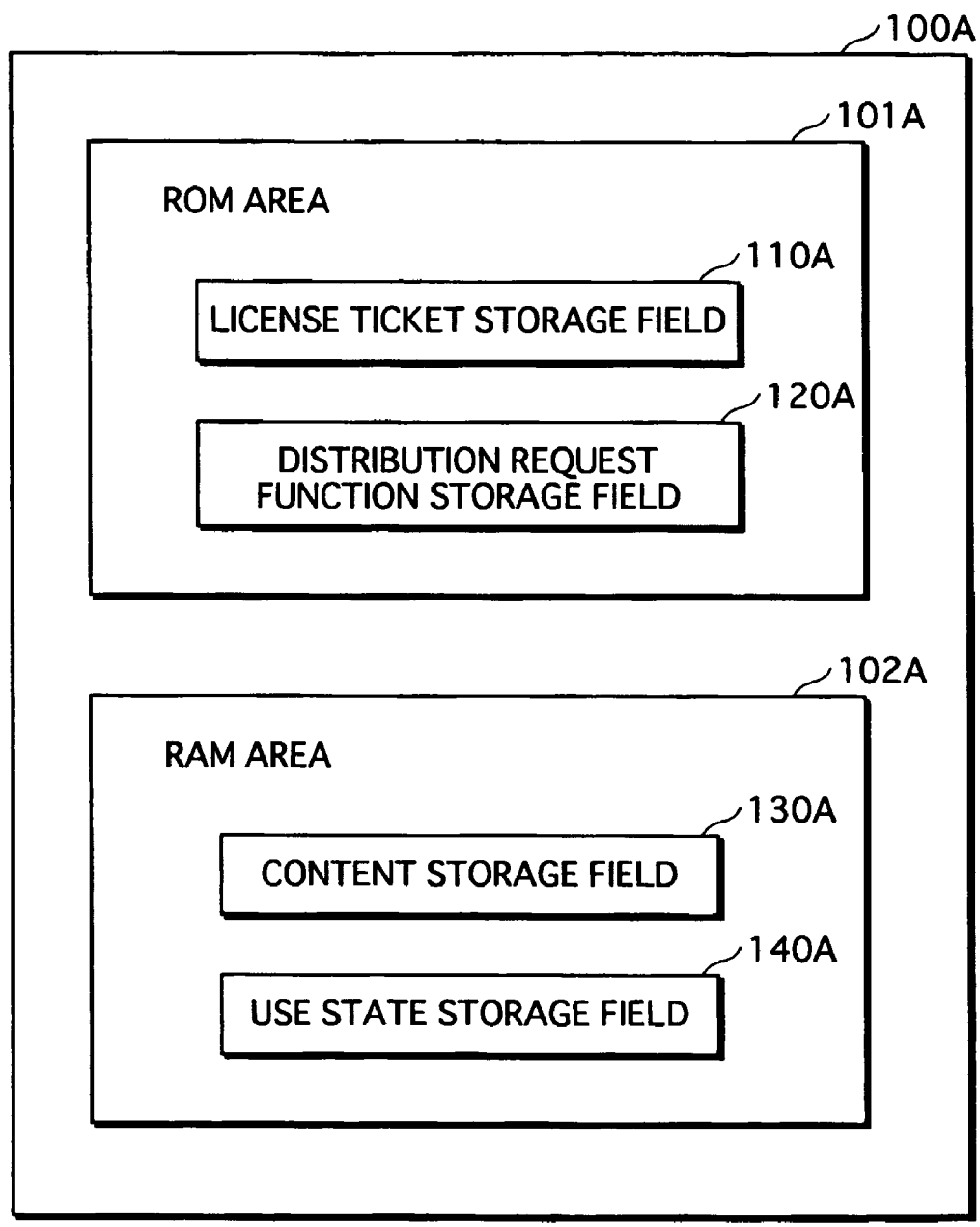
FIG. 33 is a block diagram of the recording medium 100A.

As shown in FIG. 33, the recording medium 100A includes a ROM area 101A and a RAM area 102A. The ROM area 101A is a read-only area, and includes a license ticket storage field 110A and a distribution request function storage field 120A. The RAM area 102A allows data to be read and written from/into itself, and includes a content storage field 130A and a use state storage field 140A.

The explanation of the recording mediums contained in the first sub-systems 11A, . . . 12A is omitted since they have the same construction as the recording medium 100A.

2.2.1 License Ticket Storage Field 110A

The license ticket storage field 110A includes, as shown in FIG. 34 as one example, a license ticket table T100A.

The explanation of the license ticket storage field 110A in terms of its data structure will be omitted since it is similar to the license ticket storage field 110 shown in Embodiment 1.

The license ticket storage field 110A differs from the license ticket storage field 110 in that different encrypted master keys are respectively recorded in the license tickets.

2.2.2 Distribution Request Function Storage Field 120A

The distribution request function storage field 120A, as is the case with the distribution request function storage field 120 shown in Embodiment 1, stores a distribution request program and information of: an available content list screen; a use form selection screen; a for-rent ticket selection screen; and a for-purchase ticket selection screen.

The distribution request program in Embodiment 2 operates differently from that in Embodiment 1. The difference will be explained here with reference to FIG. 17 that was also used in Embodiment 1.

An additional step is executed between the steps S425 and S430. In the additional step, the reproduction apparatus 200A refers to (i) a piece of index information contained in a piece of distribution content information received from the content distribution apparatus 400A and (ii) ticket numbers indicated by the temporarily stored for-purchase license ticket information, and acquires a ticket-specific encrypted master key from a license ticket that has the same ticket number as the received piece of index information.

Figure 17:
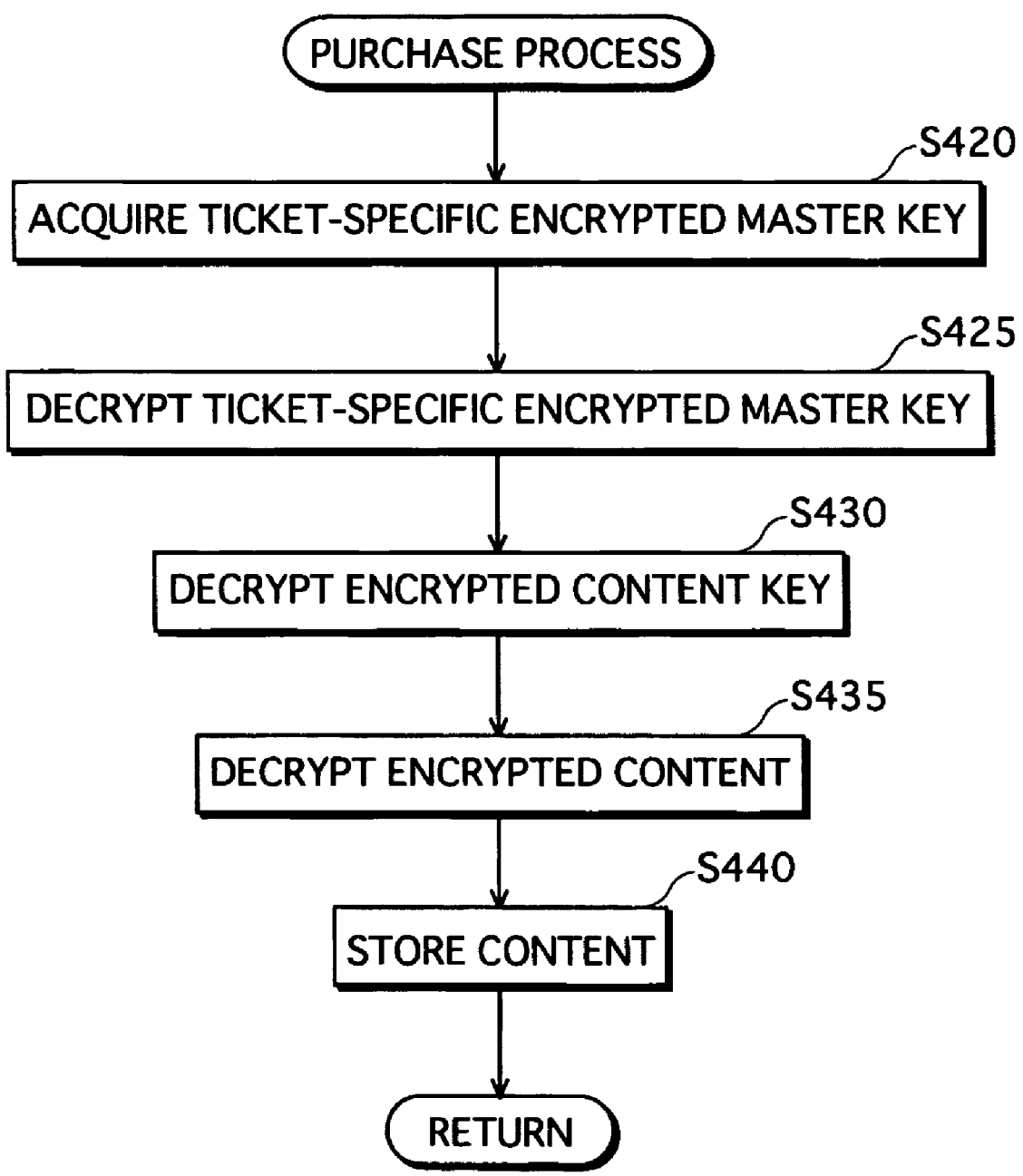
FIG. 17 is a flowchart of the purchase process of the distribution request program.

After the execution of the additional step, the step S430 and onwards shown in FIG. 17 are executed.

2.2.3 Content Storage Unit 130A

The content storage unit 130A has the same construction as the content storage unit 130 shown in Embodiment 1, except that the rental content storage field 131A stores encrypted contents in a different manner. As shown in FIG. 35, the rental content storage field 131A stores sets of an encrypted content and one or more pairs of a piece of index information and an encrypted content key, by associating the sets with the respective content IDs. It should be noted here that the number of the one or more pairs of a piece of index information and an encrypted content key in each set is equivalent to the number of master keys that are permitted to be used for reproduction.

2.2.4 Use State Storage Field 140A

The use state storage field 140A, as is the case with the use state storage field 140 shown in Embodiment 1, includes a use state table T150A. The explanation of the use state table T150A in terms of the data structure is omitted here since it is the same as the use state table T150.

2.3 Construction of Reproduction Apparatus 200A

The construction of the reproduction apparatus 200A will be described.

Figure 36:
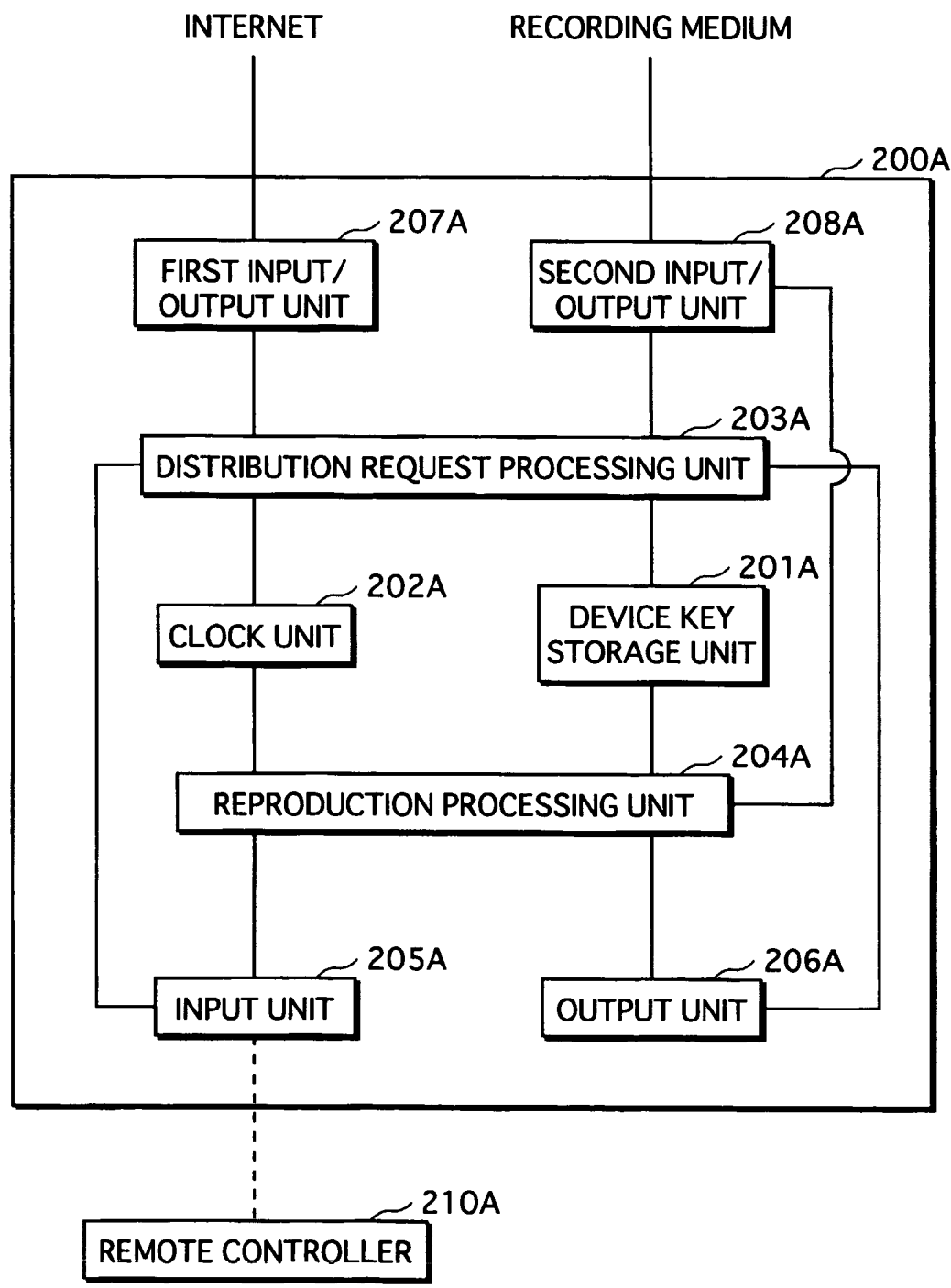
FIG. 36 is a block diagram of the reproduction apparatus 200A.

As shown in FIG. 36, the reproduction apparatus 200A includes a device key storage unit 201A, a clock unit 202A, a distribution request processing unit 203A, a reproduction processing unit 204A, an input unit 205A, an output unit 206A, a first input/output unit 207A, a second input/output unit 208A, and a remote controller 210A.

The reproduction apparatus 200A is specifically a computer system that includes a microprocessor, ROM, RAM, a hard disk unit and the like. A computer program is stored in the ROM or the hard disk unit. The microprocessor operates in accordance with the computer program and causes the reproduction apparatus 200A to execute the functions.

The reproduction apparatus 200A is further connected to a television (not illustrated) via the output unit 206A. Not limited to the television, the reproduction apparatus 200A may be connected to other apparatuses that can receive video and/or audio data from the reproduction apparatus 200A and output them as images and/or voices.

Note that the explanation of the reproduction apparatuses contained in the first sub-systems 11A, . . . 12A is omitted since they have the same construction as the reproduction apparatus 200A.

2.3.1 Device Key Storage Unit 201A

The explanation of the device key storage unit 201A is omitted since it is similar to the device key storage unit 201 shown in Embodiment 1.

2.3.2 Clock Unit 202A

The explanation of the clock unit 202A is omitted since it is similar to the clock unit 201 shown in Embodiment 1.

2.3.3 Distribution Request Processing Unit 203A

When the distribution request processing unit 203A receives a distribution request start instruction to start a distribution request process from the remote controller 210A via the input unit 205A, the distribution request processing unit 203A reads a distribution request function from the recording medium 100A via the second input/output unit 208A, and executes the read distribution request function. The following describes the distribution request function executed by the distribution request processing unit 203A, focusing on the difference from Embodiment 1.

The difference is in the decryption of an encrypted content key and an encrypted content that is performed after the distribution content information is received for purchasing a content. The following is a description of the operation after the distribution content information is received.

The distribution request processing unit 203A receives a piece of distribution content information from the content distribution apparatus 400A. After this, the distribution request processing unit 203A acquires a reception completion date/time from the clock unit 202A, and temporarily stores the acquired reception completion date/time. The distribution request processing unit 203A refers to (i) a piece of index information contained in a piece of distribution content information received from the content distribution apparatus 400A and (ii) ticket numbers indicated by the temporarily stored for-purchase license ticket information, and acquires a ticket-specific encrypted master key from a license ticket that has the same ticket number as the received piece of index information.

The distribution request processing unit 203A then generates a master key by decrypting the acquired ticket-specific encrypted master key using device key "DK" that the reproduction apparatus 200A holds therein. The distribution request processing unit 203A then acquires an encrypted content key that corresponds to a piece of index information having the same ticket number as the license ticket that was used in the decryption. The distribution request processing unit 203A generates content key "CK" by decrypting the acquired encrypted content key using the generated master key, and further generates content "CNT" by decrypting encrypted content "Enc (CK, CNT)" included in the received piece of distribution content information, using the generated content key "CK". The distribution request processing unit 203A stores the generated content "CNT" in the purchase content storage field 132 of the recording medium 100A. The distribution request processing unit 203A updates the use state table T150A using the temporarily stored for-purchase license ticket information, the use form, and the distribution content information reception completion date/time acquired from the clock unit 202A. The procedure of updating the table is not described here since it is similar to the procedure shown in Embodiment 1.

2.3.4 Reproduction Processing Unit 204A

The reproduction processing unit 204A reproduces a content while the recording medium 100A is inserted in the reproduction apparatus 200A.

The description of the reproduction processing unit 204A is omitted here since it is similar to the reproduction processing unit 204 shown in Embodiment 1.

It should be noted here that in Embodiment 2, to reproduce a "rental" content, an encrypted content key that corresponds to a piece of index information having the same ticket number as the license ticket is acquired, and the acquired encrypted content key is decrypted using a master key that was obtained by decryption.

2.3.5 Input Unit 205A

The explanation of the input unit 205A is omitted since it is similar to the input unit 205 shown in Embodiment 1.

2.3.6 Output Unit 206A

The explanation of the output unit 206A is omitted since it is similar to the output unit 206 shown in Embodiment 1.

2.3.7 First Input/Output Unit 207A

The explanation of the first input/output unit 207A is omitted since it is similar to the first input/output unit 207 shown in Embodiment 1.

2.3.8 Second Input/Output Unit 208A

The explanation of the second input/output unit 208A is omitted since it is similar to the second input/output unit 208 shown in Embodiment 1.

2.3.9 Remote Controller 210A

The explanation of the remote controller 210A is omitted since it is similar to the remote controller 210 shown in Embodiment 1.

2.4 Construction of License Ticket Generation Apparatus 300A

The construction of the license ticket generation apparatus 300A will be described.

Figure 37:
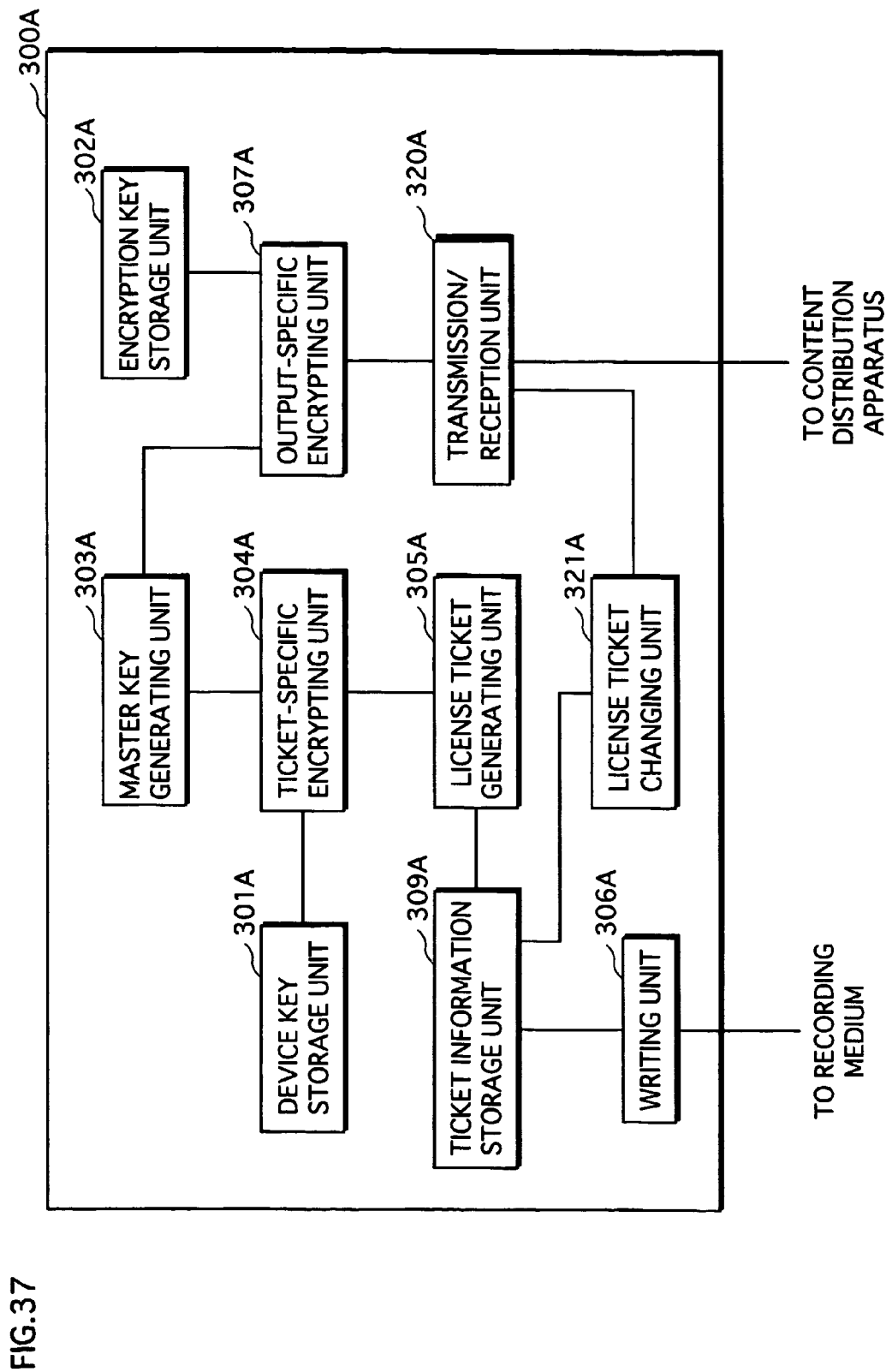
FIG. 37 is a block diagram of the license ticket generation apparatus 300A.

As shown in FIG. 37, the license ticket generation apparatus 300A includes a device key storage unit 301A, an encryption key storage unit 302A, a master key generating unit 303A, a ticket-specific encrypting unit 304A, a license ticket generating unit 305A, a writing unit 306A, an output-specific encrypting unit 307A, a ticket information storage unit 309A, a transmission/reception unit 320A, and a license ticket changing unit 321A.

The license ticket generation apparatus 300A is specifically a computer system that includes a microprocessor, ROM, RAM, a hard disk unit, a display unit, a keyboard, a mouse, a modem and the like. A computer program is stored in the ROM or the hard disk unit. The microprocessor operates in accordance with the computer program and causes the license ticket generation apparatus 300A to execute the functions.

The license ticket generation apparatus 300A generates a plurality of master keys and generates license tickets that respectively include different encrypted master keys generated from the plurality of master keys. The 300A writes a generated license ticket into a recording medium. The license ticket generation apparatus 300A mass-produces the recording medium containing the license ticket by repeating the writing of a generated license ticket into a recording medium.

The license ticket generation apparatus 300A also receives, from the content distribution apparatus 400A, master key revocation information which indicates master keys that are not used for generating contents through decryption, and generates a license ticket using the received master key revocation information.

2.4.1 Device Key Storage Unit 301A

The explanation of the device key storage unit 301A is omitted since it is similar to the device key storage unit 301 shown in Embodiment 1.

2.4.2 Encryption Key Storage Unit 302A

The encryption key storage unit 302A stores an encryption key "K" that is used to encrypt, by the common key encryption system, the plurality of master keys generated by the master key generating unit 303A.

2.4.3 Master Key Generating Unit 303A

The master key generating unit 303A generates master keys "WK1", "WK2", ..., "WK10" using random numbers, and outputs the generated master keys to the ticket-specific encrypting unit 304A and the output-specific encrypting unit

307A. It should be noted here that the master keys "WK1", "WK2", ..., "WK10" are different from each other.

2.4.4 Ticket Information Storage Unit 309A

The ticket information storage unit 309A stores the license ticket table T100A and the use state table T150A.

The license ticket table T100A and the use state table T150A stored in the ticket information storage unit 309A are to be recorded in the recording medium 100A.

The explanation of the data structure of the use state table T150A is omitted since it is similar to the data structure of the use state table T150 shown in Embodiment 1. It should be noted here that the license ticket use information constituting the use state table T150A has the use number and "not used" in the use state column, and the remaining columns are blank.

The ticket information storage unit 309A also stores a distribution request function in advance.

2.4.5 Ticket-Specific Encrypting Unit 304A

The ticket-specific encrypting unit 304A generates ticket-specific encrypted master keys "Enc(DK, WK1)", "Enc (DK, WK2)", ... "Enc(DK, WK10)" by encrypting master keys "WK1", "WK2", ... "WK10" which are received from the master key generating unit 303A, using the device key "DK" stored in the device key storage unit 301A, and stores the generated ticket-specific encrypted master keys.

2.4.6 License Ticket Generating Unit 305A

The license ticket generating unit 305A stores, in advance, usable content IDs and use rules associated with the usable content IDs, each use rule being composed of information written in a pair of columns "rental" and "purchase".

The license ticket generating unit 305A generates the license ticket table T100A by using the ticket-specific encrypted master keys "Enc(DK, WK1)", "Enc(DK, WK2)", ... "Enc(DK, WK10)" and the usable content IDs and the use rules prestored therein, and stores the generated license ticket table T100A in the ticket information storage unit 309A.

The license ticket generating unit 305A further generates the use state table T150A, and stores the generated use state table T150A in the ticket information storage unit 309A.

2.4.7 License Ticket Changing Unit 321A

The license ticket changing unit 321A, upon receiving the master key revocation information from the content distribution apparatus 400A via the transmission/reception unit 320A, refers to the received master key revocation information and updates the license ticket table T100A stored in the ticket information storage unit 309A by deleting, from the table, license tickets that include unusable master keys. The license ticket changing unit 321A further updates the use state table T150A stored in the ticket information storage unit 309A by deleting, from the table, pieces of license ticket use information corresponding to the deleted license tickets.

2.4.8 Writing Unit 306A

The writing unit 306A writes the license ticket table T100A, use state table T150A, and distribution request function stored in the ticket information storage unit 309A, into the recording medium 100A.

It should be noted here that the license ticket table T100A, use state table T150A, and distribution request function may be written into the recording medium 100A by stamping them onto the recording medium 100A. This enables the recording medium 100A to be produced at a low cost.

2.4.9 Output-Specific Encrypting Unit 307A

The output-specific encrypting unit 307A generates distributor-specific encrypted master keys "Enc(K, WK1)", "Enc(K, WK2)", ... "Enc(K, WK10)" by encrypting the master keys "WK1", "WK2", ... "WK10", which are received from the master key generating unit 303A, using the encryption key "K" stored in the encryption key storage unit 302A, and transmits the generated distributor-specific encrypted master keys to the content distribution apparatus 400A via the transmission/reception unit 320A.

2.4.10 Transmission/Reception Unit 320A

The transmission/reception unit 320A receives information from the output-specific encrypting unit 307A, and transmits the received information to the content distribution apparatus 400A. The transmission/reception unit 320A also receives information from the content distribution apparatus 400A and transmits the received information to the license ticket generating unit 305A.

2.5 Construction of Content Distribution Apparatus 400A

The construction of the content distribution apparatus 400A will be described.

Figure 38:
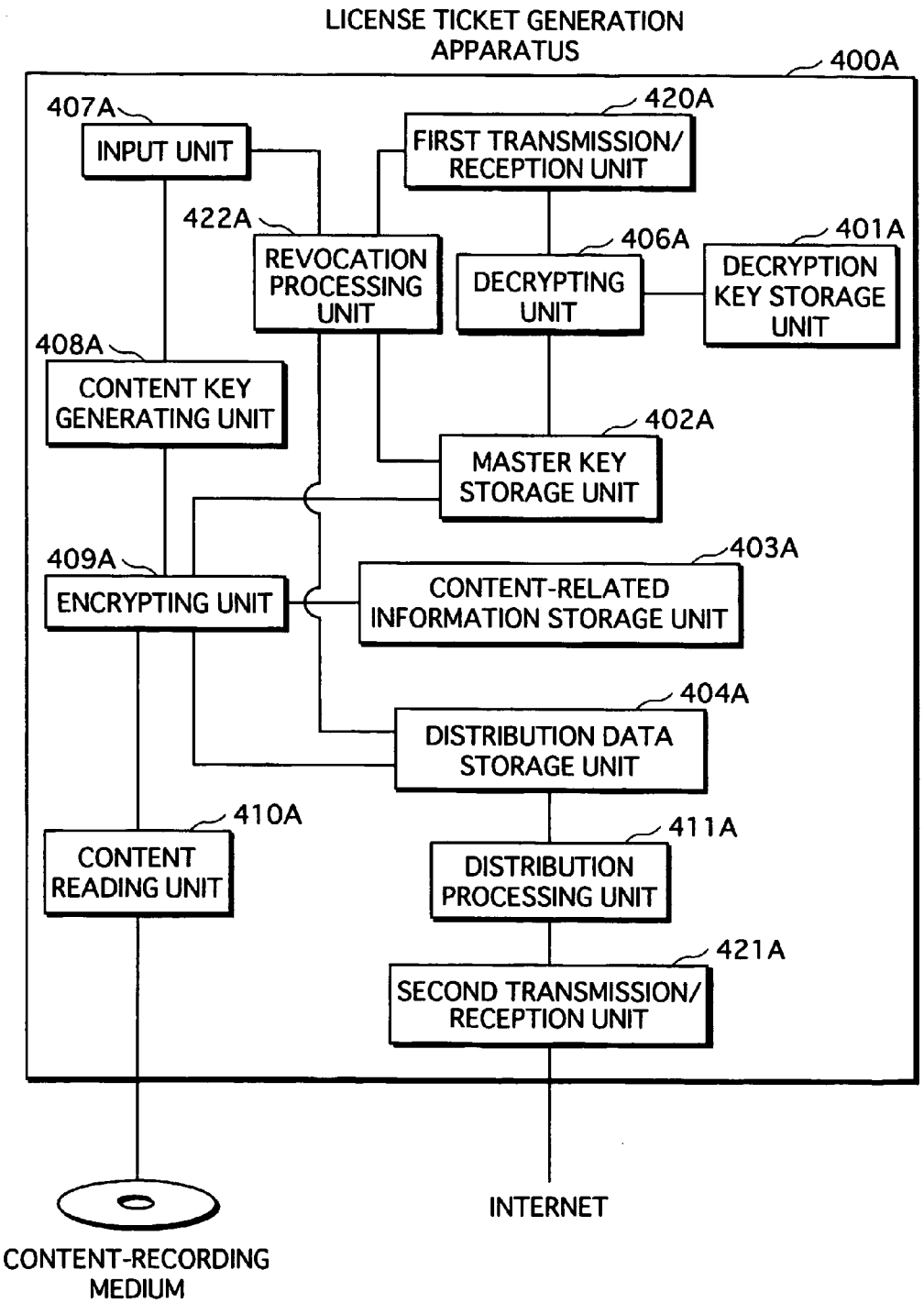
FIG. 38 is a block diagram of the content distribution apparatus 400A.

As shown in FIG. 38, the content distribution apparatus 400A includes a decryption key storage unit 401A, a master key storage unit 402A, a content-related information storage unit 403A, a distribution data storage unit 404A, a decrypting unit 406A, an input unit 407A, a content key generating unit 408A, an encrypting unit 409A, a content reading unit 410A, a distribution processing unit 411A, a first transmission/reception unit 420A, a second transmission/reception unit 421A, and revocation processing unit 422A.

The content distribution apparatus 400A is specifically a computer system that includes a microprocessor, ROM, RAM, a hard disk unit, a display unit, a keyboard, a mouse, a modem and the like. A computer program is stored in the ROM or the hard disk unit. The microprocessor operates in accordance with the computer program and causes the content distribution apparatus 400A to execute the functions.

A content-recording medium containing a content ID and a content can be inserted into and removed from the content distribution apparatus 400A. The content distribution apparatus 400A encrypts a content while the content-recording medium containing the content is inserted therein.

2.5.1 Decryption Key Storage Unit 401A

The explanation of the decryption key storage unit 401A is omitted since it is similar to the decryption key storage unit 401 shown in Embodiment 1.

2.5.2 Master Key Storage Unit 402A

The master key storage unit 402A stores a plurality of master keys that are generated by the decrypting unit 406A as a result of decryption.

2.5.3 Content-Related Information Storage Unit 403A

The content-related information storage unit 403A, as is the case with the content-related information storage unit 403, stores a content-related information table T400A.

The explanation of the content-related information table T400A is omitted since it is similar to the content-related information table T400.

2.5.4 Distribution Data Storage Unit 404A

The distribution data storage unit 404A, as is the case with the distribution data storage unit 404, includes an encrypted content management table T410A.

The explanation of the encrypted content management table T410A is omitted since it is similar to the encrypted content management table T410 shown in Embodiment 1.

It should be noted here that each set of a content ID, a content name, an encrypted content key, an encrypted content, and a price, which constitute the encrypted content management table T410A, is called encrypted content information.

In the present embodiment, each encrypted content key contained in the encrypted content information is accompanied with a piece of index information that corresponds to a master key that is used to decrypt the encrypted content key. The number of pairs of an encrypted content key and a piece of index information is equal to the number of master keys that can be used to decrypt the encrypted content keys.

2.5.5 First Transmission/Reception Unit 420A

The first transmission/reception unit 420A receives distributor-specific encrypted master keys "Enc(K, WK1)", "Enc(K, WK2)", ... "Enc(K, WK10)" from the license ticket generation apparatus 300A, and outputs the received distributor-specific encrypted master keys to the decrypting unit 406A.

The first transmission/reception unit 420A also receives the master key revocation information from the revocation processing unit 422A, and transmits the received master key revocation information to the license ticket generation apparatus 300A.

2.5.6 Decrypting Unit 406A

The decrypting unit 406A, upon receiving the distributor-specific encrypted master keys "Enc(K, WK1)", "Enc(K, WK2)", ... "Enc(K, WK10)" from the first transmission/reception unit 420A, acquires a decryption key from the decryption key storage unit 401A, and decrypts the distributor-specific encrypted master keys using the acquired decryption key, and writes master keys "WK1", "WK2", ... "WK10", which are obtained as a result of the decryption, into the master key storage unit 402A.

2.5.7 Input Unit 407A

The input unit 407A receives an encryption start instruction that instructs to start encrypting a content, and outputs the received encryption start instruction to the content key generating unit 408A. The input unit 407A also receives the master key revocation information, and outputs the received master key revocation information to the revocation processing unit 422A.

2.5.8 Content Key Generating Unit 408A

The explanation of the content key generating unit 408A is omitted since it is similar to the content key generating unit 408 shown in Embodiment 1.

2.5.9 Revocation Processing Unit 422A

The revocation processing unit 422A stores, in advance, information indicating the correspondence between the master keys and ticket numbers of the license tickets.

The revocation processing unit 422A, upon receiving the master key revocation information from the input unit 407A, refers to the received master key revocation information and updates the master key storage unit 402A by deleting, from the storage unit 402A, master keys that are unusable. The revocation processing unit 422A further refers to the received master key revocation information and updates the encrypted content management table T410A by deleting the encrypted content keys that were encrypted using the revoked master keys, and deleting the index information accompanied with the encrypted content keys. This is done for each piece of information recorded in the encrypted content management table T410A.

The revocation processing unit 422A also transmits the received master key revocation information to the license ticket generation apparatus 300A via the first transmission/reception unit 420A.

2.5.10 Encrypting Unit 409A

The encrypting unit 409A stores, in advance, information indicating the correspondence between the master keys and ticket numbers of the license tickets.

The encrypting unit 409A, upon receiving the content key "CK" from the content key generating unit 408A, outputs a content acquisition request, which requests acquisition of a content ID and content "CNT", to the content reading unit 410A, and receives the requested content ID and content "CNT" from the content reading unit 410A.

The encrypting unit 409A then generates encrypted content "Enc (CK, CNT)" by encrypting the content "CNT" using the content key "CK" by the common key encryption system.

The encrypting unit 409A acquires master keys "WK1", "WK2", ..., "WK10" from the master key storage unit 402A, and generates encrypted content keys "Enc(WK1, CK)", "Enc (WK2, CK)", ... "Enc (WK10, CK)", by encrypting the content key "CK" using the acquired master keys "WK1", "WK2", ..., "WK10" by the common key encryption system.

The encrypting unit 409A then generates information "(1, Enc(WK1, CK))", "(2, Enc(WK2, CK))", ... "(10, Enc (WK10, CK))" by adding the index information to each of the generated encrypted content keys "Enc (WK1, CK)", "Enc (WK2, CK)", ... "Enc (WK10, CK)". In doing so, the encrypting unit 409A refers to the generated encrypted content keys "Enc(WK1, CK)", "Enc(WK2, CK)", ... "Enc (WK10, CK)" and the information indicating the correspondence between the master keys and the ticket numbers of the license tickets, which is stored in advance.

The encrypting unit 409A also acquires, from the content-related information table T400A, a content name and a price that correspond to the content ID received from the content reading unit 410A.

The encrypting unit 409A then writes a set of (a) the generated encrypted content "Enc(CK, CNT)", (b) the generated information "(1, Enc (WK1, CK))", "(2, Enc(WK2, CK))", ... "(1, Enc(WK10, CK))" which are each a pair of the index information and an encrypted content key, (c) the content ID received from the content reading unit 410A, and (d) the pair of a content name and a price acquired from the content-related information table T400A, into the distribution data storage unit 404A.

It should be noted here that if the revocation processing unit 422A has updated the master key storage unit 402A, encrypted content keys are generated based on the updated master key storage unit 402A. For example, if the revocation processing unit 422A has deleted "WK2" from the master key storage unit 402A as an unusable master key, the encrypted content key "Enc(WK2, CK)" is not generated. That is to say, encrypted content keys are generated in correspondence with master keys that are stored in the updated master key storage unit 402A.

2.5.11 Content Reading Unit 410A

The explanation of the content reading unit 410A is omitted since it is similar to the content reading unit 410 shown in Embodiment 1.

2.5.12 Distribution Processing Unit 411A

The distribution processing unit 411A, upon receiving the content list information request from the reproduction apparatus 200A via the second transmission/reception unit 421A, generates the content list information using the encrypted content management table T410A, and transmits the generated content list information to the reproduction apparatus 200A via the second transmission/reception unit 421A.

The distribution processing unit 411A, upon receiving the content distribution information request from the reproduction apparatus 200A via the second transmission/reception unit 421A, acquires, from the encrypted content management table T410A, a content ID, which is the same as a content ID contained in the received content distribution information, one or more pairs of a piece of index information and an encrypted content key, and an encrypted content corresponding to the content ID, generates the content distribution information using the acquired information, and transmits the generated content distribution information to the reproduction apparatus 200A via the second transmission/reception unit 421A.

2.5.13 Second Transmission/Reception Unit 421A

The explanation of the second transmission/reception unit 421A is omitted since it is similar to the transmission/reception unit 412 shown in Embodiment 1.

2.6 Operation of Prepaid Card System 2

The operation of the prepaid card system 2 will be described.

2.6.1 Outline of License Ticket Generation Operation

Figure 25:
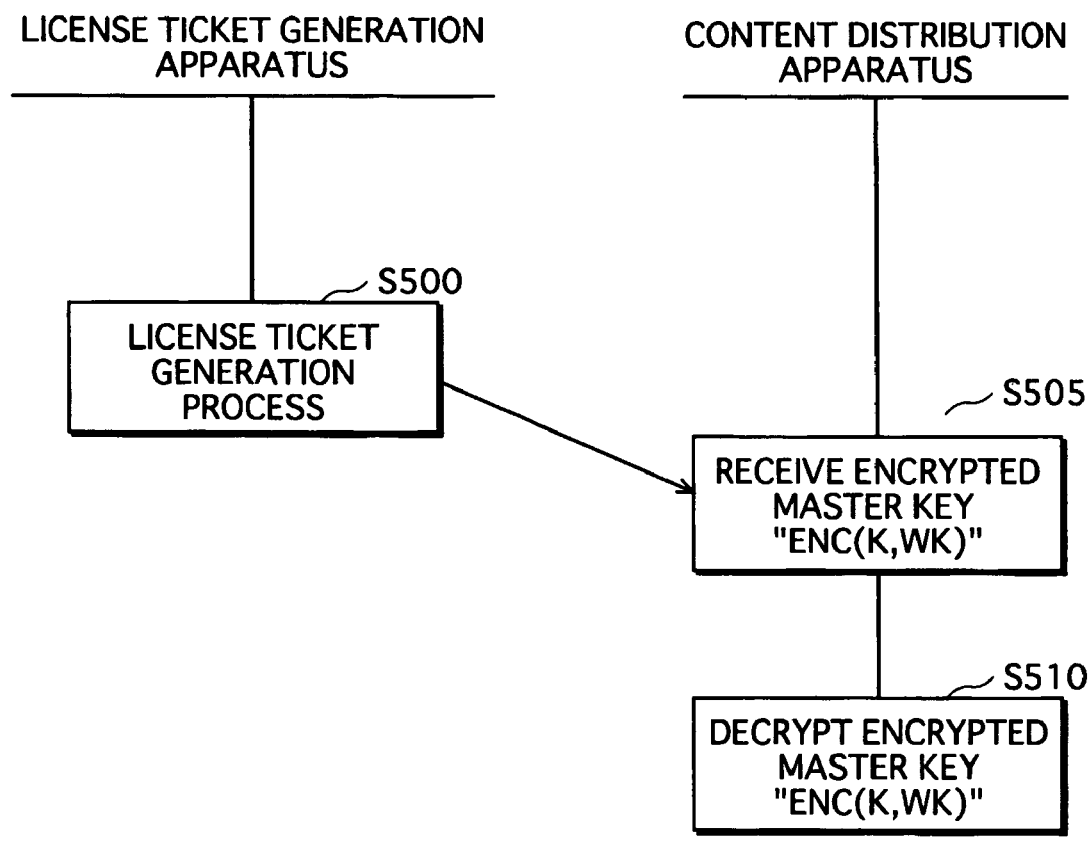
FIG. 25 is a flowchart of the outline of the license ticket generation operation.

The description of the outline of the license ticket generation operation is omitted since it is similar to the one indicated by the flowchart shown in FIG. 25 in Embodiment 1.

It should be noted here that in Embodiment 2, the license ticket generation apparatus 300A transmits distributor-specific encrypted master keys "Enc(K, WK1)", "Enc(K, WK2)", ... "Enc(K, WK10)" to the content distribution apparatus 400A, and the content distribution apparatus 400A receives and decrypts these distributor-specific encrypted master keys.

2.6.2 Outline of Content Distribution Operation

Figure 26:
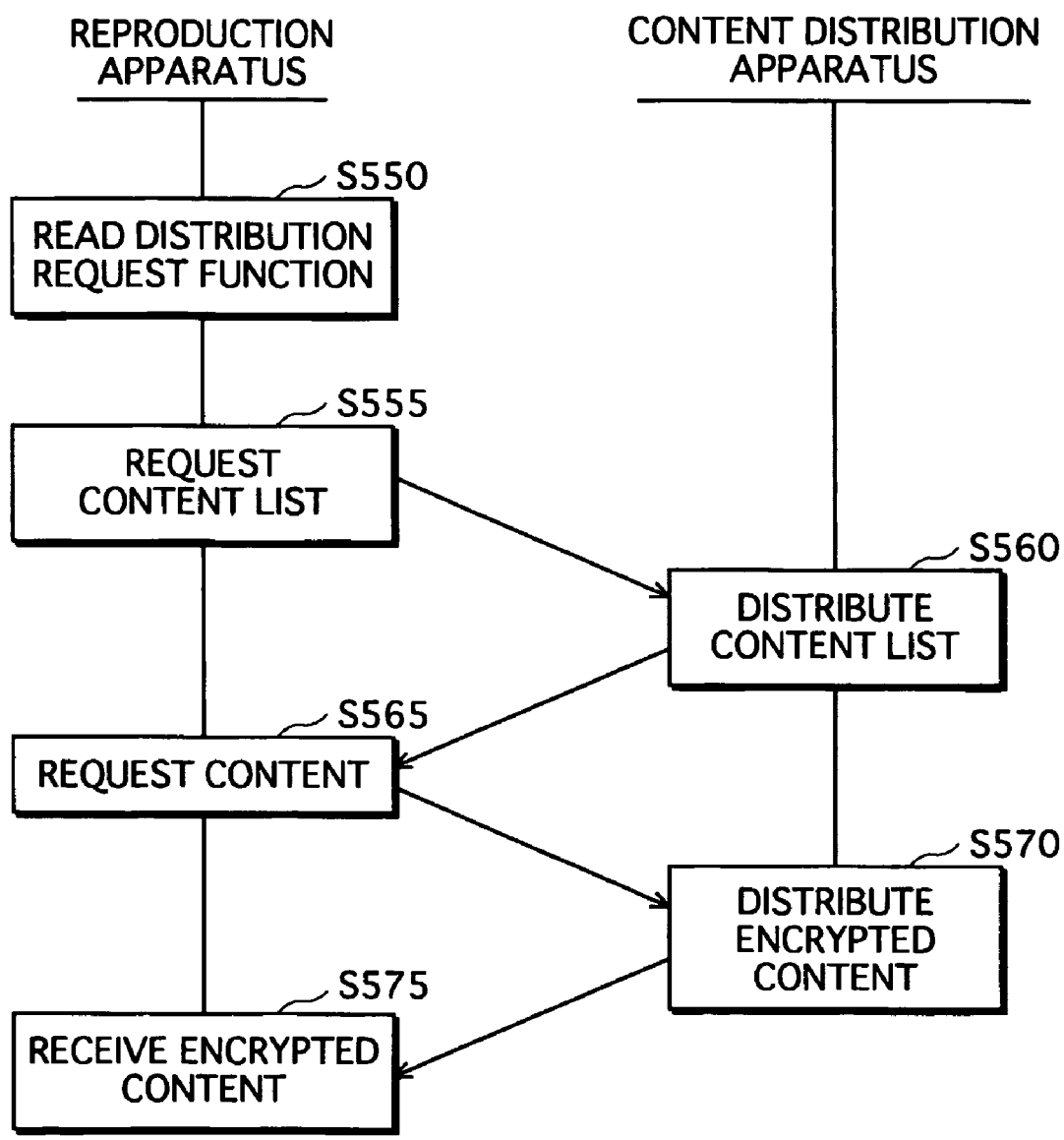
FIG. 26 is a flowchart of the outline of a content distribution operation.

The description of the outline of the content distribution operation is omitted since it is similar to the one indicated by the flowchart shown in FIG. 26 in Embodiment 1.

2.6.3 Operation of License Ticket Generation Process

Figure 27:
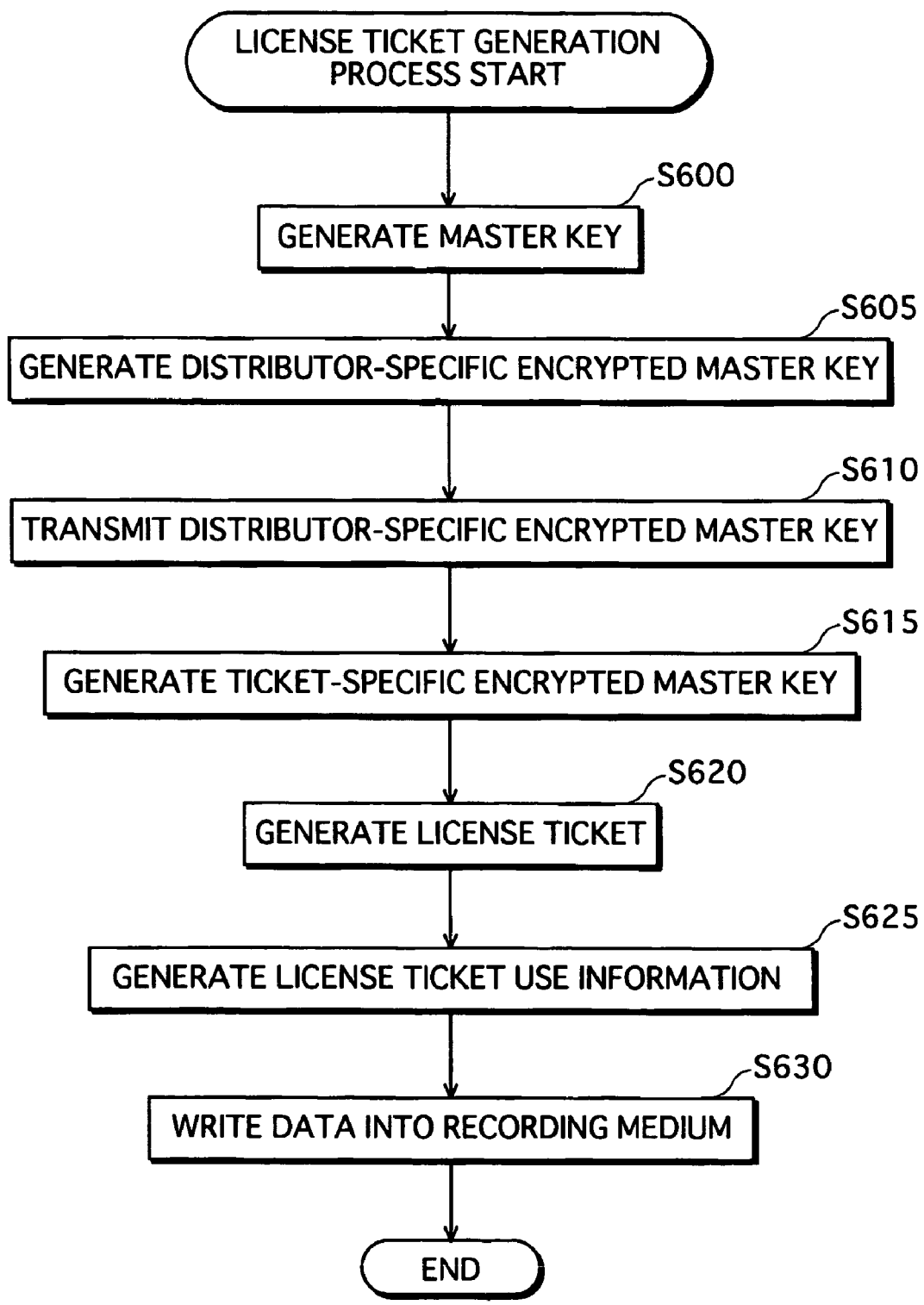
FIG. 27 is a flowchart of the outline of the license ticket generation operation.

The description of the license ticket generation process executed by the license ticket generation apparatus 300A is omitted since it is similar to the one indicated by the flowchart shown in FIG. 27 in Embodiment 1.

It should be noted here that the license ticket generation process in Embodiment 2 generates master keys "WK1", "WK2", ... "WK10" and distributor-specific encrypted master keys "Enc(K, WK1)", "Enc(K, WK2)", ... "Enc(K, WK10)", which are transmitted to the content distribution apparatus 400A. The license ticket generation process in Embodiment 2 also generates ticket-specific encrypted master keys "Enc(DK, WK1)", "Enc(DK, WK2)", ... "Enc(DK, WK10)", which are used to generate the license ticket table T100A.

2.6.4 Operation of License Ticket Changing Process

The license ticket changing process, which is executed when the license ticket generation apparatus 300A receives the master key revocation information from the content distribution apparatus 400A, will be described with reference to the flowchart shown in FIG. 39.

The license ticket generation apparatus 300A receives the master key revocation information from the content distribution apparatus 400A (step S2000). The license ticket generation apparatus 300A refers to the received master key revocation information and updates the license ticket table T100A by deleting, from the table, license tickets that include unusable master keys (step S2010). The license ticket generation apparatus 300A further updates the use state table T150A by deleting, from the table, pieces of license ticket use information corresponding to the deleted license tickets (step S2020).

With the above-described operation, the data stored in the ticket information storage unit 309A is updated. The updated data can be written into the recording medium by executing only the writing step in the license ticket generation process.

2.6.5 Operation of Content Acquisition Process

Figure 28:
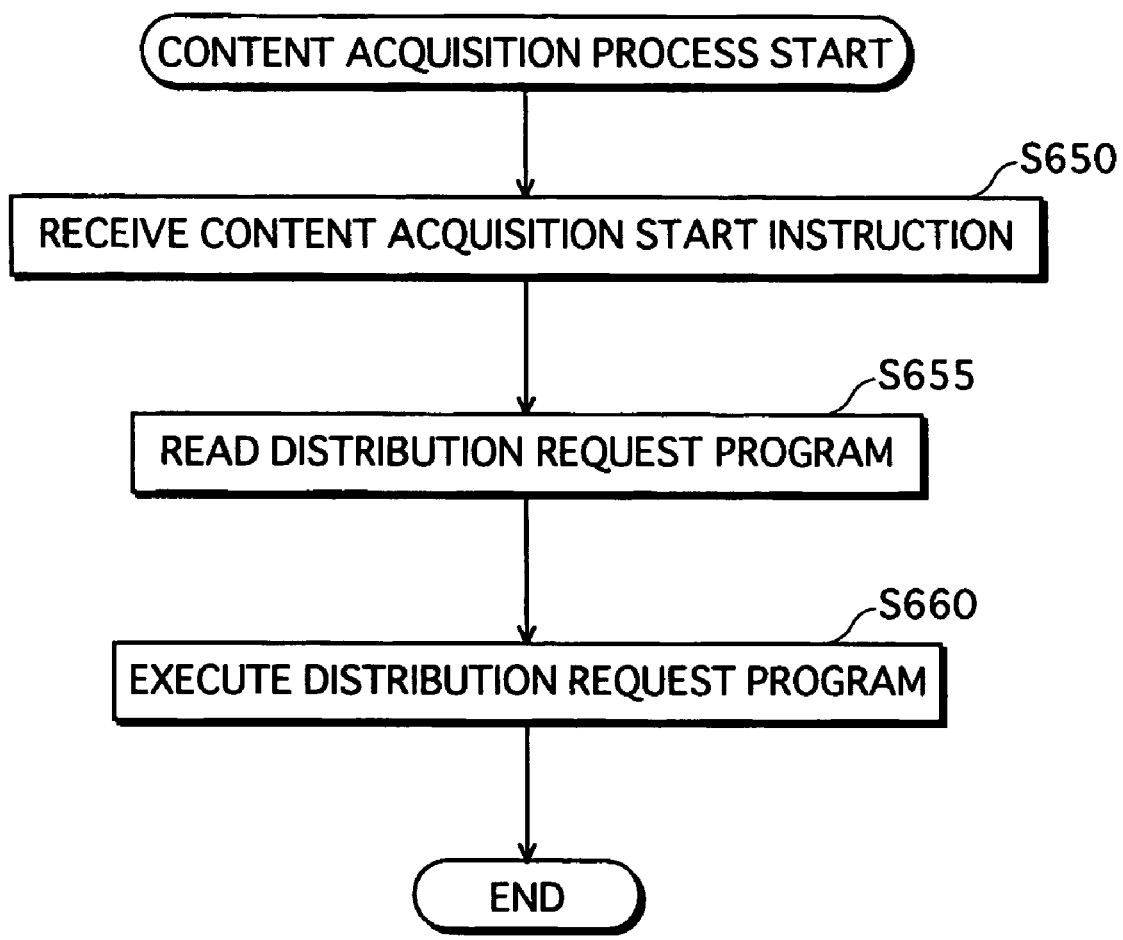
FIG. 28 is a flowchart of the content acquisition process.

The description of the content acquisition process executed by the reproduction apparatus 200A is omitted since it is similar to the one indicated by the flowchart shown in FIG. 28 in Embodiment 1.

2.6.6 Operation of Reproduction Process

Figure 29:
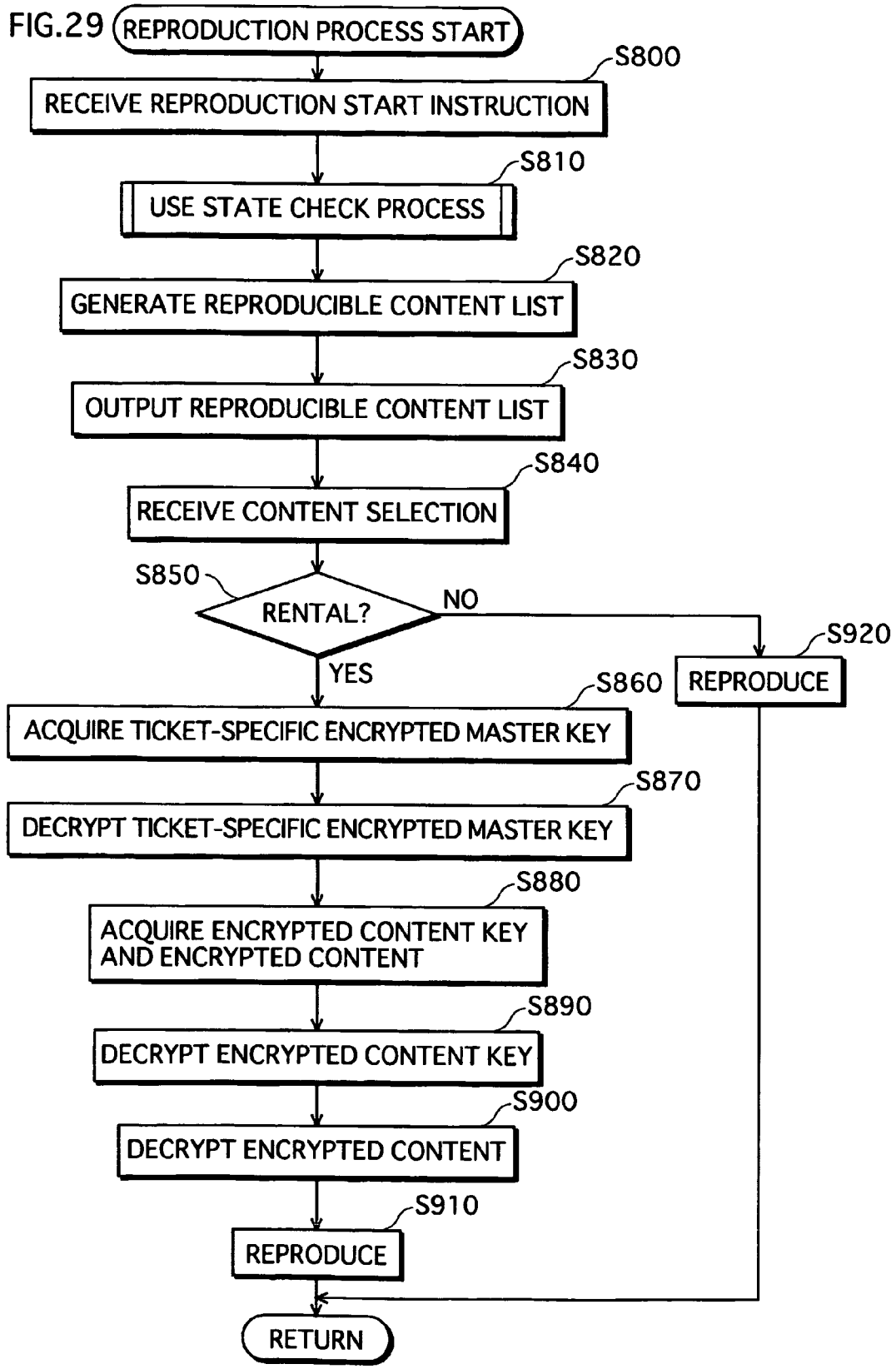
FIG. 29 is a flowchart of the reproduction process.

The description of the reproduction process executed by the reproduction apparatus 200A is omitted since it is similar to the one indicated by the flowchart shown in FIG. 29 in Embodiment 1.

It should be noted here that a reproduction of a "rental" content requires acquisition of an encrypted content key corresponding to a piece of index information including a ticket number of the license ticket for the "rental" content.

2.6.7 Operation of Use State Check Process

Figure 30:
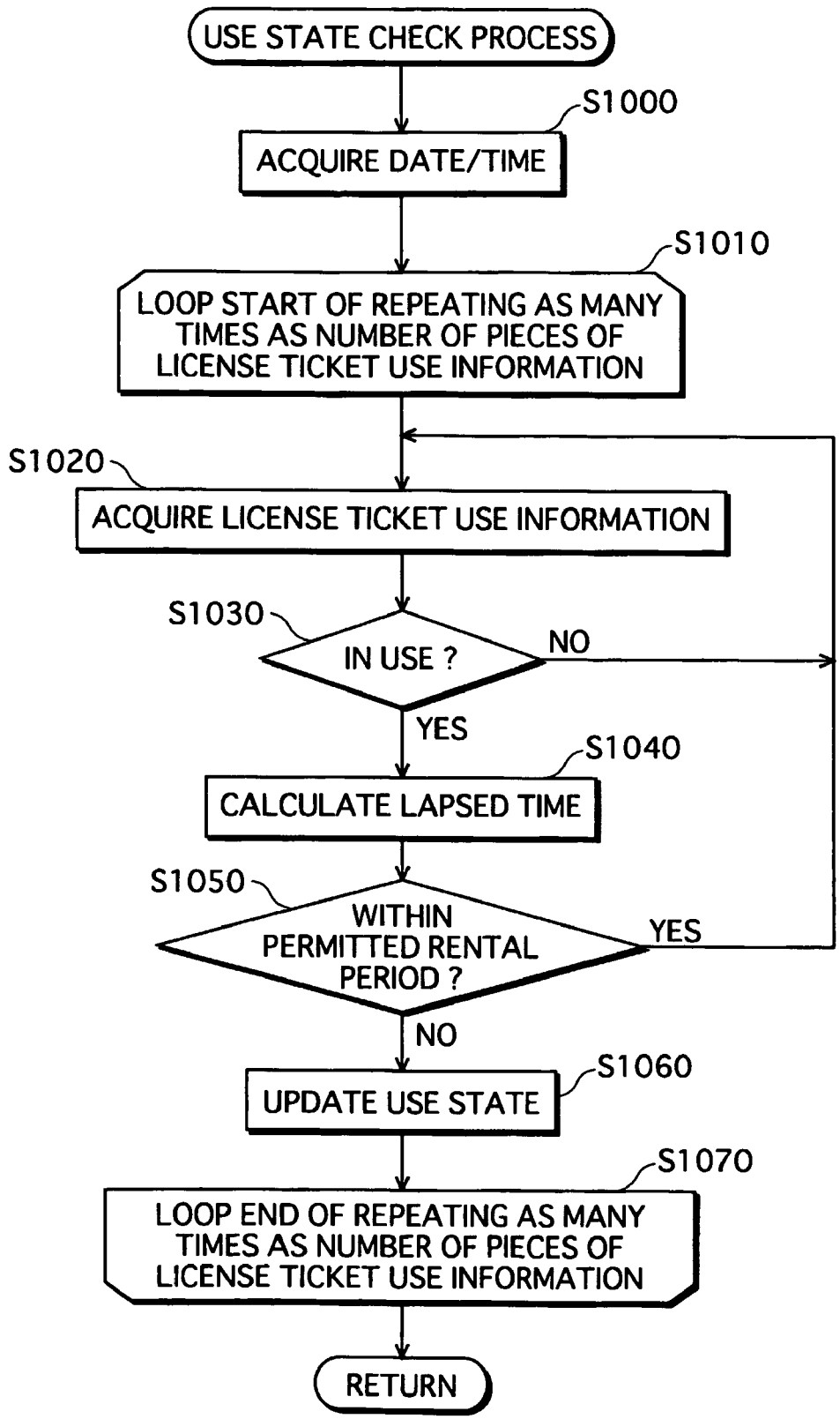
FIG. 30 is a flowchart of the use state check process.

The description of the use state check process that is executed in the reproduction process is omitted since it is similar to the one indicated by the flowchart shown in FIG. 30 in Embodiment 1.

2.6.8 Operation of Content Encryption Process

Figure 31:
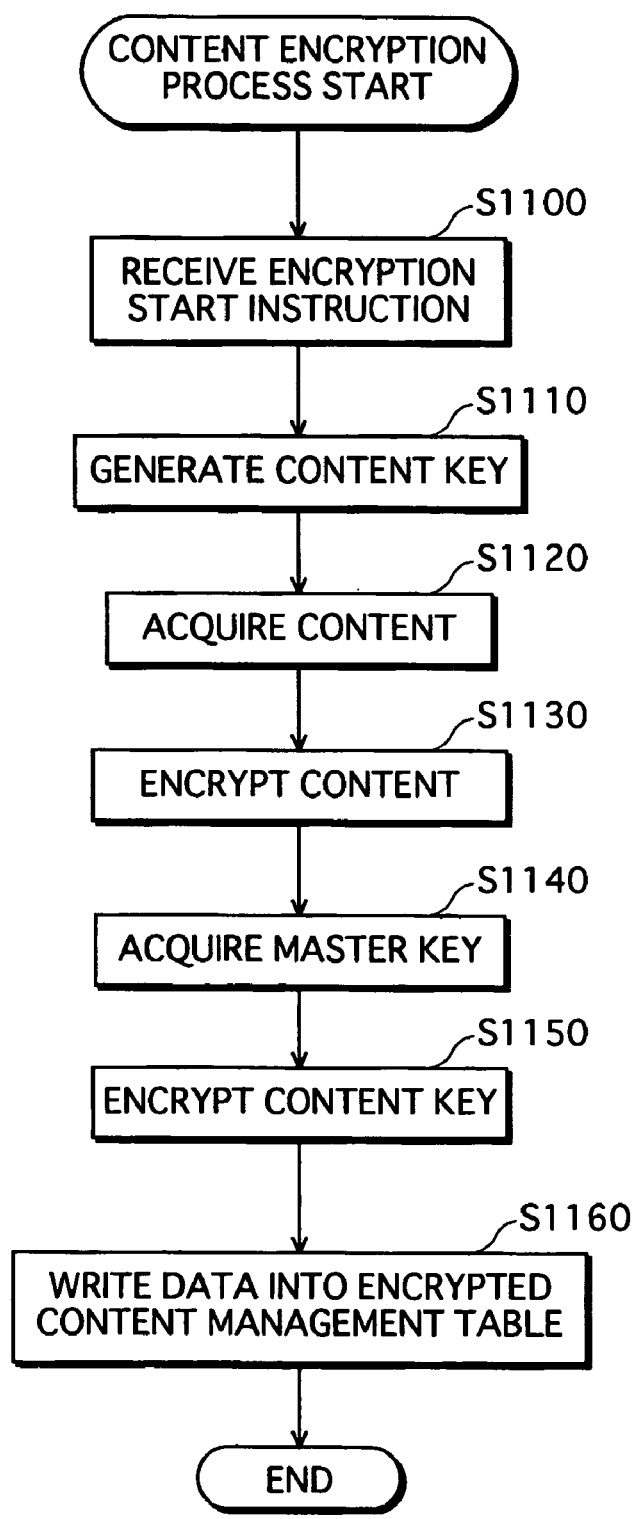
FIG. 31 is a flowchart of the content encryption process.

The description of the content encryption process performed by the content distribution apparatus 400A is omitted since it is similar to the one indicated by the flowchart shown in FIG. 31 in Embodiment 1.

It should be noted here that the number of generated encrypted content keys is the same as the number of master keys stored in the master key storage unit 402A, and that content IDs, generated encrypted contents, encrypted content keys, and pieces of index information corresponding to the encrypted content keys are written into the encrypted content management table T410A.

2.6.9 Master Key Revocation Process

Figure 40:
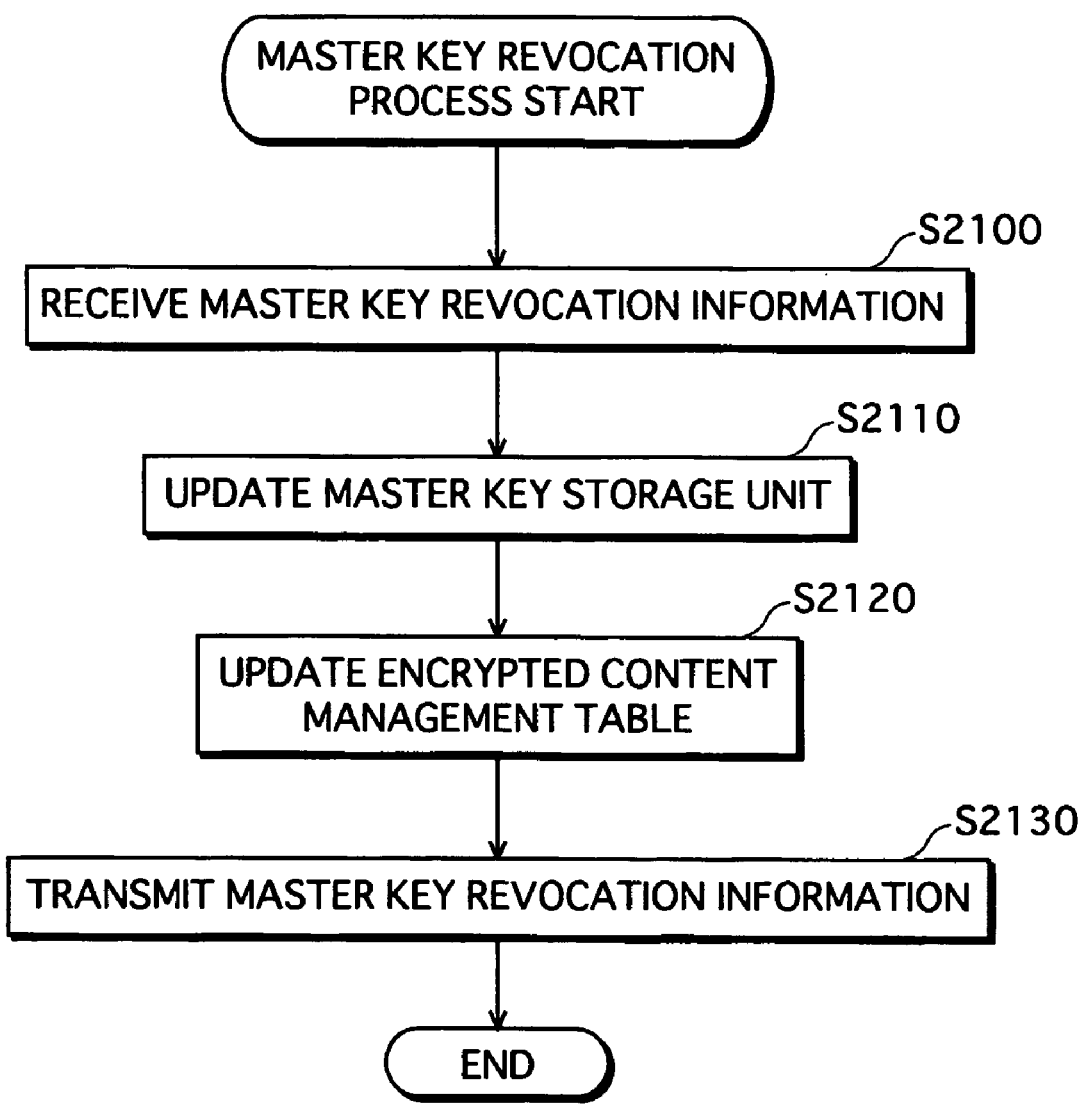
FIG. 40 is a flowchart of the master key revocation process.

The master key revocation process that is executed when the content distribution apparatus 400A receives the master key revocation information will be described with reference to the flowchart shown in FIG. 40.

The content distribution apparatus 400A receives the master key revocation information (step S2100). The content distribution apparatus 400A then refers to the received master key revocation information and updates the master key storage unit 402A by deleting, from the storage unit 402A, master keys that are unusable (step S2110). The content distribution apparatus 400A further refers to the received master key revocation information and updates the encrypted content management table T410A by deleting the encrypted content keys that were encrypted using the revoked master keys, and deleting the index information accompanied with the encrypted content keys (step S2120).

The content distribution apparatus 400A further transmits the received master key revocation information to the license ticket generation apparatus 300A (step S2130).

It should be noted here that the step S2120 is performed for each piece of information stored in the encrypted content management table T410A.

2.7 Summary of Embodiment 2

As described above, in the prepaid card system 2, the recording medium 100A stores encrypted master keys, and the content distribution apparatus 400A stores pairs of an encrypted content key and an encrypted content in the encrypted content management table, each pair corresponding to a different content. The encrypted content keys can be decrypted using master keys that are acquired by decrypting encrypted master keys stored in the recording medium 100A. This means that there is no limit to the contents that the user can request from the content distribution apparatus 400A. That is to say, there is no need for the user, in advance when the user purchases the recording medium 100A, to determine contents he/she would like to purchase, and the user can select desired contents after he/she purchases the recording medium 100A.

The recording medium 100A may store a use period as a use rule for each content. The user acquires a content by specifying a period within the use period stored in the recording medium 100, and views the acquired content for the specified period.

The recording medium 100A may store content IDs of available contents, where a wild card notation can be used to indicate available contents. This enables the user to select a combination of available contents among a number of contents that can be distributed from the content distribution apparatus 400A.

When purchasing the recording medium 100, the user pays a fee for renting or purchasing contents. As a result, the present system does not need PKI for realizing the payment using the Internet, or a center for managing the use fees of the users. The present system is therefore simple, and does not require a complicated process. Also, there is a payment method in which a kiosk terminal is used to record a content for purchase into a recording medium. According to this payment method, the user needs to determine contents for purchase when he/she uses the kiosk terminal. However, according to the present system, there is no need for the user, in advance when the user purchases the recording medium 100A, to determine contents he/she would like to purchase, and there is no need for the user to use the payment method in which a kiosk terminal is used.

In the present system, a master key used to encrypt a content key is encrypted by the common key encryption system using a device key held by the reproduction apparatus permitted to reproduce the content. This prevents the master key from being read and revealed by an apparatus not permitted to reproduce the content.

With the use of Broadcast Encryption (BE) as a method of generating encrypted content keys, even if a master key is revealed, the revealed master key can be revoked, so that the corresponding content cannot be decrypted. This enhances the security.

3. Embodiment 3

3.1 Construction of Prepaid Card System 3

Figure 41:
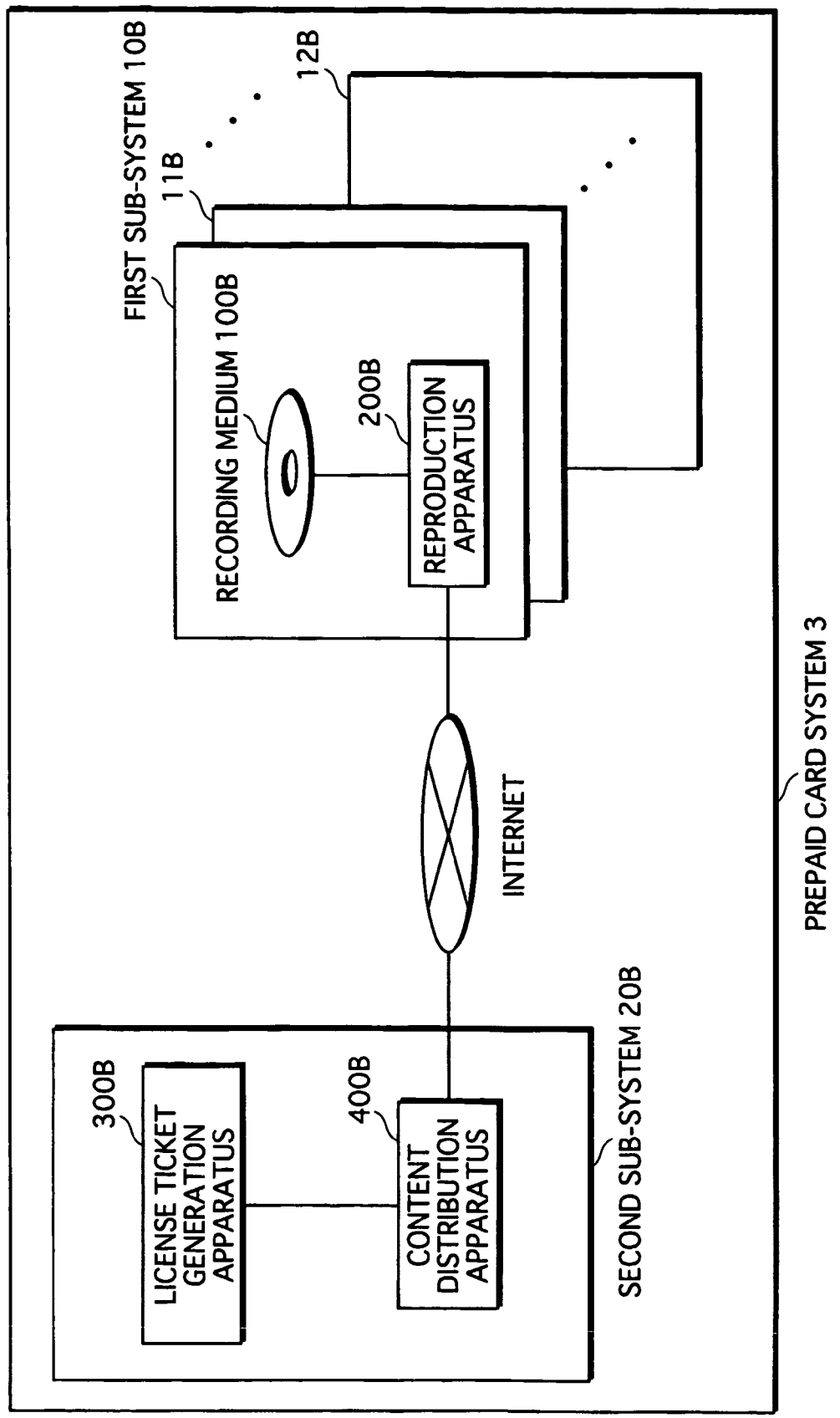
FIG. 41 is a block diagram showing the construction of the prepaid card system 3.

The construction of the prepaid card system 3 as Embodiment 3 of the present invention will be described. The prepaid card system 3 has a similar construction to the prepaid card system 2 explained in Embodiment 2, and as shown in FIG. 41, includes first sub-systems 10B, 11B, ... 12B and a second sub-system 20B. The first sub-system 10B includes a recording medium 100B and a reproduction apparatus 200B, where the recording medium 100B can be inserted into and removed from the reproduction apparatus 200B. The recording medium 100B is an optical disc. The first sub-systems 11B, ... 12B have the same construction as the first sub-system 10B. The second sub-system 20B includes a license ticket generation apparatus 300B and a content distribution apparatus 400B which are interconnected in a network via a dedicated line.

The prepaid card system 3 differs from the prepaid card system 2 in the master key management method and the BE application method.

In the present embodiment, the master keys are managed by the tree structure. The key management method used in the present embodiment is based on a tree structure pattern division method proposed in "*Digital Content Hogo-you Kagi Kanri Houshiki (Key Management Method for Protecting*

*Digital Content—Tree Structure Pattern Division Method)*", Toshihisa NAKANO et al., Symposium on Cryptography and Information Security 2002.

It should be noted here that in the present embodiment, the device keys used in the tree structure pattern division method are replaced with master keys.

How keys are managed using master keys based on the tree structure pattern division method will be described with reference to FIG. 42.

Figure 42:
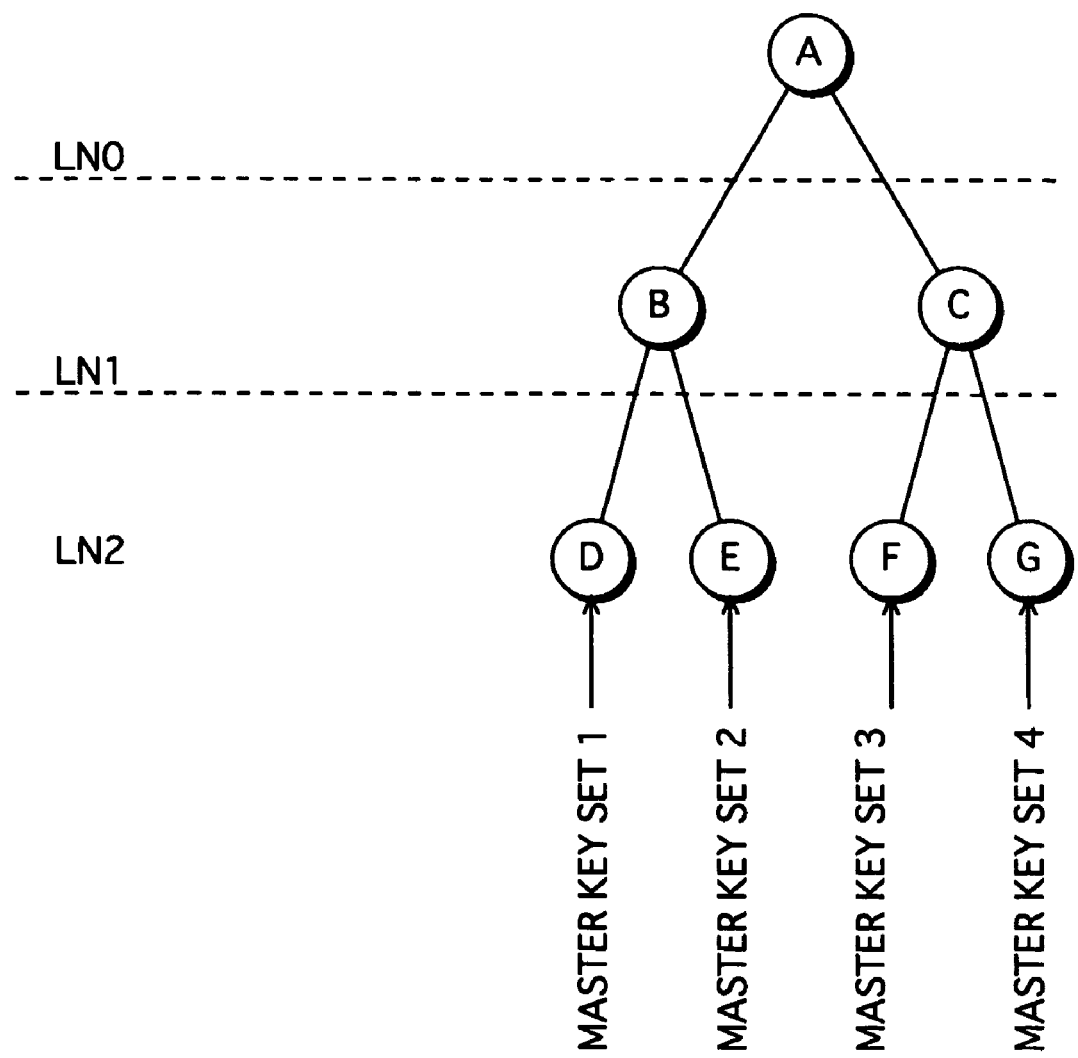
FIG. 42 shows how keys are managed based on the tree structure.

The signs "A", "B", "C", "D", "E", "F", "G" shown in FIG. 42 are called nodes. The node "A" in the highest layer is called root. The nodes "D", "E", "F", "G" in the lowest layer are called leaves. Each node can be linked to other nodes across the layers by paths. The layers are assigned with serial numbers "0", "1", "2", . . . in the order starting with the highest layer. The layer numbers are represented as "LN". For example, the layer number of the layer having the node "A" is "0"; the layer number of the layer having the nodes "B", "C" is "1"; and the layer number of the layer having the nodes "D", "E", "F", "G" is "2". When a certain node is linked to a node in the upper layer by a path, the node in the upper layer is called "parent node" in terms of the certain node. For example, the parent node of the node "B" is the node "A". Also, when a certain node is linked to a node in the lower layer by a path, the node in the lower layer is called "child node" in terms of the certain node. For example, the node "B" has child nodes "D", "E". To identify a plurality of nodes in each layer, serial numbers "0", "1", "2", . . . are assigned to the nodes the layer in the order from left to right. The numbers are referred to as relative node numbers (RNN). When a descendant (leaf) of a certain node should be revoked, the certain node is referred to as a "revocation node". For example, when the leaf "E" should be revoked, the nodes "A" and "B" are revocation nodes. Also, numbers "0" and "1" are used to indicate whether each of a plurality of child nodes of a node is a revocation node. When a child node is not a revocation node, it is represented by "0"; and when a child node is a revocation node, it is represented by "1". A combination of the numbers that are arranged in the order of the child nodes from left to right is referred to as a node revocation pattern (hereinafter, referred to as NRP). For example, the node "A" has three NRPs "00", "10", and "01" (NRP "11" is not considered in the present embodiment).

In the key management method using master keys based on the tree structure pattern division method, each node except for leaves, is assigned with a master key that differs with each NRP. Each of the assigned master keys is identified by the LN, RNN, and NRP. A master key with the LN, RNN, and NRP is represented as "$_{LN\text{-}RNN}K_{NRP}$". For example, the node "A" is assigned with master keys represented as "$_{0\text{-}0}K_{00}$", "$_{0\text{-}0}K_{01}$", and "$_{0\text{-}0}K_{10}$". It should be noted here that since a master key assigned to a node whose child nodes are all revocation nodes is not used, there is no need to assign a master key to such a node. Also, when all child nodes of a certain node are not revocation nodes, a key in the upper layer can be used. As a result, in this case, a master key corresponding to NRP "00" is not necessary for each node except for the root.

A plurality of master keys are assigned to each leaf as follows. That is to say, all the master keys that are assigned to the nodes placed on a path from a leaf to the root are assigned to the leaf, except for a master key that corresponds to the NRP for a case where the leaf is revoked. For example, the leaf "D" is assigned with master keys "$_{0\text{-}0}K_{00}$", "$_{0\text{-}0}K_{01}$", and "$_{1\text{-}0}K_{01}$". FIG. 43A shows the master keys assigned to each node.

A plurality of master keys assigned to each leaf is referred to as a master key set. FIG. 42 shows master key sets "1", "2", "3", and "4" in the order from left to right. FIG. 43B shows the master keys that belong to each master key set.

Now, how to select a master key for use in encryption of a content key will be described. First, when none of the master key sets has been revoked, an encrypted content "Enc($_{0\text{-}0}K_{00}$, CK)" is generated by encrypting a content key "CK" using a master key "$_{0\text{-}0}K_{00}$". Since the master key "$_{0\text{-}0}K_{00}$" is included in each master key set, any master key set can be used to decrypt the encrypted content "Enc($_{0\text{-}0}K_{00}$, CK)", and obtain the original content.

Next, how to select a master key when a master key set is revoked will be described. It is supposed here that the master key set "2" is revoked. When the master key set "2" is revoked, nodes "A", "B", and "E" are revocation nodes. Then, master keys corresponding to the NRPs of the revocation nodes except for leaves are selected as the master keys to be used for encrypting the content keys. In this example, the master key "$_{0\text{-}0}K_{10}$" is selected in correspondence with the node "A", and the master key "$_{1\text{-}0}K_{01}$" is selected in correspondence with the node "B". Encrypted contents "Enc($_{0\text{-}0}K_{10}$, CK)" and "Enc($_{1\text{-}0}K_{01}$, CK)" are generated by encrypting a content key "CK" using the master keys "$_{0\text{-}0}K_{10}$" and "$_{1\text{-}0}K_{01}$". Since the master key "$_{0\text{-}0}K_{00}$" is included in each master key set, any master key set can be used to decrypt the encrypted content "Enc($_{0\text{-}0}K_{00}$, CK)", and obtain the original content. The revoked master key set "2" does not include master keys "$_{0\text{-}0}K_{10}$" and "$_{1\text{-}0}K_{01}$". As a result, the revoked master key set "2" cannot be used to decrypt the encrypted content "Enc ($_{0\text{-}0}K_{10}$, CK)" or "Enc ($_{1\text{-}0}K_{01}$, CK)". On the other hand, the other master key sets include master keys "$_{0\text{-}0}K_{10}$" and "$_{1\text{-}0}K_{01}$", and therefore can be used to decrypt the encrypted content "Enc($_{0\text{-}0}K_{10}$, CK)" or "Enc ($_{1\text{-}0}K_{01}$, CK)", and obtain the original content.

In the explanation up to now, a binary tree with the depth level 2 is used for the sake of convenience. However, not limited to this, "n"-ary tree with the depth level "m" may be used in so far as the number of leaves is not smaller than the number of managed master key sets, where "n" and "m" are integers.

The following describes the construction of the prepaid card system 3 focusing on the differences from the prepaid card systems 1 and 2.

3.2 Construction of Recording Medium 100B

The construction of the recording medium 100B will be described.

Figure 44:
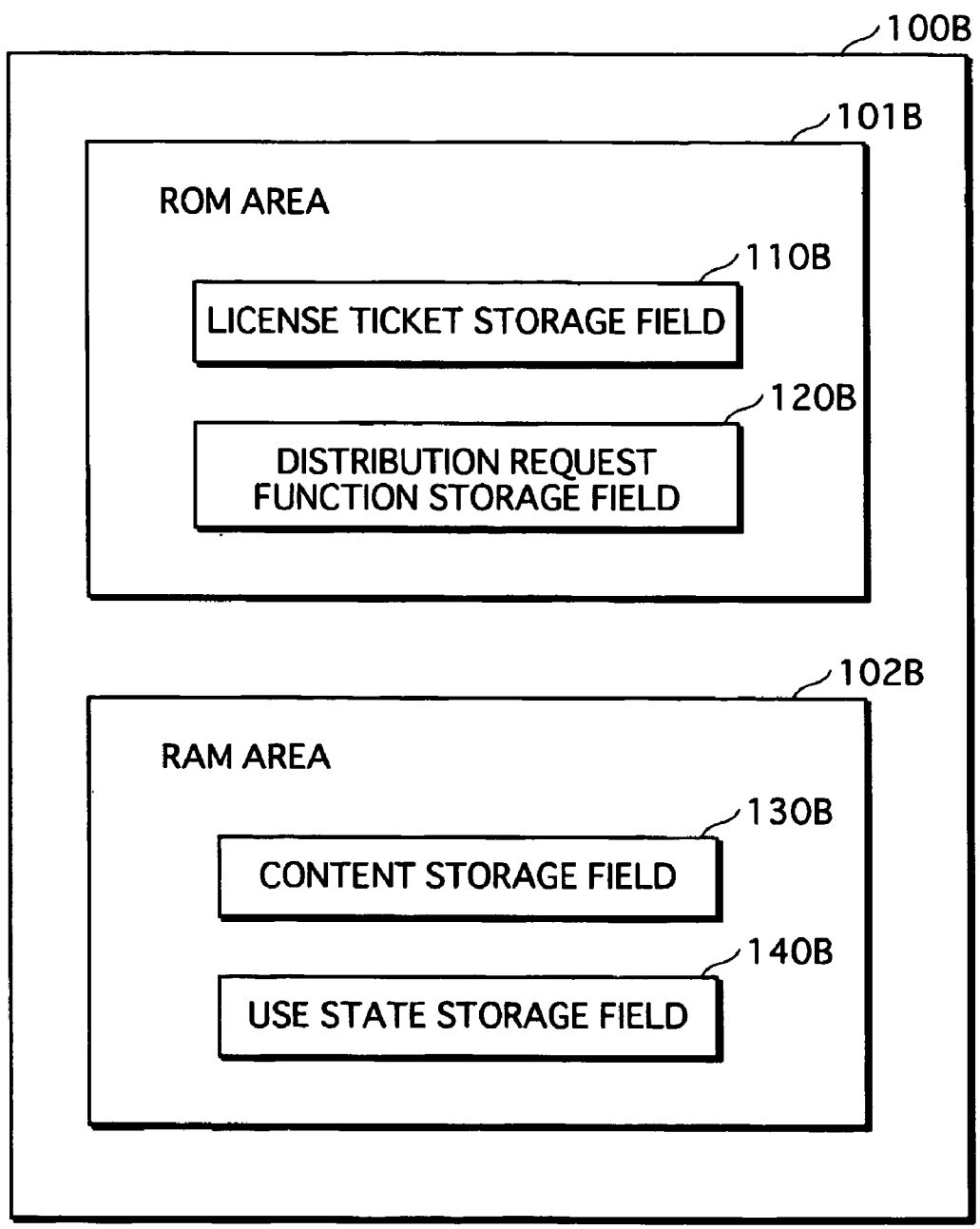
FIG. 44 is a block diagram of the recording medium 100B.

As shown in FIG. 44, the recording medium 100B includes a ROM area 101B and a RAM area 102B. The ROM area 101B is a read-only area, and includes a license ticket storage field 110B and a distribution request function storage field 120B. The RAM area 102B allows data to be read and written from/into itself, and includes a content storage field 130B and a use state storage field 140B.

The explanation of the recording mediums contained in the first sub-systems 11B, . . . 12B is omitted since they have the same construction as the recording medium 100B.

3.2.1 License Ticket Storage Field 110B

The license ticket storage field 110B includes, as shown in FIG. 45 as one example, a license ticket table T100B.

The license ticket table T100B differs from the license ticket tables shown in Embodiments 1 and 2 in that it has a column for the ticket-specific encrypted master key set instead of the column for the ticket-specific encrypted master key. The ticket-specific encrypted master key sets are generated by encrypting the master key sets using a device key.

The master key sets are represented as "WKS1", "WKS2", ... "WKS10".

3.2.2 Distribution Request Function Storage Field 120B

The distribution request function storage field 120B, as is the case with the distribution request function storage field 120A shown in Embodiment 2, stores a distribution request program and information of: an available content list screen; a use form selection screen; a for-rent ticket selection screen; and a for-purchase ticket selection screen.

The distribution request program in Embodiment 3 operates differently in the purchase process from the one in Embodiment 1. The difference will be explained with reference to FIG. 17 that was also used in Embodiment 1.

In step S420, the reproduction apparatus 200B acquires a ticket-specific encrypted master key set. In step S425, the reproduction apparatus 200B acquires a master key set by decrypting the acquired ticket-specific encrypted master key set. Also, an additional step is executed between the steps S425 and S430. In the additional step, the reproduction apparatus 200B acquires a master key that is to be used for decryption, using the acquired master key set and a piece of index information contained in a piece of distribution content information received in the content acquisition process.

After the execution of the additional step, the step S430 and onwards shown in FIG. 17 are executed.

3.2.3 Content Storage Unit 130B

The content storage unit 130B has the same construction as the content storage unit 130A shown in Embodiment 2, except that the rental content storage field 131B stores encrypted contents in a different manner. As shown in FIG. 46, the rental content storage field 131B stores sets of an encrypted content and one or more pairs of a piece of index information and an encrypted content key, by associating the sets with the respective content IDs. It should be noted here that the index information concerns a master key used in decrypting an encrypted content key, namely a master key used in encrypting a content key. The number of the one or more pairs of a piece of index information and an encrypted content key in each set is one when all the master key sets are valid. When there is a revoked master key set, the number of the one or more pairs of a piece of index information and an encrypted content key in each set is equal to the number of master keys that are selected during the revocation of the master key set. For example, FIG. 46 shows the case where all the master key sets are valid, and the index information "Ind1" concerns a master key included in each of the valid master key sets.

3.2.4 Use State Storage Field 140B

The use state storage field 140B, as is the case with the use state storage field 140 shown in Embodiment 1, includes a use state table T150B. The explanation of the use state table T150B in terms of the data structure is omitted here since it is the same as the use state table T150.

3.3 Construction of Reproduction Apparatus 200B

The construction of the reproduction apparatus 200A will be described.

Figure 47:
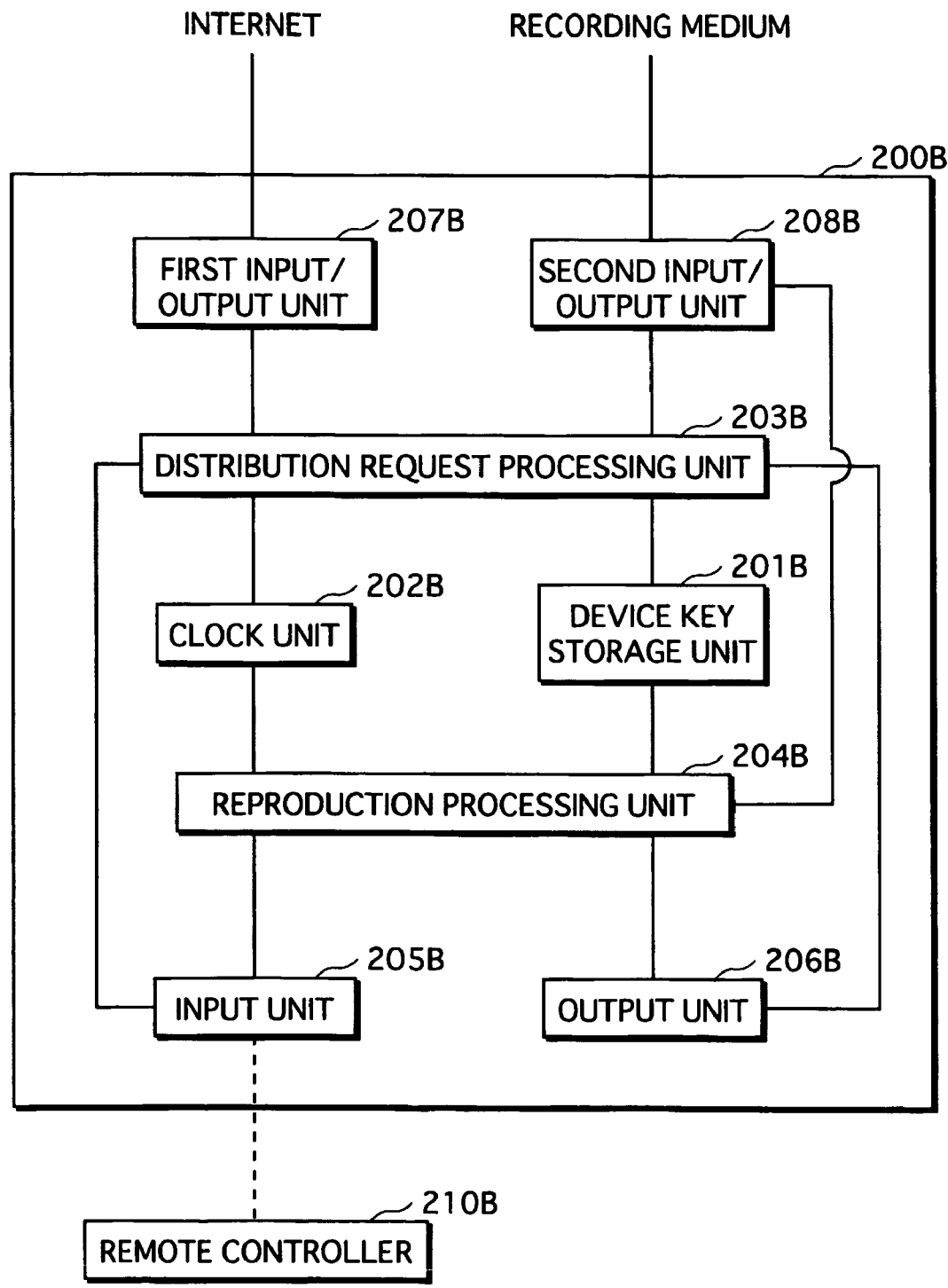
FIG. 47 is a block diagram of the reproduction apparatus 200B.

As shown in FIG. 47, the reproduction apparatus 200B includes a device key storage unit 201B, a clock unit 202B, a distribution request processing unit 203B, a reproduction processing unit 204B, an input unit 205B, an output unit 206B, a first input/output unit 207B, a second input/output unit 208B, and a remote controller 210B.

The reproduction apparatus 200B is specifically a computer system that includes a microprocessor, ROM, RAM, a hard disk unit and the like. A computer program is stored in the ROM or the hard disk unit. The microprocessor operates in accordance with the computer program and causes the reproduction apparatus 200B to execute the functions.

The reproduction apparatus 200B is further connected to a television (not illustrated) via the output unit 206B. Not limited to the television, the reproduction apparatus 200B may be connected to other apparatuses that can receive video and/or audio data from the reproduction apparatus 200B and output them as images and/or sound.

Note that the explanation of the reproduction apparatuses contained in the first sub-systems 11B, ... 12B is omitted since they have the same construction as the reproduction apparatus 200B.

3.3.1 Device Key Storage Unit 201B

The explanation of the device key storage unit 201B is omitted since it is similar to the device key storage unit 201A shown in Embodiment 2.

3.3.2 Clock Unit 202B

The explanation of the clock unit 202B is omitted since it is similar to the clock unit 201A shown in Embodiment 2.

3.3.3 Distribution Request Processing Unit 203B

When the distribution request processing unit 203B receives a distribution request start instruction start a distribution request process from the remote controller 210B via the input unit 205B, the distribution request processing unit 203B reads a distribution request function from the recording medium 100B via the second input/output unit 208B, and executes the read distribution request function. The following describes the distribution request function executed by the distribution request processing unit 203B, focusing on the difference from Embodiment 1.

The difference is in the decryption of an encrypted content key and an encrypted content that is performed after the distribution content information is received for purchasing a content. The following is a description of the operation after the distribution content information is received.

The distribution request processing unit 203B receives a piece of distribution content information from the content distribution apparatus 400B, where the distribution content information includes a content ID, one or more pairs of a piece of index information and an encrypted content key, and an encrypted content. It should be noted here that the number of the one or more pairs of a piece of index information and an encrypted content key is one when all the master key sets are valid, and when there is a revoked master key set, the number of the one or more pairs of a piece of index information and an encrypted content key is equal to the number of master keys that are selected during the revocation of the master key set.

After the reception of the distribution content information is completed, the distribution request processing unit 203B acquires a reception completion date/time from the clock unit 202B, and temporarily stores the acquired reception completion date/time. The distribution request processing unit 203B then generates a master key set by decrypting a ticket-specific encrypted master key set included in a license ticket that corresponds to the temporarily stored for-purchase license ticket information. The distribution request processing unit 203B then generates a content key by decrypting an encrypted content key using the generated master key set and the one or more pairs of a piece of index information and an encrypted content key included in the received distribution content information. The distribution request processing unit 203B then generates a content by decrypting an encrypted content included in the received piece of distribution content information, using the generated content key. The distribution request processing unit 203B stores the generated content in the purchase content storage field 132 of the recording medium 100B.

The distribution request processing unit 203B updates the use state table T150A using the temporarily stored for-purchase license ticket information, the use form, and the distribution content information reception completion date/time acquired from the clock unit 202B. The procedure of updating the table is not described here since it is similar to the procedure shown in Embodiment 1.

3.3.4 Reproduction Processing Unit 204B

The reproduction processing unit 204B reproduces a content while the recording medium 100B is inserted in the reproduction apparatus 200B.

The description of the reproduction processing unit 204B is omitted here since it is similar to the reproduction processing unit 204 shown in Embodiment 1.

It should be noted here that in Embodiment 3, to reproduce a "rental" content, a ticket-specific encrypted master key set is decrypted to generated a master key set, a content key is generated by decrypting an encrypted content key using the generated master key set and the index information, and a content is generated by decrypting an encrypted content using the generated content key.

3.3.5 Input Unit 205B

The explanation of the input unit 205B is omitted since it is similar to the input unit 205 shown in Embodiment 1.

3.3.6 Output Unit 206B

The explanation of the output unit 206B is omitted since it is similar to the output unit 206 shown in Embodiment 1.

3.3.7 First Input/Output Unit 207B

The explanation of the first input/output unit 207B is omitted since it is similar to the first input/output unit 207 shown in Embodiment 1.

3.3.8 Second Input/Output Unit 208B

The explanation of the second input/output unit 208B is omitted since it is similar to the second input/output unit 208 shown in Embodiment 1.

3.3.9 Remote Controller 210B

The explanation of the remote controller 210B is omitted since it is similar to the remote controller 210 shown in Embodiment 1.

3.4 Construction of License Ticket Generation Apparatus 300B

The construction of the license ticket generation apparatus 300B will be described.

Figure 48:
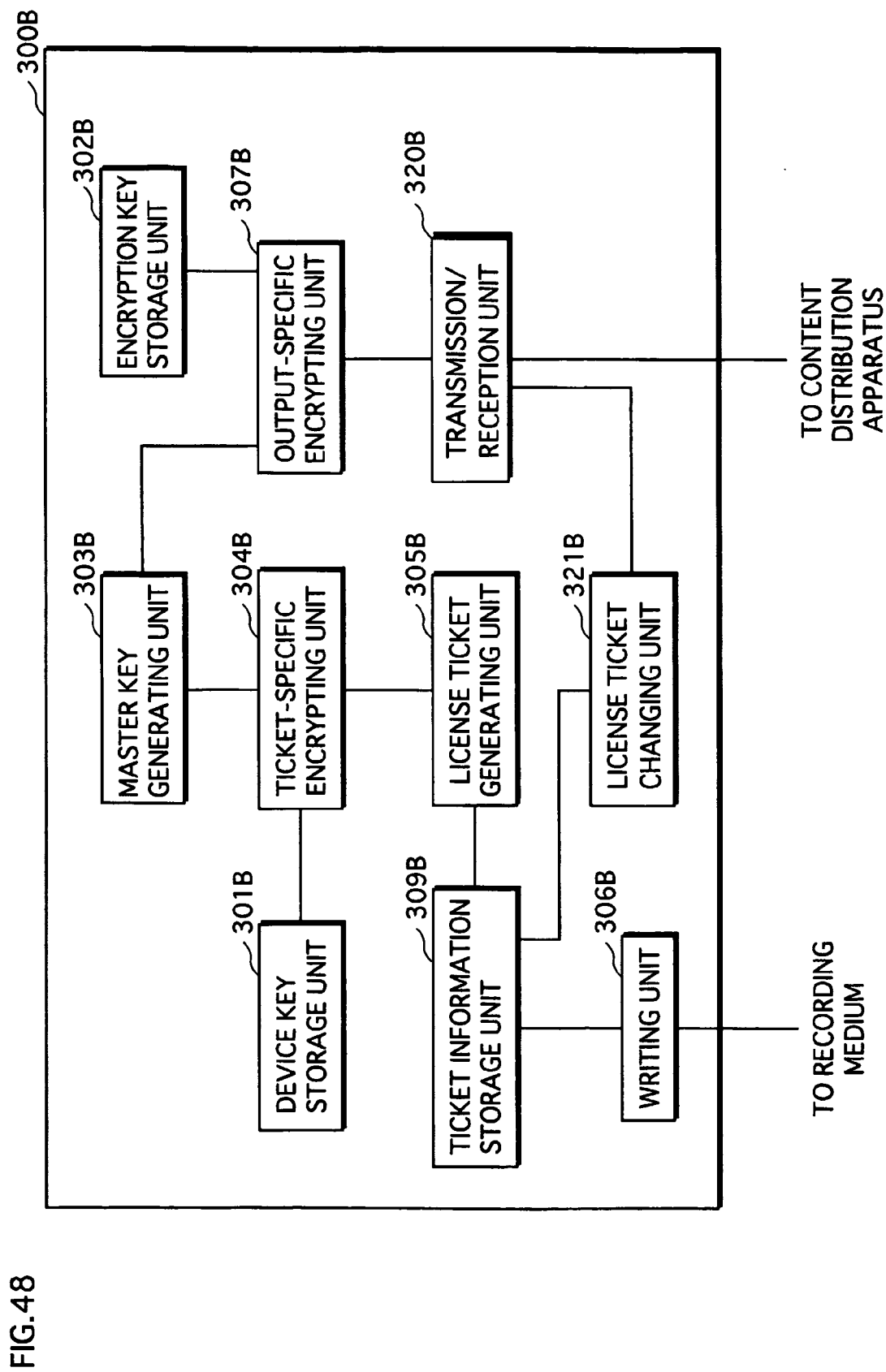
FIG. 48 is a block diagram of the license ticket generation apparatus 300B.

As shown in FIG. 48, the license ticket generation apparatus 300B includes a device key storage unit 301B, an encryption key storage unit 302B, a master key generating unit 303B, a ticket-specific encrypting unit 304B, a license ticket generating unit 305B, a writing unit 306B, an output-specific encrypting unit 307B, a ticket information storage unit 309B, a transmission/reception unit 320B, and a license ticket changing unit 321B.

The license ticket generation apparatus 300B is specifically a computer system that includes a microprocessor, ROM, RAM, a hard disk unit, a display unit, a keyboard, a mouse, a modem and the like. A computer program is stored in the ROM or the hard disk unit. The microprocessor operates in accordance with the computer program and causes the license ticket generation apparatus 300B to execute the functions.

The license ticket generation apparatus 300B generates a tree structure and a plurality of master keys, and assigns the generated master keys to the nodes in the generated tree structure, except for the leaves. The license ticket generation apparatus 300B assigns master key sets to the leaves. Hereinafter, a tree structure to which master keys and master key sets have been assigned is referred to as a management tree structure.

The license ticket generation apparatus 300B further generates encrypted master keys from the master key sets using a device key, and generates a license ticket using the generated encrypted master keys. The license ticket generation apparatus 300B writes the generated license ticket into the recording medium. By repeating the writing of the generated license ticket into the recording medium, recording mediums are mass-produced.

The license ticket generation apparatus 300B also receives, from the content distribution apparatus 400B, master key set revocation information which indicates master key sets that are not used for decrypting contents. The license ticket generation apparatus 300B generates a license ticket using the received master key set revocation information.

3.4.1 Device Key Storage Unit 301B

The explanation of the device key storage unit 301B is omitted since it is similar to the device key storage unit 301 shown in Embodiment 1.

3.4.2 Encryption Key Storage Unit 302B

The encryption key storage unit 302B stores an encryption key "K" that is used to encrypt, by the common key encryption system, the management tree structure generated by the master key generating unit 303B.

3.4.3 Master Key Generating Unit 303B

The master key generating unit 303B generates a tree structure, and generates master keys using random numbers. The master key generating unit 303B then assigns the generated master keys to the nodes in the generated tree structure, except for the leaves. The master key generating unit 303B generates the management tree structure by assigning master key sets "WKS1", "WKS2", ... "WKS10" to the leaves. The master key generating unit 303B outputs the assigned master key sets to the ticket-specific encrypting unit 304B, and outputs the generated management tree structure to the output-specific encrypting unit 307B.

3.4.4 Ticket Information Storage Unit 309B

The ticket information storage unit 309B stores the license ticket table T100B and the use state table T150B.

The license ticket table T100B and the use state table T150B stored in the ticket information storage unit 309B are to be recorded in the recording medium 100B.

Here, the license ticket use information that constitutes the use state table T150B has the use number and "not used" in the use state column, and the remaining columns are blank.

The ticket information storage unit 309B also stores a distribution request function in advance.

3.4.5 Ticket-Specific Encrypting Unit 304B

The ticket-specific encrypting unit 304B generates ticket-specific encrypted master key sets "Enc(DK, WKS1)", "Enc(DK, WKS2)", ... "Enc (DK, WKS10)" by encrypting master key sets received from the master key generating unit 303B, using the device key "DK" stored in the device key storage unit 301B, and stores the generated ticket-specific encrypted master keys.

3.4.6 License Ticket Generating Unit 305B

The license ticket generating unit 305B stores, in advance, usable content IDs and use rules associated with the usable content IDs, each use rule being composed of information written in a pair of columns "rental" and "purchase".

The license ticket generating unit 305B generates the license ticket table T100B by using (a) the ticket-specific encrypted master key sets stored in the ticket-specific encrypting unit 304B and (b) the usable content IDs and the use rules prestored therein, and stores the generated license ticket table T100B in the ticket information storage unit 309B.

The license ticket generating unit 305B further generates the use state table T150B, and stores the generated use state table T150B in the ticket information storage unit 309B.

3.4.7 License Ticket Changing Unit 321B

The license ticket changing unit 321B, upon receiving the master key set revocation information from the content distribution apparatus 400B via the transmission/reception unit 320B, refers to the received master key set revocation information and updates the license ticket table T100B stored in the ticket information storage unit 309B by deleting, from the table, license tickets that include unusable master key sets. The license ticket changing unit 321B further updates the use state table T150B stored in the ticket information storage unit 309B by deleting, from the table, pieces of license ticket use information corresponding to the deleted license tickets.

3.4.8 Writing Unit 306B

The writing unit 306B writes the license ticket table T100B, use state table T150B, and distribution request function stored in the ticket information storage unit 309B, into the recording medium 100B.

It should be noted here that the license ticket table T100B, use state table T150B, and the distribution request function may be written into the recording medium 100B by stamping them onto the recording medium 100B. This enables the recording medium 100A to be produced at a low cost.

3.4.9 Output-Specific Encrypting Unit 307B

The output-specific encrypting unit 307B encrypts the management tree structure received from the master key generating unit 303B, using the encryption key "K" stored in the encryption key storage unit 302B, and transmits the generated management tree structure to the content distribution apparatus 400B via the transmission/reception unit 320B.

3.4.10 Transmission/Reception Unit 320B

The transmission/reception unit 320B receives information from the output-specific encrypting unit 307B, and transmits the received information to the content distribution apparatus 400B. The transmission/reception unit 320B also receives information from the content distribution apparatus 400B and transmits the received information to the license ticket generating unit 305B.

3.5 Construction of Content Distribution Apparatus 400B

The construction of the content distribution apparatus 400B will be described.

Figure 49:
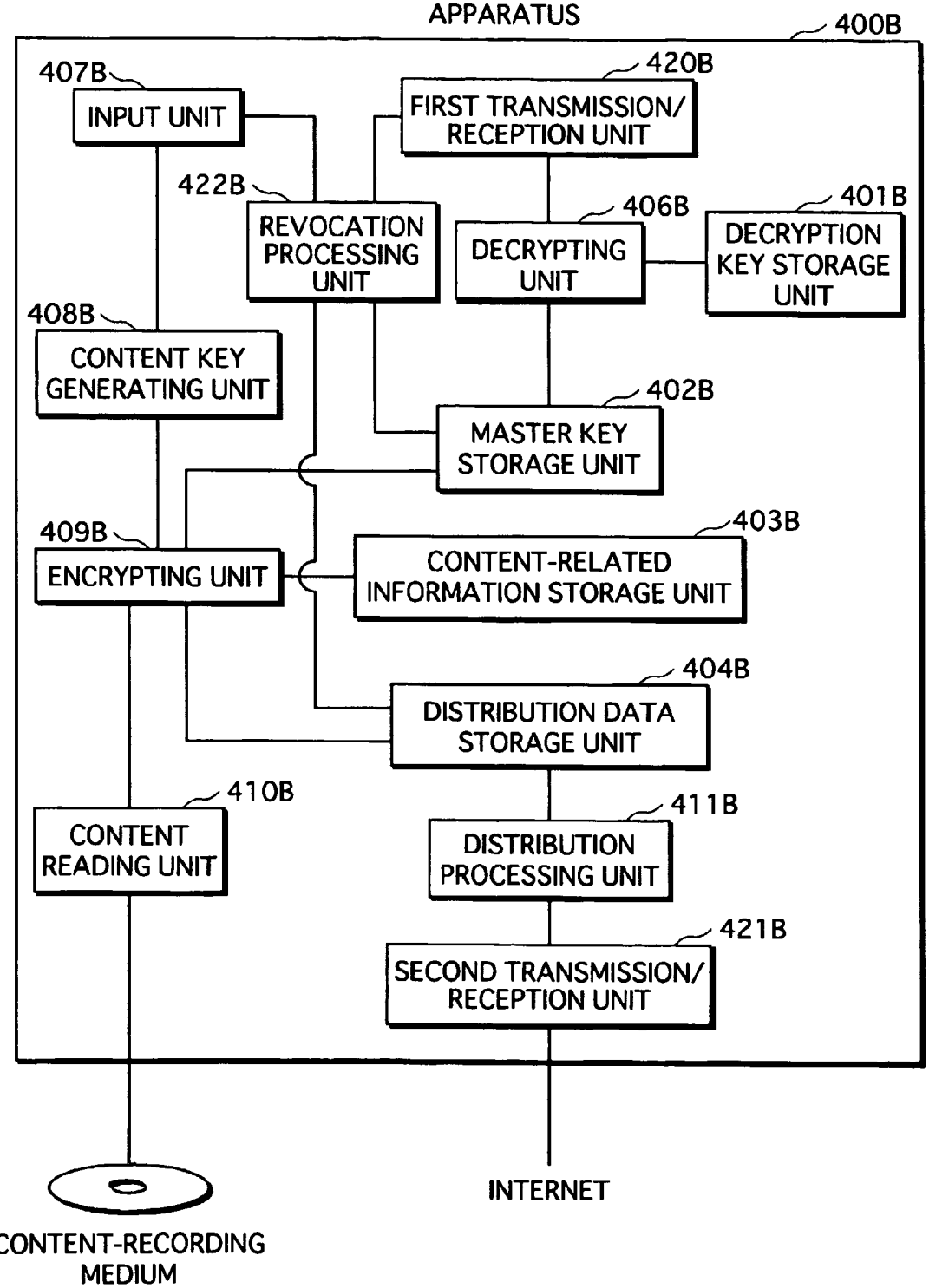
FIG. 49 is a block diagram of the content distribution apparatus 400B.

As shown in FIG. 49, the content distribution apparatus 400B includes a decryption key storage unit 401B, a master key storage unit 402B, a content-related information storage unit 403B, a distribution data storage unit 404B, a decrypting unit 406B, an input unit 407B, a content key generating unit 408B, an encrypting unit 409B, a content reading unit 410B, a distribution processing unit 411B, a first transmission/reception unit 420B, a second transmission/reception unit 421B, and revocation processing unit 422B.

The content distribution apparatus 400B is specifically a computer system that includes a microprocessor, ROM, RAM, a hard disk unit, a display unit, a keyboard, a mouse, a modem and the like. A computer program is stored in the ROM or the hard disk unit. The microprocessor operates in accordance with the computer program and causes the content distribution apparatus 400B to execute the functions.

A content-recording medium containing a content ID and a content can be inserted into and removed from the content distribution apparatus 400B. The content distribution apparatus 400B encrypts a content while the content-recording medium containing the content is inserted therein.

3.5.1 Decryption Key Storage Unit 401B

The explanation of the decryption key storage unit 401B is omitted since it is similar to the decryption key storage unit 401 shown in Embodiment 1.

3.5.2 Master Key Storage Unit 402B

The master key storage unit 402B stores a management tree structure that is generated by the decrypting unit 406B as a result of decryption. The master key storage unit 402B also stores a piece of index information corresponding to a master key that is currently used.

3.5.3 Content-Related Information Storage Unit 403B

The content-related information storage unit 403B, as is the case with the content-related information storage unit 403, stores a content-related information table T400B.

The explanation of the content-related information table T400B is omitted since it is similar to the content-related information table T400.

3.5.4 Distribution Data Storage Unit 404B

The distribution data storage unit 404B, as is the case with the distribution data storage unit 404, includes an encrypted content management table T410B.

The explanation of the encrypted content management table T410B is omitted since it is similar to the encrypted content management table T410 shown in Embodiment 1.

In the present embodiment, each encrypted content key contained in the encrypted content information is accompanied with a piece of index information. The number of the one or more pairs of a piece of index information and an encrypted content key is one when all the master key sets are valid. When there is a revoked master key set, the number of the one or more pairs of a piece of index information and an encrypted content key is equal to the number of master keys that are selected during the revocation of the master key set.

3.5.5 First Transmission/Reception Unit 420b

The first transmission/reception unit 420B receives the encrypted management tree structure from the license ticket generation apparatus 300B, and outputs the received encrypted management tree structure to the decrypting unit 406B.

The first transmission/reception unit 420B also receives the master key set revocation information from the revocation processing unit 422B, and transmits the received master key set revocation information to the license ticket generation apparatus 300B.

3.5.6 Decrypting Unit 406B

The decrypting unit 406B, upon receiving the encrypted management tree structure from the first transmission/reception unit 420B, acquires a decryption key from the decryption key storage unit 401B, and decrypts the encrypted management tree structure using the acquired decryption key, and writes the management tree structure, which is obtained as a result of the decryption, into the master key storage unit 402B. The decrypting unit 406B also writes the index information of a master key that is used when all the master keys are valid, into the master key storage unit 402B.

3.5.7 Input Unit 407B

The input unit 407B receives an encryption start instruction to start encrypting a content, and outputs the received encryption start instruction to the content key generating unit 408B.

The input unit 407B also receives the master key set revocation information, and outputs the received master key set revocation information to the revocation processing unit 422B.

3.5.8 Content Key Generating Unit 408B

The explanation of the content key generating unit 408B is omitted since it is similar to the content key generating unit 408 shown in Embodiment 1.

3.5.9 Revocation Processing Unit 422B

The revocation processing unit 422B, upon receiving the master key set revocation information from the input unit 407B, refers to the received master key set revocation information to revoke unusable master key sets and the nodes on the paths that link the unusable master key sets with the root, and selects a master key that can be used.

The revocation processing unit 422B generates content keys by decrypting encrypted content keys in the encrypted content management table T410B, using corresponding pieces of index information and the management tree structure, and generates encrypted content keys by encrypting the generated content keys using the selected master keys. It should be noted here that as many encrypted content keys as the number of selected master keys are generated. The information is updated based on the generated encrypted content keys. This operation is performed in correspondence with each piece of information recorded in the encrypted content management table T410B. The revocation processing unit 422B writes the index information corresponding to the selected master keys, into the master key storage unit 402B.

The revocation processing unit 422B also transmits the received master key set revocation information to the license ticket generation apparatus 300B via the first transmission/reception unit 420B.

3.5.10 Encrypting Unit 409B

The encrypting unit 409B, upon receiving the content key from the content key generating unit 408B, outputs a content acquisition request, which requests acquisition of a content ID and a content, to the content reading unit 410B, and receives the requested content ID and content from the content reading unit 410B.

The encrypting unit 409B then generates an encrypted content by encrypting the content using the received content key by the common key encryption system.

The encrypting unit 409B acquires a piece of index information and a master key, which corresponds to the acquired piece of index information, from the master key storage unit 402B, and generates an encrypted content key by encrypting the content key using the acquired master key, by the common key encryption system.

The encrypting unit 409B also acquires, from the content-related information table T400B, a content name and a price that correspond to the content ID received from the content reading unit 410B.

The encrypting unit 409B then writes a set of (a) the generated encrypted content, (b) a pair of the acquired index information and the generated encrypted content key, (c) the content ID received from the content reading unit 410B, and (d) the pair of a content name and a price acquired from the content-related information table T400B, into the distribution data storage unit 404B.

3.5.11 Content Reading Unit 410B

The explanation of the content reading unit 410B is omitted since it is similar to the content reading unit 410 shown in Embodiment 1.

2.5.12 Distribution Processing Unit 411B

The distribution processing unit 411B, upon receiving the content list information request from the reproduction apparatus 200B via the second transmission/reception unit 421B, generates the content list information using the encrypted content management table T410B, and transmits the generated content list information to the reproduction apparatus 200B via the second transmission/reception unit 421B.

The distribution processing unit 411B, upon receiving the content distribution information request from the reproduction apparatus 200B via the second transmission/reception unit 421B, acquires, from the encrypted content management table T410B, a content ID, which is the same as a content ID contained in the received content distribution information, one or more pairs of a piece of index information and an encrypted content key, and an encrypted content, generates the content distribution information using the acquired information, and transmits the generated content distribution information to the reproduction apparatus 200B via the second transmission/reception unit 421B.

3.5.13 Second Transmission/Reception Unit 421B

The explanation of the second transmission/reception unit 421B is omitted since it is similar to the transmission/reception unit 412 shown in Embodiment 1.

3.6 Operation of Prepaid Card System 3

The operation of the prepaid card system 3 will be described.

3.6.1 Outline of License Ticket Generation Operation

The description of the outline of the license ticket generation operation is omitted since it is similar to the one indicated by the flowchart shown in FIG. 25 in Embodiment 1.

It should be noted here that in Embodiment 3, the license ticket generation apparatus 300B transmits an encrypted management tree structure to the content distribution apparatus 400B, and the content distribution apparatus 400B receives and decrypts the encrypted management tree structure.

3.6.2 Outline of Content Distribution Operation

The description of the outline of the content distribution operation is omitted since it is similar to the one indicated by the flowchart shown in FIG. 26 in Embodiment 1.

3.6.3 Operation of License Ticket Generation Process

Figure 50:
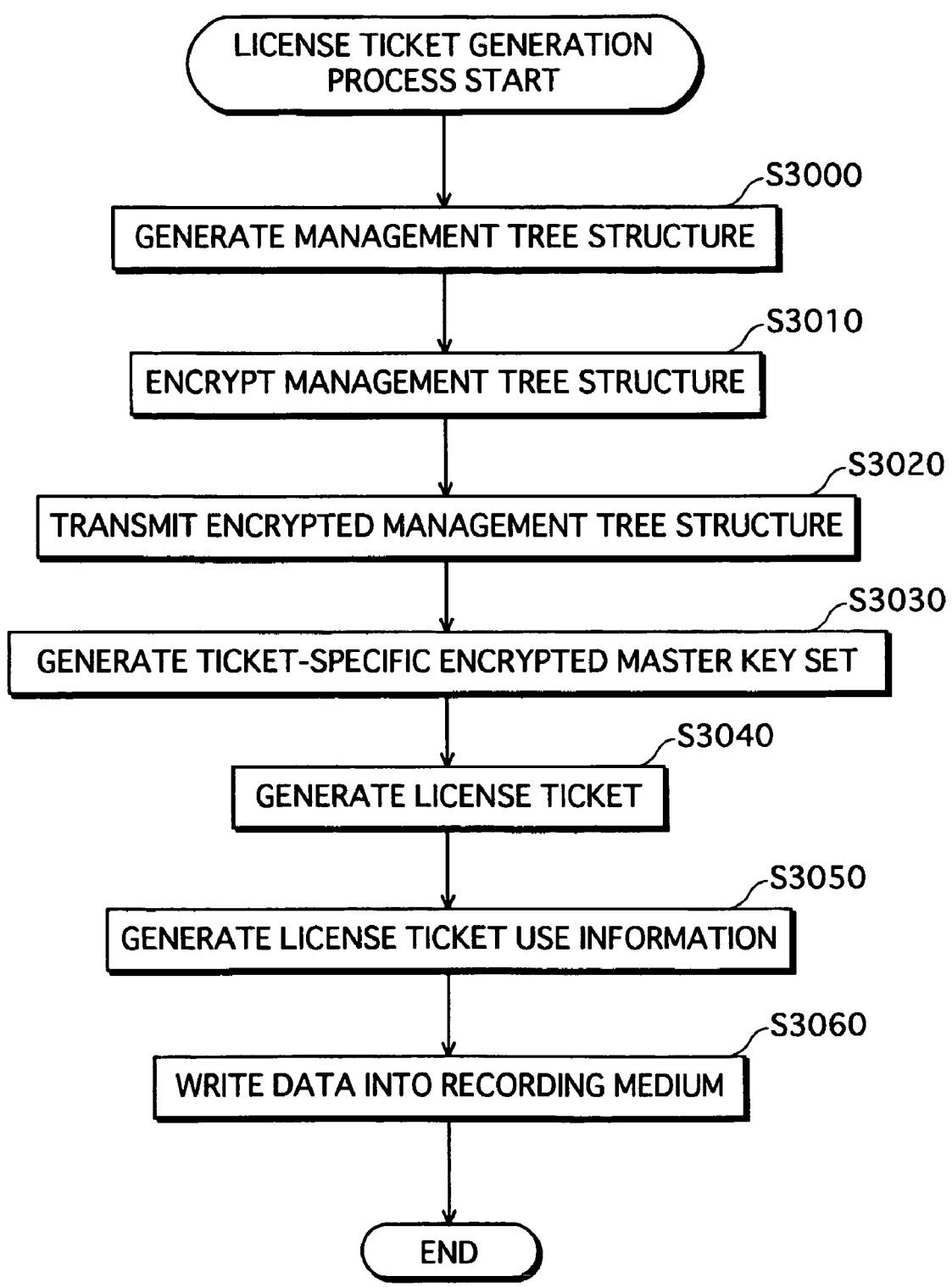
FIG. 50 is a flowchart of the license ticket generation process.

The license ticket generation process executed by the license ticket generation apparatus 300B will be described with reference to the flowchart shown in FIG. 50.

The license ticket generation apparatus 300B generates the management tree structure by generating a tree structure and a plurality of master keys, assigning the generated master keys to the nodes in the generated tree structure, and assigning master key sets to the leaves (step S3000). The license ticket generation apparatus 300B encrypts the generated management tree structure (step S3010). The license ticket generation apparatus 300B transmits the encrypted management tree structure to the content distribution apparatus 400B (step S3020). The license ticket generation apparatus 300B generates ticket-specific encrypted master key sets by encrypting the generated master keys (step S3030). The license ticket generation apparatus 300B generates the license ticket table T100B by using (a) the generated ticket-specific encrypted master key sets and (b) the content IDs and the use rules prestored therein, and stores the generated license ticket table T100B in the ticket information storage unit 309B (step S3040). The license ticket generation apparatus 300B further generates the use state table T150B that is composed of the license ticket use information, and stores the generated use state table T150B in the ticket information storage unit 309B (step S3050).

The license ticket generation apparatus 300B writes the license ticket table T100B and the use state table T150B stored in the ticket information storage unit 309B and the distribution request function that is prestored in the license ticket generation apparatus 300B, in the recording medium 100B (step S3060).

It should be noted here that a plurality of recording mediums can be generated by repeating only step S3060.

3.6.4 Operation of License Ticket Changing Process

Figure 39:
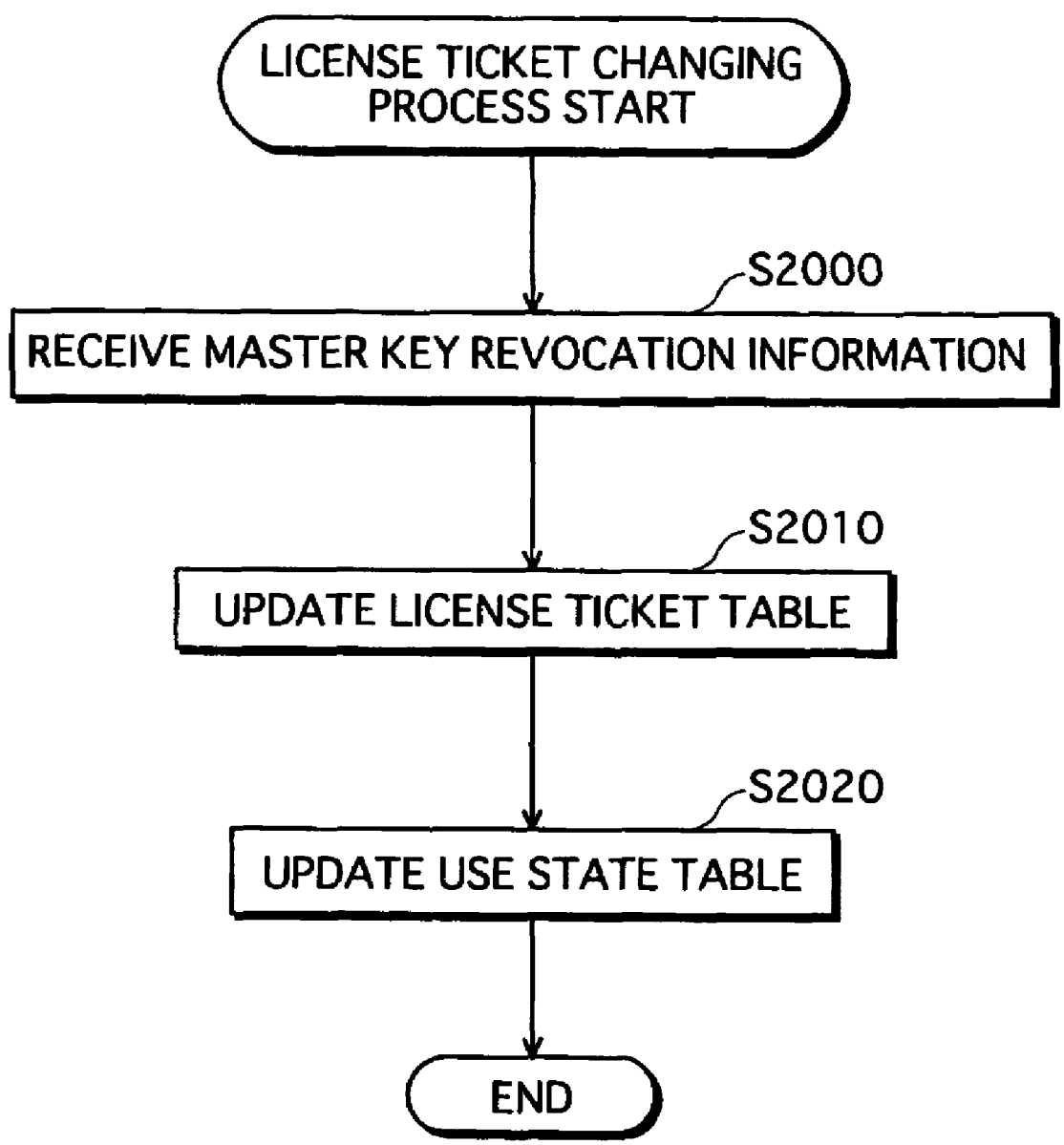
FIG. 39 is a flowchart of the license ticket changing process.

The description of the license ticket changing process, which is executed by the license ticket generation apparatus 300B is omitted since it is similar to the one indicated by the flowchart shown in FIG. 39.

It should be noted here that the license ticket generation apparatus 300B receives the master key set revocation information from the content distribution apparatus 400B, and that the license ticket generation apparatus 300B updates the license ticket table T100B using the received master key set revocation information, and further updates the use state table T150B.

With such operation of the license ticket changing process, the information stored in the ticket information storage unit 309B is updated. It is possible to write the updated information into the recording medium by executing only the writing step in the license ticket changing process.

3.6.5 Operation of Content Acquisition Process

The description of the content acquisition process executed by the reproduction apparatus 200B is omitted since it is similar to the one indicated by the flowchart shown in FIG. 28 in Embodiment 1.

3.6.6 Operation of Reproduction Process

With regards to the reproduction process executed by the reproduction apparatus 200B, only a difference from the one indicated by the flowchart shown in FIG. 29 in Embodiment 1 will be described.

In the present embodiment, the steps S860-S890 are executed as follows. The reproduction apparatus 200B acquires a ticket-specific encrypted master key set from a license ticket corresponding to a use number written in the acquired piece of license ticket use information (step S860). The reproduction apparatus 200B then generates a master key set by decrypting the acquired ticket-specific encrypted master key set (step S870). The reproduction apparatus 200B then acquires a pair of an encrypted content key and a piece of index information and an encrypted content (step S880). The reproduction apparatus 200B then generates a content key by decrypting the encrypted content key using the acquired piece of index information and the master key set generated in the step S870.

3.6.7 Operation of Use State Check Process

The description of the use state check process that is executed in the reproduction process is omitted since it is similar to the one indicated by the flowchart shown in FIG. 30 in Embodiment 1.

3.6.8 Operation of Content Encryption Process

The description of the content encryption process performed by the content distribution apparatus 400B is omitted since it is similar to the one indicated by the flowchart shown in FIG. 31 in Embodiment 1.

It should be noted here that in step S1140, the content distribution apparatus 400B acquires a master key based on the index information stored in the master key storage unit 402B, and that in step S1150, the content distribution apparatus 400B generates a plurality of encrypted content keys when a plurality of master keys have been acquired.

3.6.9 Master Key Revocation Process

In terms of the master key revocation process executed by the content distribution apparatus 400B, only a difference from the one indicated by the flowchart shown in FIG. 40 in Embodiment 2 will be described.

The content distribution apparatus 400B receives the master key set revocation information (step S2100). The content distribution apparatus 400B then refers to the received master key set revocation information to revoke unusable master key sets and the nodes on the paths that link the unusable master key sets with the root, and selects a master key that can be used (step S2110).

The content distribution apparatus 400B generates encrypted content keys by encrypting the content keys using the selected master keys, and updates the encrypted content management table T410B using the generated encrypted content keys (step S2120).

The content distribution apparatus 400B then performs an additional step before it performs step S2130. In the additional step, the content distribution apparatus 400B writes the index information corresponding to the selected master keys, into the master key storage unit 402B.

3.7 Summary of Embodiment 3

As described above, in the prepaid card system 3, the recording medium 100B stores encrypted master keys, and the content distribution apparatus 400B stores pairs of an encrypted content key and an encrypted content in the encrypted content management table, each pair corresponding to a different content. The encrypted content keys can be decrypted using master keys that are acquired by decrypting encrypted master keys stored in the recording medium 100B. This means that there is no limit to the contents that the user can request from the content distribution apparatus 400B. That is to say, there is no need for the user, in advance when the user purchases the recording medium 100B, to determine contents he/she would like to purchase, and the user can select desired contents after he/she purchases the recording medium 100B.

The recording medium 100B may store a use period as a use rule for each content. The user acquires a content by specifying a period within the use period stored in the recording medium 100B, and views the acquired content for the specified period.

The recording medium 100B may store therein content IDs of available contents, where a wild card notation can be used to indicate available contents. This enables the user to select a combination of available contents among a number of contents that can be distributed from the content distribution apparatus 400B.

When purchasing the recording medium 100B, the user pays a fee for renting or purchasing contents. As a result, the present system does not need the PKI for realizing the payment using the Internet, or a center for managing the use fees of the users. The present system is therefore simple, and does not require a complicated process. Also, there is a payment method in which a kiosk terminal is used to record a content for purchase into a recording medium. According to this payment method, the user needs to determine contents for purchase when he/she uses the kiosk terminal. However, according to the present system, there is no need for the user, in advance when the user purchases the recording medium 100B, to determine contents he/she would like to purchase, and there is no need for the user to use the payment method in which a kiosk terminal is used.

In the present system, a master key used to encrypt a content key is encrypted by the common key encryption system using a device key held by the reproduction apparatus permitted to reproduce the content. This prevents the master key from being read and revealed by an apparatus not permitted to reproduce the content.

With the use of Broadcast Encryption (BE) as a method of generating encrypted content keys, even if a master key is revealed, the revealed master key can be revoked, so that the corresponding content cannot be decrypted. This enhances the security. Also, by managing the master keys using a tree structure, only the minimum number of encrypted content keys are distributed. This reduces the amount of distributed information.

4. Summary of Embodiments

As described above, the prepaid card system of the present invention makes it possible for users to select contents as desired with less limitation even if the content distribution apparatus distributes encrypted contents, by using a recording medium in which encrypted master keys are recorded.

Also, the recording medium may store a use period as a use rule for each content. The user acquires a content by specifying a period within the use period stored in the recording medium, and views the acquired content for the specified period.

The recording medium may store content IDs of available contents, where a wild card notation can be used to indicate available contents. This enables the user to select a combination of available contents among a number of contents that can be distributed from the content distribution apparatus.

When purchasing the recording medium, the user pays the fee for renting or purchasing contents. As a result, the present system does not need the PKI for realizing the payment using the Internet, or a center for managing the use fees of the users. The present system is therefore simple, not required to perform a complicated process.

In the present system, a master key used to encrypt a content key is encrypted by the common key encryption system using a device key held by the reproduction apparatus permitted to reproduce the content. This prevents the master key from being read and revealed by an apparatus not permitted to reproduce the content.

With the use of Broadcast Encryption (BE) as a method of generating encrypted content keys, even if a master key is revealed, the revealed master key can be revoked, so that the corresponding content cannot be decrypted. This enhances the security. Also, by managing the master keys using a tree structure, only the minimum number of encrypted content keys are distributed. This reduces the amount of distributed information.

Although the present invention has been described in concrete embodiments so far, various modifications of the present invention can be provided as part of the present invention. The following are examples of such modifications.

Modifications (1) In the above embodiments, the "use rule" column contained in the license ticket is divided into "rental" and "purchase". The "rental" column shows a rental period and the "purchase" column shows an amount of money that can be used for purchasing a content. However, not limited to this, the "use rule" column may indicate only an amount of money for each ticket number.

When such a modification is applied, the rental fee per day may be set in advance so that when the for-rent ticket selection screen is displayed, an available rental period for each license ticket is calculated based on the amount of money indicated in the license ticket, and the calculation result may be displayed on the for-rent ticket selection screen.

(2) The license tickets may be managed using the remaining amount of money. This will be achieved as follows.

The RAM area of the recording medium is provided with a balance management area used to manage the balance (the remaining amount of money). The use state table additionally has a "rental period" column.

The reproduction apparatus, upon receiving a request by the user to rent or purchase, displays the balance indicated by the information stored in the balance management area. When the user requests to rent, the reproduction apparatus receives specification of a rental period the user desires. The reproduction apparatus calculates a rental fee from the rental period specified by the user, and judges whether the calculated rental fee is larger than the balance. When the calculated rental fee is not larger than the balance, the reproduction apparatus requests a distribution of a content, receives the distribution content information, and after completing the reception of the distribution content information, updates the use state table. In updating the use state table, the reproduction apparatus records the specified rental period into the "rental period" column. The reproduction apparatus also calculates the balance after the payment for the rental use of the content, and updates the balance management area using the newly calculated balance.

When the user requests to purchase, the reproduction apparatus compares the price of the content to be purchased with the balance. When the price of the content is not larger than the balance, the reproduction apparatus requests a distribution of a content, receives the distribution content information, and after completing the reception of the distribution content information, updates the use state table. In updating the use state table, the reproduction apparatus makes the "rental period" column blank.

(3) The balance management described above in (2) may be performed by the content distributor side.

In the case where the content distributor performs the balance management, the recording medium additionally records a management ID. The movie company is provided with a balance management apparatus that is used for managing the balance, and manages the balance by correlating it with the management ID.

The reproduction apparatus transmits the content distribution information request together with a management ID and information indicating (a) a "rental" and a rental period or (b) a "purchase", to the content distribution apparatus. Upon receiving the request with such information, the content distribution apparatus calculates an amount of money for the content use, from the received information. The content distribution apparatus further acquires the balance corresponding to the management ID, from the balance management apparatus, and judges whether the calculated amount of money is larger than the balance. When the calculated amount of money is not larger than the balance, the content distribution apparatus transmits the distribution content information, then newly calculates the balance, outputs the newly calculated balance to the balance management apparatus, and updates the balance for the received management ID. When the calculated amount of money is larger than the balance, the content distribution apparatus neither transmits the distribution content information nor updates the balance.

It should be noted here that the balance management may be performed by the content distribution apparatus or the license ticket generation apparatus, instead of the balance management apparatus.

(4) In (3) above, a communication terminal such as PDA or a mobile telephone used by a user may be connected to the balance management apparatus in a network. With such an arrangement, the communication terminal transmits the management ID to the balance management apparatus via the network and receives information regarding the balance from the balance management apparatus and notifies the user of the balance.

Alternatively, the recording medium may have a wireless IC tag, transmit the management ID to the balance management apparatus using the wireless IC tag and the communication terminal, and receive information regarding the balance from the balance management apparatus.

(5) In (2) above, the information regarding the balance may be indicated visually by controlling the writing and non-writing of data into the innermost and outermost regions of the recording medium.

(6) In the above-described embodiments, the reproduction apparatus updates the use state table when it receives a reproduction start instruction. However, not limited to this, the reproduction apparatus may update the use state table on a regular basis, with the recording medium being continuously inserted in the reproduction apparatus.

Alternatively, the use state table may be provided in the reproduction apparatus, and may be updated on regular basis.

(7) The use state table may be encrypted and the encrypted use state table may be stored.

In doing so, the use state table is encrypted using a device key, by the common key encryption system. To use the use state table, the encrypted use state table is decrypted using the device key.

(8) In the above-described embodiments, a device key is used to generate an encrypted master key. However, not limited to this, an encrypted master key may be generated using such information that is unique to a recording medium. Alternatively, an encrypted master key may be generated using both the device key and the information unique to the recording medium.

Examples of such information that is unique to a recording medium are: a ID unique to the recording medium; information recorded in BCA (Burst Cutting Area); a disc key unique to a disc or a lot; and data obtained from the Wobble that differs with each disc, where the Wobble is a waveform recorded on the disc for the purpose of deriving addresses when recording information on the disc.

(9) In the above-described embodiments, the license tickets are stored in the ROM area of the recording medium. However, not limited to this, the license tickets may be stored in the RAM area of the recording medium.

(10) A digital signature may be attached to a license ticket using a secret key owned by the content distributor. This prevents the license ticket from being rewritten in an unauthorized manner, enhancing the security. In doing so, a public key certificate of the movie company is recorded in the recording medium, and the reproduction apparatus verifies the digital signature.

(11) In the above-described embodiments, the use state table is used to judge whether a license ticket has been used or not. However, not limited to this, the reproduction apparatus may erase a used license ticket by emitting a laser beam onto the license ticket stored in the ROM area.

(12) In the above-described embodiments, no restriction is put on writing and reading data to/from the use state storage field of the RAM area. However, the data stored in the field may be encrypted using a device key or certain information secretly held by the content distributor and a reproduction apparatus which is permitted to reproduce a content (hereinafter such a reproduction apparatus is referred to a permitted apparatus) so that only the permitted apparatus can access the data stored in the use state storage field. Alternatively, a Message Authorization Child (MAC) may be attached to the data stored in the field.

(13) In the above-described embodiments, the content distributor is a movie company. However, not limited to this, the content distributor may be any company or person that distributes contents.

For example, the content distributor may be a rental shop, a digital broadcasting station, or a music company.

(14) In the above-described embodiments, a recording medium having a license ticket (hereinafter the recording medium is referred to as prepaid card) is unique to a movie company. However, other modifications are possible. For example, the usable content ID may be composed of an identier for identifying a content distributor and a work identifier for identifying a work, and the prepaid card may be unique to a content distributor indicated by the content distributor identifier.

Alternatively, the usable content ID for each license ticket may be composed of a rental shop identier for identifying a rental shop and a work identifier which can be represented using a wild card notation. This enables a prepaid card to be unique to a rental shop, enabling the user to rent or purchase contents from the rental shop using the prepaid card.

Also, the usable content ID may be composed of (a) a movie company identier or a rental shop identier and (b) a work identifier which can not be represented by a wild card notation. This enables a prepaid card to be used for predetermined contents, enabling the user to rent or purchase any contents selected from the predetermined contents, from the rental shop or the movie company using the prepaid card.

Further, the usable content ID may be composed of (a) a movie company identier or a rental shop identier and (b) a work identifier which can not be represented by a wild card notation. With this construction, it is possible to manufacture a prepaid card that allows the user to rent or purchase contents selected by a famous person. This adds value to the prepaid card.

Also, the first three digits of the usable content ID may be represented by the wild card notation, as well. This enables the user to rent or purchase a content without being aware of the content distributor such as a movie company or a rental shop.

(15) In the above-described embodiments, the use rule for the license ticket is composed of (a) the rental period represented by days and (b) an amount of money that can be used for purchasing. However, the use rule is not limited to this.

The use rule may include information indicating a use period during which a license ticket is usable. The user can view any content specified in the license ticket during the use period. For example, the user can view content "BBB", and then another content "CCC" in so far the user can view them within the use period.

(16) The reproduction apparatus may transmit personal information to the content distribution apparatus, together with the content distribution information request.

In the above-mentioned case, the personal information is recorded into the recording medium by a shop when the user purchases the recording medium at the shop. The reproduction apparatus transmits the recorded personal information to the content distribution apparatus when the license ticket is used. This enables the content distributor to use the received personal information for marketing.

The personal information mentioned above is, for example, the age and sex of the person.

(17) A license ticket may include information that indicates a date/time from which a content can be viewed as a rented or purchased content (hereinafter, the date/time is referred to as a viewing available date/time). This enables the user to obtain a content before the content is released.

In the above-mentioned case, the reproduction apparatus records information of a date/time at which the user starts to use the content (hereinafter, the date/time is referred to as a use start date/time), into the use state table as follows. The reproduction apparatus acquires the reception completion date/time from the clock unit. The reproduction apparatus then compares the acquired reception completion date/time with the viewing available date/time that is shown in the license ticket table. If the viewing available date/time is earlier than the reception completion date/time, the reproduction apparatus records the reception completion date/time as the use start date/time. If the viewing available date/time is later than the reception completion date/time, the reproduction apparatus records the viewing available date/time as the use start date/time.

When reproducing the content, the reproduction apparatus compares the current date/time with the use start date/time shown in the use state table. If the use start date/time has not been reached, the reproduction apparatus performs a control so that the corresponding content is not shown in the reproducible content list. With such a control, the user cannot view the content before the use start date/time comes, that is to say, before the content is released.

(18) The encrypted content management table may include the viewing available date/time mentioned in (17) above.

In this case, the distribution content information additionally include the viewing available date/time. The reproduction apparatus records the use start date/time into the use state table in the same manner as in (17) above. Also, the reproduction apparatus reproduces the content in the same manner as in (17).

This enables the content distributor to distribute a content in advance before the date of release. The user cannot view the content before the use start date/time comes, that is to say, before the content is released.

(19) The content distribution apparatus may manage the state of distribution request for each content.

With this arrangement, it is possible to forecast the number of contents to be pressed, reducing the risk of generating excessive inventory.

Such a reduction of the risk of generating excessive inventory helps reduce the payment for unnecessary license fees, especially when a complicated relationship is involved regarding a right such as TV packaging.

(20) In the above-described embodiments, the recording medium is an optical disc. However, not limited to this, the recording medium may be a portable memory card or a memory card with an IC function.

(21) In the above-described embodiments, the distribution request program is executed by the reproduction apparatus. However, not limited to this, the recording medium may be a memory card with an IC function, and the distribution request program may be executed by the memory card with an IC function.

(22) In the above-described embodiments, the recording medium is provided with the distribution request function storage field. However, not limited to this, the reproduction apparatus may be provided with the distribution request function storage field.

(23) The reproduction apparatus may be provided with a function to automatically receive the distribution content information. This enables the reproduction apparatus to receive the distribution content information that is automatically distributed by a digital broadcasting station or the like.

The reproduction apparatus with the recording medium inserted therein is connected to a digital broadcasting station via a network, and receives the distribution content information that is automatically distributed by the digital broadcasting station. The reproduction apparatus holds the received distribution content information if a content ID contained in the received distribution content information satisfies the condition for a usable content ID of a not-used license ticket that is recorded in the recording medium. If the content ID contained in the received distribution content information does not satisfy the condition for the usable content ID, the reproduction apparatus discards the received distribution content information.

(24) In the above-described embodiments, the license ticket generation apparatus and the content distribution apparatus are interconnected by a dedicated line in a network. However, not limited to this, the license ticket generation apparatus and the content distribution apparatus may be interconnected in a different manner in a network. For example, they may be interconnected via the Internet in a network.

Also, in the above-described embodiments, the reproduction apparatus and the content distribution apparatus are interconnected via the Internet in a network. However, not limited to this, the reproduction apparatus and the content distribution apparatus may be interconnected in a different manner in a network. For example, they may be interconnected by a dedicated line in a network.

(25) In Embodiment 2, a different master key is used for each license ticket. However, not limited to this, a different master key may be used for each disc or lot.

(26) It is expected that in the near future, a next-generation DVD recording/reproduction apparatus that is connectable to a network will be widespread among consumers (hereinafter, the next-generation DVD recording/reproduction apparatus is referred to as a BD recorder). The reproduction apparatus may be the BD recorder.

(27) In Embodiments 1 and 2, encrypted master keys are recorded into the license tickets. However, not limited to this, unencrypted master keys may be recorded into the license tickets.

Also, in Embodiment 3, encrypted master key sets are recorded into the license tickets. However, not limited to this, unencrypted master key sets may be recorded into the license tickets.

(28) In Embodiments 1 and 2, encrypted master keys, which are generated by encrypting the master keys that are generated by the license ticket generation apparatus, are transmitted to the content distribution apparatus. However, not limited to this, unencrypted master keys may be transmitted to the content distribution apparatus. Alternatively, the content distribution apparatus may store the generated master keys or encrypted master keys in the recording medium, and the content distribution apparatus may receive the master keys or encrypted master keys via the recording medium.

In Embodiment 3, the encrypted management tree structure, which is generated by encrypting the management tree structure that is generated by the license ticket generation apparatus, is transmitted to the content distribution apparatus. However, not limited to this, an unencrypted management tree structure may be transmitted to the content distribution apparatus. Alternatively, the content distribution apparatus may store the generated management tree structure or encrypted management tree structure in the recording medium, and the content distribution apparatus may receive the management tree structure or encrypted management tree structure via the recording medium.

(29) In the above-described embodiments, information of reproducible contents is extracted after the use state table is updated. However, other modifications of this are possible. The following explains one example. First, information of all the contents recorded in the recording medium may be displayed. Then specification of a content the user would like to reproduce is received from the user. It is judged whether the specified content can be reproduced. For this judgment, first it is judged whether the content is used as a rented content or a purchased content. If the content is used as a rented content, it is further judged whether the rental period has passed or not. The specified content is reproduced (a) if the content is used as a purchased content, or (b) if the content is used as a rented content, and the rental period has not passed; the specified content is not reproduced if the content is used as a rented content, and the rental period has passed.

(30) In the above-described embodiments, when a content is purchased, a content generated by decrypting an encrypted content is stored in the recording medium. However, not limited to this, the purchased content may be stored in the recording medium in the same manner as when the content is rented.

In the above-mentioned case, the reproduction apparatus operates as follows each time it reproduces the purchased content. The reproduction apparatus decrypts generates a master key by decrypting the ticket-specific encrypted master key, which is contained in the license ticket used for the purchase, generates a content key by decrypting the encrypted content ke using the generated master key, generates a content by decrypting the encrypted content using the generated content key, reproduces the generated content, and discards the content after the reproduction of the content is completed.

(31) In the above-described embodiments, the recording medium is provided with the content storage field. However, not limited to this, the reproduction apparatus may be provided with the content storage field.

Also, each time a content is used, the reproduction apparatus may acquire a content for use from the content distribution apparatus via a network.

(32) In the above-described embodiments, the recording medium is provided with the use state table. However, not limited to this, the reproduction apparatus may be provided with the use state table.

(33) The content distributor side may manage the balance using the license ticket table.

The following describes one example for achieving the balance management.

The license ticket generation apparatus assigns a different ID to each license ticket table (hereinafter referred to as a license ticket ID). The license ticket IDs are managed in association with the license ticket tables. Whenever the user uses a license ticket, the user transmits a license ticket ID and the ticket number of the used ticket to the license ticket generation apparatus. The license ticket generation apparatus uses the received license ticket ID and ticket number to add information indicating that the license ticket has been used, to the license ticket. The user uses a mobile telephone when transmitting the license ticket ID to the license ticket generation apparatus. Upon receiving the license ticket ID, the license ticket generation apparatus obtains information concerning not-used license tickets from a license ticket table that corresponds to the received license ticket ID, generates the balance information using the obtained information concerning the not-used license tickets, and transmits the generated balance information to the user's mobile telephone. The balance information mentioned here is information indicating the number of available rental uses. Upon receiving the balance information, the user's mobile telephone displays the received balance information.

It should be noted here that the balance information may be information indicating an amount of money corresponding to the number of available rental uses. Also, the apparatus the user uses for checking the balance may be the communication terminal mentioned in (4) above. Also, the license ticket ID may be information unique to the recording medium. The information unique to the recording medium may be, for example: a ID unique to the recording medium; information recorded in BCA (Burst Cutting Area); a disc key unique to a disc or a lot; and data obtained from the Wobble that differs with each disc, as shown in (8) above.

The apparatus for performing the balance management is not limited to the license ticket generation apparatus. A balance management apparatus for performing the balance management may be provided. Alternatively, the content distribution apparatus may perform the balance management.

This enables the content distributor side to perform the balance management using the license ticket table.

(34) In the above-described embodiments, the license ticket generation apparatus writes the same license ticket table into each recording medium. However, not limited to this, the license ticket generation apparatus may write a license ticket table having a different ticket-specific encrypted master key into each recording medium.

For example, in Embodiment 1, a ticket-specific encrypted master key "Enc (DK, WK)" may be written into a recording medium, and another ticket-specific encrypted master key "Enc (DK, WK1)" may be written into another recording medium. Also, in Embodiment 2, ticket-specific encrypted master keys "Enc(DK, WK1)", "Enc(DK, WK2)", . . . "Enc (DK, WK10)" may be written into a recording medium, and ticket-specific encrypted master keys "Enc(DK, WK11)", "Enc(DK, WK12)", . . . "Enc(DK, WK20)" may be written into another recording medium.

Also, in Embodiment 3, the license ticket generation apparatus may write a license ticket table having a different ticket-specific encrypted master key set into each recording medium. In this case, ticket-specific encrypted master key sets "Enc(DK, WKS1)", "Enc(DK, WKS2)", . . . "Enc(DK, WKS10)" may be written into a recording medium, and ticket-specific encrypted master key sets "Enc(DK, WKS11)", "Enc(DK, WKS12)", . . . "Enc (DK, WKS20)" may be written into another recording medium.

In the manner described above, it is possible to write a different license ticket table into each recording medium.

(35) The present invention may be the methods shown by the above. Furthermore, the methods may be implemented as a computer program on a computer, and may be a digital signal of the computer program.

Furthermore, the present invention may be implemented as a computer-readable recording medium apparatus such as a flexible disk, a hard disk, CD-ROM (compact disk-read only memory), MO (magneto-optical), DVD-ROM (digital versatile disk-read only memory), DVD RAM, BD (Blu-ray Disc), or a semiconductor memory, that stores the computer program or the digital signal. Furthermore, the present invention may be a computer program or the digital signal recorded on any of the aforementioned recording medium apparatuses.

Furthermore, the present invention may be the computer program or the digital signal transmitted on a electric communication line, a wireless or wired communication line, or a network of which the Internet is representative.

Furthermore, the present invention may be a computer system that includes a microprocessor and a memory, the memory storing the computer program, and the microprocessor operating according to the computer program.

Furthermore, by transferring the program or the digital signal to a recording medium apparatus, or by transferring the program or the digital signal via a network or the like, the program or the digital signal may be executed by another independent computer system.

(36) The present invention may be any combination of the above-described embodiments and modifications.

INDUSTRIAL APPLICABILITY

The above described prepaid card system can be used effectively, namely repetitively and continuously, in the industry for distributing digital works such as movies and music from content distributors to users. Especially, the prepaid card system is suitable for the industry for distributing digital works via a network.

The invention claimed is:

1. A content reproduction system for distributing a plurality of prepaid contents via a network, the content reproduction system comprising:
a recording medium;
a content distribution apparatus; and
a reproduction apparatus, wherein the recording medium is operable to store, in association with each other, (i) identification information for identifying a plurality of contents that can be acquired, (ii) a master key that is common to the plurality of contents, and (iii) rule information that indicates a use rule that is common to the plurality of contents, wherein the content distribution apparatus includes:

a storage unit for storing a plurality of encrypted contents and a plurality of encrypted content keys associated with the plurality of encrypted contents, the plurality of encrypted contents being generated by encrypting each of the plurality of contents by using one or more of a plurality of content keys, the one or more of the plurality of content keys being uniquely assigned to the each of the plurality of contents, the plurality of encrypted content keys being generated by encrypting the plurality of content keys, respectively, using the master key;

a transmitting unit operable to transmit, to the reproduction apparatus, a content list including content IDs which respectively indicate all contents held by the content distribution apparatus; and a distribution unit operable to distribute an encrypted content requested by the reproduction apparatus and an encrypted content key associated with the encrypted content to the reproduction apparatus in response to a request from the reproduction apparatus, without using the recording medium as an intermediary, wherein the reproduction apparatus includes:

a reading unit operable to read out the master key and the rule information from the recording medium;

a display unit operable to read out the identification information from the recording medium, to select, based on the read out identification information, one or more acquirable content IDs from among the content IDs included in the content list received from the content distribution apparatus, and to display an acquirable content list composed of the selected one or more acquirable content IDs;

a receiving unit operable to receive an acquirable content ID of the selected one or more acquirable content IDs from a user with the use of the displayed acquirable content list;

an acquiring unit operable to request an encrypted content from the content distribution apparatus, the encrypted content corresponding to the received acquirable content ID, and to acquire the requested encrypted content and an encrypted content key associated with the encrypted content, without using the recording medium;

a decrypting unit operable to determine if the acquired encrypted content is permitted to be used, based on the use rule indicated by the rule information and, if the acquired encrypted content is permitted to be used, to acquire the content key by decrypting the encrypted content key using the master key, and to generate a decrypted content using the acquired content key; and a reproducing unit operable to reproduce the decrypted content, wherein the recording medium is insertable into the reproduction apparatus and removable from the reproduction apparatus, wherein the recording medium stores the master key as an encrypted master key generated by encrypting the master key using a device key uniquely assigned to the reproduction apparatus, and wherein the reading unit acquires the master key by decrypting the encrypted master key using the device key uniquely assigned to the reproduction apparatus.

2. A reproduction apparatus for use in a content reproduction system, the content reproduction system for distributing a plurality of prepaid contents via a network, the content reproduction system having a content distribution apparatus and a recording medium which stores, in association with each other, (i) identification information for identifying a plurality of contents that can be acquired, (ii) a master key that is common to the plurality of contents, and (iii) rule information that indicates a use rule that is common to the plurality of contents, wherein the content distribution apparatus is for storing a plurality of encrypted contents and a plurality of encrypted content keys associated with the plurality of encrypted contents, the plurality of encrypted contents being generated by encrypting each of the plurality of contents by using one or more of a plurality of content keys, the one or more of the plurality of content keys being uniquely assigned to the each of the plurality of contents, the plurality of encrypted content keys being generated by encrypting the plurality of content keys, respectively, using the master key, and wherein the content distribution apparatus is operable to transmit, to the reproduction apparatus, a content list including content IDs which respectively indicate all contents held by the content distribution apparatus, and to distribute an encrypted content requested by the reproduction apparatus and an encrypted content key associated with the encrypted content to the reproduction apparatus in response to a request from the reproduction apparatus, without using the recording medium as an intermediary, the reproduction apparatus comprising:

a reading unit operable to read out the master key and the rule information from the recording medium;

a display unit operable to read out the identification information from the recording medium, to select, based on the read out identification information, one or more acquirable content IDs from among the content IDs included in the content list received from the content distribution apparatus, and to an acquirable content list composed of the selected one or more acquirable content IDs;

a receiving unit operable to receive an acquirable content ID of the selected one or more acquirable content IDs from a user with the use of the displayed acquirable content list;

an acquiring unit operable to request an encrypted content from the content distribution apparatus, the encrypted content corresponding to the received acquirable content ID, and to acquire the requested encrypted content and an encrypted content key associated with the encrypted content, without using the recording medium as an intermediary;

a decrypting unit operable to determine if the acquired encrypted content is permitted to be used based on the use rule indicated by the rule information, and if the acquired encrypted content is permitted to be used, operable to acquire the content key by decrypting the encrypted content key using the master key and to generate a decrypted content by decrypting the acquired encrypted content key using the acquired content key; and a reproducing unit operable to reproduce the decrypted content, and wherein the reproduction apparatus is configured so that the recording medium is insertable into the reproduction apparatus and removable from the reproduction apparatus, wherein the recording medium stores the master key as an encrypted master key generated by encrypting the master key using a device key uniquely assigned to the reproduction apparatus, and wherein the reading unit acquires the master key by decrypting the encrypted master key using the device key uniquely assigned to the reproduction apparatus.

3. The reproduction apparatus of claim 2, wherein the recording medium stores the master key as an encrypted master key that is generated by encrypting the master key based on a device key uniquely assigned to the reproduction apparatus, and wherein the reading unit acquires the master key by decrypting the encrypted master key using a device key uniquely assigned to the reproduction apparatus.

4. The reproduction apparatus of claim 3, wherein the recording medium stores another encrypted master key that is different from the encrypted master key, the another encrypted master key being generated by encrypting another master key, the another master key being different from the master key, based on the device key, and wherein the reading unit further acquires the another master key by decrypting the another encrypted master key using the device key.

5. The reproduction apparatus of claim 2, wherein the recording medium stores the master key as an encrypted master key set that is generated by encrypting a master key set based on a device key uniquely assigned to the reproduction apparatus, the master key set including the master key and another master key that is different from the master key, and wherein the reading unit acquires the master key set by decrypting the encrypted master key set using the device key uniquely assigned to the reproduction apparatus and acquires the master key from the acquired master key set.

6. The reproduction apparatus of claim 2, wherein the rule information further indicates a use period of the content, wherein the acquiring unit further includes:

an acquisition information receiving sub-unit operable to receive acquisition information that indicates either rental, which means that the content is acquired for rent, or purchase which means that the content is acquired for purchase; and an acquisition information storage sub-unit operable to store therein the received acquisition information in association with the encrypted content and the encrypted content key, and wherein the decrypting unit is further operable to determine (i) if the received acquisition information indicates purchase or (ii) if the acquisition information indicates rental and a requested use period for the content is within the use period indicated by the rule information, and operable to decrypt the encrypted content based on a result of the determination.

7. The reproduction apparatus of claim 6, wherein the decrypting unit is further operable to calculate a period between (i) acquisition of the encrypted content and (ii) the encrypted content key and reception of the reproduction instruction, and operable to determine if the calculated period is within the use period of the content.

8. The reproduction apparatus of claim 6, wherein the recording medium further stores usable content information that indicates a condition for using the content, the usable content information being different from the rule information, and wherein the acquiring unit is further operable to determine if the condition for using the content is satisfied, and operable to acquire the encrypted content and the encrypted content key from the content distribution apparatus if the condition for using the content is satisfied.

9. The reproduction apparatus of claim 8, wherein the content distribution apparatus is further operable to distribute the encrypted content and the encrypted content key to the reproduction apparatus without a content distribution request from the reproduction apparatus, and wherein the acquiring unit is further operable to determine if the received encrypted content and encrypted content key satisfy the condition indicated by the usable content information, and operable to hold the received encrypted content and encrypted content key only if the received encrypted content and encrypted content key satisfy the condition indicated by the usable content information.

10. The reproduction apparatus of claim 2, wherein the use rule indicates a value that has been prepaid as a payment for using the encrypted content, and wherein the decrypting unit is further operable to determine whether or not the encrypted content is permitted to be used in exchange for consuming the value indicated by the use rule, and operable to consume the value indicated by the use rule and decrypt the encrypted content if the encrypted content is permitted to be used in exchange for consuming the value indicated by the use rule.

11. The reproduction apparatus of claim 2, wherein the use rule indicates a time period in which the encrypted content is permitted to be decrypted, and wherein the decrypting unit is further operable to determine if a current time is within the time period indicated by the use rule, and to decrypt the encrypted content if the current time is within the time period.

12. A content distribution apparatus for use in a content reproduction system, the content reproduction system for distributing a plurality of prepaid contents via a network, with a reproduction apparatus and a removable recording medium which stores, in association with each other, (i) identification information for identifying a plurality of contents that can be acquired, (ii) a master key that is common to the plurality of contents, and (iii) rule information that indicates a use rule that is common to the plurality of contents, the content distribution apparatus comprising:

a storage unit for storing a plurality of encrypted contents and a plurality of associated encrypted content keys associated with the plurality of encrypted contents, the plurality of encrypted contents being generated by encrypting each of the plurality of contents by using one or more of a plurality of content keys, the one or more of the plurality of content keys being uniquely assigned to the each of the plurality of contents, the plurality of encrypted content keys being generated by encrypting the plurality of content keys, respectively, using the master key;

a transmitting unit operable to transmit, to the reproduction apparatus via a network, a content list including content IDs which respectively indicate all contents held by the content distribution apparatus; and a distribution unit operable to distribute an encrypted content requested by the reproduction apparatus and an encrypted content key associated with the encrypted content to the reproduction apparatus in response to a request from the reproduction apparatus, without using the recording medium as an intermediary, wherein the content list is used by the reproduction apparatus to select, based on the identification information, one or more acquirable content IDs from amount the content IDs included in the content list, to receive an acquirable content ID of the selected one or more acquirable content IDs from a user, and to request a content corresponding to the received acquirable content ID, wherein the recording medium stores the master key as an encrypted master key generated by encrypting the master key using a device key uniquely assigned to the reproduction apparatus, and wherein the reading unit acquires the master key by decrypting the encrypted master key using the device key uniquely assigned to the reproduction apparatus.

13. The content distribution apparatus of claim 12 further comprising:
a master key storage unit for storing a plurality of master keys and for storing a state for each master key of the plurality of master keys;
a state changing unit operable to set a state of a master key that is not permitted to be used among the plurality of master keys to an unusable state; and
a content key encrypting unit operable to generate an encrypted content key using a master key that is permitted to be used among the plurality of master keys.

14. A reproduction method for reproducing content of a plurality of prepaid contents distributable via a network with a reproduction apparatus used with a content distribution apparatus and a recording medium which stores, in association with each other, (i) identification information for identifying a plurality of contents that can be acquired, (ii) a master key that is common to the plurality of contents, and (iii) rule information that indicates a use rule that is common to the plurality of contents,
wherein the recording medium is insertable into the reproduction apparatus and removable from the reproduction apparatus,
wherein the content distribution apparatus is for storing a plurality of encrypted contents and a plurality of encrypted content keys associated with the plurality of encrypted contents, the plurality of encrypted contents being generated by encrypting each of the plurality of contents by using one or more of a plurality of content keys, the one or more of the plurality of content keys being uniquely assigned to the each of the plurality of contents, the plurality of encrypted content keys being generated by encrypting the plurality of content keys, respectively, using the master key, and
wherein the content distribution apparatus is operable to transmit, to the reproduction apparatus, a content list including content IDs which respectively indicate all contents held by the content distribution apparatus, and to distribute an encrypted content and an encrypted content key associated with the encrypted content to the reproduction apparatus in response to a request from the reproduction apparatus, without using the recording medium as an intermediary, the reproduction method comprising the steps of:
reading out from the recording medium the master key that is common to the plurality of contents and the rule information that indicates the use rule that is common to the plurality of contents;
reading out the identification information from the recording medium;
selecting, based on the read out identification information, one or more acquirable content IDs from among the content IDs included in the content list received from the content distribution apparatus, displaying an acquirable content list composed of the selected one or more acquirable content IDs, and receiving an acquirable content ID from a user with the use of the displayed acquirable content list;
requesting one encrypted content from the content distribution apparatus, the encrypted content corresponding to the received acquirable content ID, and acquiring the requested encrypted content and an encrypted content key associated with the requested encrypted content, without using the recording medium as an intermediary;
determining if the acquired encrypted content is permitted to be used, based on the use rule, and if the acquired encrypted content is permitted to be used, acquiring the content key by decrypting the encrypted content key using the master key and generating a decrypted content by decrypting the acquired encrypted content key using the acquired content key; and
reproducing the decrypted content,
wherein the recording medium stores the master key as an encrypted master key generated by encrypting the master key using a device key uniquely assigned to the reproduction apparatus, and
wherein the reading unit acquires the master key by decrypting the encrypted master key using the device key uniquely assigned to the reproduction apparatus.

15. A computer-readable storage medium storing a reproduction program for use in a computer for reproducing content of a plurality of prepaid contents distributable via a network, and for use with a content distribution apparatus and a recording medium which stores, in association with each other, (i) identification information for identifying a plurality of contents that can be acquired, (ii) a master key that is common to the plurality of contents, and (iii) rule information that indicates a use rule that is common to the plurality of contents,
wherein the recording medium is insertable into the computer and removable from the computer,
wherein the content distribution apparatus is for storing a plurality of encrypted contents and a plurality of encrypted content keys associated with the plurality of encrypted contents, the plurality of encrypted contents being generated by encrypting each of the plurality of contents by using one or more of a plurality of content, the one or more of the plurality of content keys being uniquely assigned to the each of the plurality of contents, the plurality of encrypted content keys being generated by encrypting the plurality of content keys, respectively, using the master key, and
wherein the content distribution apparatus is operable to transmit, to the computer, a content list including content IDs which respectively indicate all contents held by the content distribution apparatus, and to distribute an encrypted content requested by the computer and an encrypted content key associated with the encrypted content to the computer in response to a request from the computer, without using the recording medium as an intermediary, the reproduction program being for causing the computer to perform the steps of:

reading out from the recording medium the master key that is common to the plurality of contents and the rule information that indicates the use rule that is common to the plurality of contents;

reading out the identification information from the recording medium;

selecting, based on the read out identification information, one or more acquirable content IDs from among the content IDs included in the content list received from the content distribution apparatus, displaying an acquirable content list composed of the selected one or more acquirable content IDs, and receiving an acquirable content ID from a user with use of the displayed acquirable content list;

requesting one encrypted content from the content distribution apparatus, the encrypted content corresponding to the received acquirable content id, and acquiring the requested encrypted content and an encrypted content key associated with the requested encrypted content, without using the recording medium;

determining if the acquired encrypted content is permitted to be used, based on the use rule, and if the acquired encrypted content is permitted to be used, acquiring the content key by decrypting the encrypted content key using the master key and generating a decrypted content by decrypting the acquired encrypted content key using the acquired content key; and reproducing the decrypted content, wherein the recording medium stores the master key as an encrypted master key generated by encrypting the master key using a device key uniquely assigned to the reproduction apparatus, and wherein the reading unit acquires the master key by decrypting the encrypted master key using the device key uniquely assigned to the reproduction apparatus.

* * * * *